US008022152B2

United States Patent
Ittel et al.

(10) Patent No.: US 8,022,152 B2
(45) Date of Patent: Sep. 20, 2011

(54) COPOLYMERS OF VINYL- AND ALLYLSILANES

(75) Inventors: Steven Dale Ittel, Wilmington, DE (US); Lynda Kaye Johnson, Wilmington, DE (US); Lin Wang, Hockessin, DE (US); Ying Wang, Wilmington, DE (US); Elizabeth Forrester McCord, Hockessin, DE (US); Catherine E. Radzewich, Iowa City, IA (US); Stephan James McLain, Wilmington, DE (US); Karl Jeffrey Sweetman, Wilmington, DE (US); Alison Margaret Anne Bennett, Wilmington, DE (US); Alex Sergey Ionkin, Kennett Square, PA (US); Rinaldo Soria Schiffino, Wilmington, DE (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 550 days.

(21) Appl. No.: 12/002,925

(22) Filed: Dec. 19, 2007

(65) Prior Publication Data
US 2009/0143550 A1   Jun. 4, 2009

Related U.S. Application Data

(62) Division of application No. 10/295,606, filed on Nov. 15, 2002, now Pat. No. 7,348,388.

(60) Provisional application No. 60/407,924, filed on Sep. 3, 2002, provisional application No. 60/332,798, filed on Nov. 16, 2001, provisional application No. 60/332,799, filed on Nov. 16, 2001.

(51) Int. Cl.
C08F 2/38    (2006.01)
C08F 4/00    (2006.01)
C08F 30/08   (2006.01)
C08F 210/00  (2006.01)

(52) U.S. Cl. ............. 526/82; 526/90; 526/279; 526/348

(58) Field of Classification Search ............... 526/82, 526/90, 279, 348
See application file for complete search history.

(56) References Cited

U.S. PATENT DOCUMENTS

| 3,223,686 | A | 12/1965 | Longi et al. |
| 3,225,018 | A | 12/1965 | Zutty |
| 3,392,156 | A | 7/1968 | Donaldson |
| 3,646,155 | A | 2/1972 | Scott et al. |
| 3,828,015 | A | 8/1974 | Mikhailovich et al. |
| 3,884,891 | A | 5/1975 | Samoilov et al. |
| 4,097,436 | A | 6/1978 | Buning et al. |

(Continued)

FOREIGN PATENT DOCUMENTS

WO    WO 96/23010    1/1996

(Continued)

OTHER PUBLICATIONS

Notice of Allowance issued Nov. 7, 2007 in U.S. Appl. No. 10/295,606.

(Continued)

*Primary Examiner* — William K Cheung
(74) *Attorney, Agent, or Firm* — Barry Dale Cash

(57) ABSTRACT

Ethylene and allyl- or vinylsilanes are efficiently copolymerized by certain late transition metal complexes containing selected bidentate or tridentate ligands. The resulting novel polymers may be crosslinked by moisture when vinylsilane contains groups bound to silicon which are hydrolyzable. The polymers are useful for wire coating, crosslinked foams, pipes, and other uses.

22 Claims, 3 Drawing Sheets

U.S. PATENT DOCUMENTS

| | | | |
|---|---|---|---|
| 4,275,226 | A | 6/1981 | Yamabe et al. |
| 4,397,981 | A | 8/1983 | Doi et al. |
| 4,731,424 | A | 3/1988 | Fujimoto et al. |
| 4,886,862 | A | 12/1989 | Kuwamura et al. |
| 4,906,754 | A | 3/1990 | Klabunde et al. |
| 5,030,606 | A | 7/1991 | Klabunde et al. |
| 5,085,895 | A | 2/1992 | Asanuma et al. |
| 5,166,225 | A | 11/1992 | Asanuma et al. |
| 5,312,861 | A | 5/1994 | Meverden et al. |
| 5,334,684 | A | 8/1994 | Asanuma et al. |
| 5,348,924 | A | 9/1994 | Potter et al. |
| 5,401,787 | A | 3/1995 | Tonyali |
| 5,425,865 | A | 6/1995 | Singleton et al. |
| 5,508,363 | A | 4/1996 | Itoh et al. |
| 5,627,292 | A | 5/1997 | Armand et al. |
| 5,714,556 | A | 2/1998 | Johnson et al. |
| 5,866,663 | A | 2/1999 | Brookhart et al. |
| 6,025,092 | A | 2/2000 | Doyle et al. |
| 6,107,422 | A | 8/2000 | Wang et al. |
| 6,258,902 | B1 * | 7/2001 | Campbell et al. ............ 526/82 |
| 6,437,011 | B2 | 8/2002 | Steck et al. |
| 6,492,473 | B1 | 12/2002 | Canich et al. |
| 6,511,934 | B1 | 1/2003 | Cook et al. |
| 6,528,585 | B1 | 3/2003 | Standke et al. |
| 6,605,679 | B1 | 8/2003 | Wang et al. |
| 6,624,254 | B1 | 9/2003 | Arriola et al. |
| 6,689,910 | B2 | 2/2004 | Wang et al. |
| 7,087,697 | B2 | 8/2006 | Cornette et al. |

FOREIGN PATENT DOCUMENTS

| | | | |
|---|---|---|---|
| WO | WO 97/02298 | | 1/1997 |
| WO | WO 99/05189 | | 2/1999 |
| WO | WO 99/12981 | * | 3/1999 |

OTHER PUBLICATIONS

Final Office Action issued Aug. 16, 2007 in U.S. Appl. No. 10/295,606.

Non-Final Office Action issued Mar. 5, 2007 in U.S. Appl. No. 10/295,606.

Final Office Action issued Aug. 21, 2006, in U.S. Appl. No. 10/295,606.

Non-Final Office Action issued Feb. 1, 2006 in U.S. Appl. No. 10/295,606.

Final Office Action mailed Jul. 20, 2005, in U.S. Appl. No. 10/295,606.

Non-Final Office Action issued Feb. 8, 2005, in U.S. Appl. No. 10/295,606.

Final Office Action issued Sep. 1, 2004, in U.S. Appl. No. 10/295,606.

Non-Final Office Action issued Mar. 22, 2004, in U.S. Appl. No. 10/295,606.

Restriction Requirement issued Jan. 21, 2004, in U.S. Appl. No. 10/295,606.

Issued Notification dated Jan. 8, 2004 in U.S. Appl. No. 10/295,319.

Non-Final Office Action issued Jul. 30, 2003, in U.S. Appl. No. 10/295,319.

PCT International Search Report, Dated Mar. 20, 2003, International Application No. PCT/US02/36890, International Filing Date Nov. 15, 2002.

U.S. Appl. No. 10/295,319, filed Aug. 24, 2004.

U.S. Appl. No. 08/899,017, filed Jul. 23, 1997.

Notice of Allowance issued Apr. 8, 2003 in U.S. Appl. No. 09/496,114.

Non-Final Office Action issued Oct. 23, 2002, in U.S. Appl. No. 09/496,114.

Notice of Allowance issued Dec. 3, 2003 in U.S. Appl. No. 10/437,685.

Usami, Takao and Takayama, Shigeru, Fine-Branching Structure in High-Pressure, Low-Density Polyethylenes by 50.10-MHz $^{12}$C NMR Analysis, Macromolecules 1964, 17, 1758-1761, (1984).

PCT/US02/36890 International Search Report (Mar. 2003).

* cited by examiner

COPOLYMERS OF VINYL- AND ALLYLSILANES

FIELD OF THE INVENTION

Copolymers of ethylene, allyl- or vinylsilanes, and optionally other olefinic monomers, may be prepared by using selected late transition metal containing polymerization catalyst systems in the polymerization. Many of the copolymers produced are novel.

TECHNICAL BACKGROUND

Ethylene (co)polymers, which contain groups derived from vinylsilanes, are used commercially for many purposes, for example for electrical wire coating (jacketing and/or insulation layer(s)) of various types, pipes, adhesives, gasketing, and crosslinked foams. In many of these applications the silicon atom has attached to it one or more groups which can hydrolyze and then react to form a crosslinked polymer or a covalent bond to a surface.

Generally speaking the vinylsilane groups are "attached" to the ethylene polymers by one of two methods. In the first method ethylene and the vinylsilane are copolymerized at high temperature and pressures, often in the presence of a free radical generator to form a copolymer. See for instance U.S. Pat. No. 3,225,018, which is incorporated by reference herein for all purposes as if fully set forth. Some of the repeat units derived from the vinylsilane in such a copolymer are

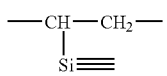
(I)

wherein Si≡ is a silyl group, and most of the rest are present as ends of chains or there are typically 2 or 4 or more methylene groups between the silicon atom and the methine carbon atom. Since this polymerization process is very similar to the so-called high pressure homopolymerization of ethylene, these copolymers have structures similar to low density polyethylene (LDPE). For an analysis of branching in LDPE, see Usami, et al., Macromolecules, vol. 17, p. 1756 et seq., (1984).

The other method of making ethylene polymers is to graft an allyl- or vinylsilane onto a preexisting polyethylene (PE). See for instance U.S. Pat. No. 3,646,155, which is also incorporated by reference herein for all purposes as if fully set forth. Grafting has the advantage that any type of PE, such as LDPE or high density polyethylene (HDPE) may be grafted. The disadvantage is that the grafting step requires the use of free radical catalysts, and is an extra step in the manufacturing process of the vinylsilane containing PE. Too little free radical catalysis and the vinylsilane is not grafted or only partly grafted, while too much free radical catalysis can result in crosslinking of the PE by conventional free radical methods. The grafted vinylsilane is usually considered to be present as a side chain on the PE having the formula —CH$_2$CH$_2$Si≡ (XIV), where the free bond to the carbon atom is the attachment point to a carbon atom of the PE chain. Similarly, one would expect that grafted allylsilanes would be present as a side chain of the formula —CH$_2$CH$_2$CH$_2$Si≡ (XIX).

PEs containing attached vinylsilanes are particularly useful because they are thermoplastics which may be formed by normal thermoplastic processing techniques until they are exposed to water, and usually also one or both of heat and catalysts for the crosslinking reactions (see for instance previously incorporated U.S. Pat. No. 3,646,155 and U.S. Pat. No. 3,225,018). Once they are crosslinked they typically behave as thermoset materials. More importantly certain properties, such as resistance to treeing (failure brought on by exposure to high voltage electrical fields), and/or stress crack resistance, and/or creep resistance, are usually improved. Thus new methods of preparing allyl- or vinylsilane containing polyolefins, especially polyethylenes, and new vinylsilane containing polyolefin compositions, are constantly being sought.

SUMMARY OF THE INVENTION

This invention concerns a process for the copolymerization of one or more hydrocarbon olefins and one or both of an allylsilane and a vinylsilane, comprising the step of contacting, under coordination polymerizing conditions:

a monomer mixture comprising ethylene or an α-olefin of the formula H$_2$C=CH(CH$_2$)$_t$CH$_3$ wherein t is 0 or an integer of 1 to 20, and one or both of an allylsilane and a vinylsilane and optionally one or more other copolymerizable olefins; and an active polymerization catalyst comprising a transition metal complex comprising a Group 8, 9, 10 or 11 (IUPAC notation) transition metal.

This invention also concerns a first copolymer comprising repeat units derived from ethylene and one or both of an allylsilane and a vinylsilane, said copolymer having a density of 0.92 g/cc or more.

Also described herein is a second copolymer comprising repeat units derived from ethylene and one or both of an allylsilane and a vinylsilane, said copolymer having at least about 10 alkyl branches per 1000 methylene groups, wherein at least about 10 percent of said alkyl branches are methyl branches.

Similarly described is a third copolymer comprising repeat units derived from ethylene and one or both of an allylsilane and a vinylsilane, said copolymer having at least 2 methyl branches per 1000 methylene groups.

Also described is a fourth copolymer comprising repeat units derived from ethylene and one or both of an allylsilane and a vinylsilane, said copolymer having a melting point of about 115° C. or higher.

Also described is a fifth copolymer comprising repeat units derived from ethylene and a vinylsilane, said copolymer containing the group

(XIII)

wherein ~~~~ represents the rest of the polymer (chain), and Si≡ is a silyl group. Note that this structure throughout this application is not meant to imply whether the olefinic bond is cis or trans.

Also described herein is a sixth copolymer of ethylene, one or both of an allylsilane and a vinylsilane, and optionally other copolymerizable monomers, containing at least 1.0 or more mole percent (total) of incorporated allylsilane and (plus) vinylsilane.

Also described herein is a copolymer comprising repeat units derived from ethylene and a vinylsilane, said copolymer containing the group

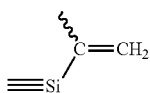

(XXI)

wherein ~~~ represents the rest of the polymer chain, and Si≡ is a silyl group.

Described herein is a copolymer comprising repeat units derived from one or more hydrocarbon olefins and a vinylsilane, said copolymer having at least about 30 alkyl branches per 1000 methylene groups, and there are also at least about 10 methyl branches per 1000 methylene groups present.

Herein is disclosed a first polyolefin containing a copolymerized olefinic silane containing the repeat unit

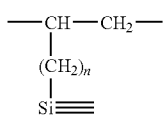

(XVI)

wherein at least about 5 mole percent of the silicon atoms in said polymer are in a repeat unit (XVI) in which n is 1, and at least about 5 mole percent of the silicon atoms in said polymer are in a repeat unit (XVI) in which n is 3, wherein said percentage is based on all the silicon atoms in said polymer except those in olefinic silicon containing end groups.

Also disclosed herein is a second polyolefin containing a copolymerized olefinic silane containing the repeat unit

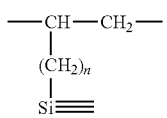

(XVI)

wherein at least about 5 mole percent of the silicon atoms in said polymer are in a repeat unit (XVI) in which n is 1, and at least about 5 mole percent of the silicon atoms in said polymer are in a repeat unit (XVI) in which n is 0, wherein said percentage is based on all the silicon atoms in said polymer except those in olefinic silicon containing end groups.

Also disclosed herein is a third polyolefin containing a copolymerized olefinic silane containing the repeat unit

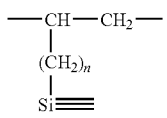

(XVI)

wherein at least about 70 mole percent of the silicon atoms in said polymer are in a repeat unit (XVI) in which n is 0, wherein said percentage is based on all the silicon atoms in said polymer except those in olefinic silicon containing end groups.

These and other features and advantages of the present invention will be more readily understood by those of ordinary skill in the art from a reading of the following detailed description. It is to be appreciated that certain features of the invention which are, for clarity, described below in the context of separate embodiments, may also be provided in combination in a single embodiment. Conversely, various features of the invention which are, for brevity, described in the context of a single embodiment, may also be provided separately or in any subcombination.

DETAILED DESCRIPTION OF THE PREFERRED EMBODIMENTS

Figure 1:
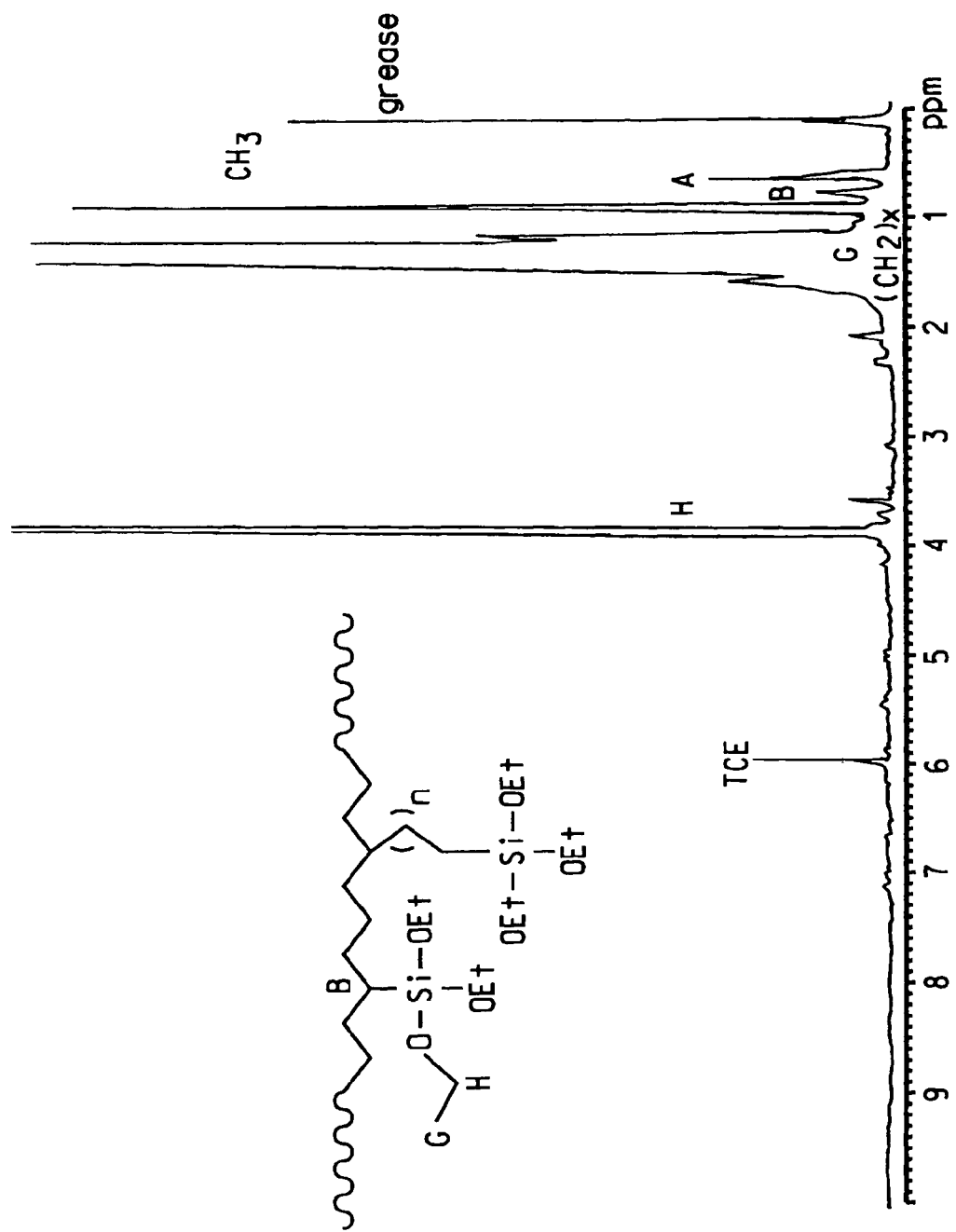
FIG. 1 shows the $^1$H NMR spectrum of a typical ethylene/vinyltriethoxysilane copolymer of the invention, with assignments of some of the peaks in the spectrum.

Herein certain terms are used, and some of them are:

A "hydrocarbyl group" is a univalent group containing only carbon and hydrogen. If not otherwise stated, it is preferred that hydrocarbyl groups herein preferably contain 1 to about 30 carbon atoms.

By "substituted hydrocarbyl" herein is meant a hydrocarbyl group that contains one or more substituent groups which are inert under the process conditions to which the compound containing these groups is subjected (e.g., an inert functional group, see below). The substituent groups also do not substantially detrimentally interfere with the polymerization process or operation of the polymerization catalyst system. If not otherwise stated, it is preferred that substituted hydrocarbyl groups herein contain 1 to about 30 carbon atoms. Included in the meaning of "substituted" are chains or rings containing one or more heteroatoms, such as nitrogen, oxygen and/or sulfur, and the free valence of the substituted hydrocarbyl may be to the heteroatom. In a substituted hydrocarbyl, all of the hydrogens may be substituted, as in trifluoromethyl.

By "(inert) functional group" herein is meant a group other than hydrocarbyl or substituted hydrocarbyl which is inert under the process conditions to which the compound containing the group is subjected. The functional groups also do not substantially interfere with any process described herein that the compound in which they are present may take-part in. Examples of functional groups include halo (fluoro, chloro, bromo and iodo), ether such as —$OR^{25}$, —$CO_2R^{22}$; —$NO_2$, and —$NR^{22}_2$, wherein each $R^{22}$ is independently hydrocarbyl or substituted hydrocarbyl. In cases in which the functional group may be near a transition metal atom the functional group should not coordinate to the metal atom more strongly than the groups in compounds which are shown as coordinating to the metal atom, that is they should not displace the desired coordinating group.

By a "cocatalyst" or a "catalyst activator" is meant a compound that reacts with a transition metal compound to form an activated catalyst species. One such catalyst activator is an "alkyl aluminum compound" which, herein, is meant a compound in which at least one alkyl group is bound to an aluminum atom. Other groups such as, for example, alkoxide, hydride, bridging oxygen atom, and halogen may also be bound to aluminum atoms in the compound.

By relatively noncoordinating (or weakly coordinating) anions are meant those anions as are generally referred to in the art in this manner, and the coordinating ability of such anions is known and has been discussed in the literature, see for instance W. Beck., et al., Chem. Rev., vol. 88 p. 1405-1421 (1988), S. H. Strauss, Chem. Rev., vol. 93, p. 927-942 (1993), and E. Y.-X. Chen, et al., Chem. Rev., vol. 100, p. 1391-143

(2000), all of which are hereby included by reference. Among such anions are those formed from the aluminum compounds in the immediately preceding paragraph and $X^-$ including $R^9_3AlX^-$, $R^9_2AlClX^-$, $R^9AlCl_2X^-$, and "$R^9AlOX^-$", wherein $R^9$ is alkyl and X is an anion abstracted from the transition metal, such as halide or methyl. Other useful noncoordinating anions include $BAF^-$ {BAF=tetrakis[3,5-bis(trifluoromethyl)phenyl]borate}, $SbF_6^-$, $PF_6^-$, and $BF_4^-$, trifluoromethanesulfonate, p-toluenesulfonate, $(R_fSO_2)_2N^-$, and $(C_6F_5)_4B^-$.

By "aryl" is meant a monovalent aromatic group in which the free valence is to the carbon atom of an aromatic ring. An aryl may have one or more aromatic rings which may be fused, connected by single bonds or other groups, such as 9-anthracenyl or 1-naphthyl. Unless otherwise stated aryl groups preferably contain 5 to 30 carbon atoms.

By "substituted aryl" is meant a monovalent aromatic group substituted as set forth in the above definition of "substituted hydrocarbyl". Suitable substituents include alkyl, aryl such as phenyl, halo, alkoxy, ester, dialkylamino and nitro. Similar to an aryl, a substituted aryl may have one or more aromatic rings which may be fused, connected by single bonds or other groups; however, when the substituted aryl has a heteroaromatic ring, the free valence in the substituted aryl group can be to a heteroatom (such as nitrogen) of the heteroaromatic ring instead of a carbon. Unless otherwise stated, substituted aryl groups contain 5 to about 30 carbon atoms.

By a "monoanionic ligand" is meant a ligand with one negative charge.

By a "neutral ligand" is meant a ligand that is not charged.

"Alkyl group" and "substituted alkyl group" have their usual meaning (see above for substituted under substituted hydrocarbyl). Unless otherwise stated, alkyl groups and substituted alkyl groups preferably have 1 to about 30 carbon atoms.

By a "norbornene-type monomer" is meant ethylidene norbornene, dicyclopentadiene, or a compound of the formula (VI)

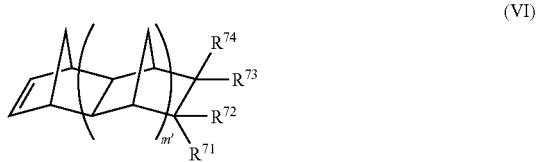

(VI)

wherein m' is an integer from 0 to 5, and each of $R^{71}$ to $R^{74}$ independently represents a hydrogen, hydrocarbyl, substituted hydrocarbyl or a functional group. The norbornene may be also substituted by one or more hydrocarbyl, substituted hydrocarbyl or functional groups in other positions, with the exception of the vinylic hydrogens, which remain. Two or more of $R^{71}$ to $R^{74}$ may also be taken together to form a cyclic group. Norbornene (itself), dimethyl endo-norbornene-2,3-dicarboxylate, t-butyl 5-norbornene-2-carboxylate are preferred norbornenes and norbornene (itself) is especially preferred. Another type of preferred norbornene contains fluorinated alkyl(ene) groups.

By a "vinylsilane" is meant a compound in which at least one vinyl group ($-CH=CH_2$) is bonded directly to a silicon atom. Other groups may also be bonded to the silicon atom(s) present, and the compound may contain more than one silicon atom.

By an "allylsilane" is meant a compound in which at least one allyl group ($-CH_2CH=CH_2$) is bonded directly to a silicon atom. Other groups may also be bonded to the silicon atom(s) present, and the compound may contain more than one silicon atom.

By an "alkyl branch" is meant a branch which is an alkyl group, and does not for instance contain a silicon or any other heteroatom (atoms other than carbon and hydrogen).

By a "bidentate ligand" herein is meant a ligand that has at least two heteroatoms (or heteroatom containing groups) and which are in mutual positions where they may potentially coordinate to the transition metal. Such heteroatoms include O, S, N, P and Se, and the heteroatoms may be independently selected. Alternatively one or both of the coordination sites in a bidentate ligand may have a carbon atom present.

By a "tridentate ligand" herein is meant a ligand that has at least three heteroatoms (or heteroatom containing groups) which are in mutual positions where they may potentially coordinate to the transition metal. Such heteroatoms include O, S, N, P and Se, and the heteroatoms may be independently selected. Alternatively one or more of the coordinating atoms in a tridentate ligand may be carbon atoms.

By a "heteroatom connected monovalent radical" is meant a substituted hydrocarbyl which is a monovalent radical or group which is connected to the rest of the compound through a valence of a heteroatom (an atom other than C and H). The group may be more than monovalent if it is part of a ring connected by a bridging group.

By "under coordination polymerization conditions" is meant the conditions for a coordination polymerization that are usually used for the particular polymerization catalyst system being used (except as otherwise indicated herein). These conditions include things such as pressure, temperature, catalyst and cocatalyst (if present) concentrations, the type of process such as batch, semibatch, continuous, gas phase, solution or liquid slurry etc., except as modified by conditions specified or suggested herein. Conditions normally done or used with the particular polymerization catalyst system, such as the use of hydrogen for polymer molecular weight control, are also considered "under polymerization conditions". Other polymerization conditions such as the presence of other polymerization catalysts, etc., are applicable with this polymerization process and may be found in the references cited herein.

By "$E_S$" is meant a parameter to quantify steric effects of various groupings, see R. W. Taft, Jr., *J. Am. Chem. Soc.*, vol. 74, p. 3120-3128 (1952), and M. S. Newman, *Steric Effects in Organic Chemistry*, John Wiley & Sons, New York, 1956, p. 598-603, which are both hereby included by reference. For the purposes herein, the $E_S$ values are those described for o-substituted benzoates in these publications. If the value of $E_S$ for a particular group is not known, it can be determined by methods described in these references.

By a "polyolefin containing a copolymerized olefinic silane" is meant a polymer comprising repeat units derived from a hydrocarbon olefin (an olefin containing only carbon or hydrogen) and an olefinic silane, that is an olefin containing a silyl group. Such olefinic silanes include vinylsilanes, allylsilanes and alkenylsilanes. Preferably the hydrocarbon olefin is ethylene and/or an α-olefin of the formula $H_2C=CH(CH_2)_tCH_3$ wherein t is 0 or an integer of 1 to 20, and more preferably the hydrocarbon olefin is ethylene. The choice of t being an integer of 1 to 20 does not preclude the presence of spontaneous long chain branching in the resulting polymers. Other copolymerizable olefins may be present (in copolymers with alkenylsilanes, allylsilanes and/or vinylsilanes), such as acrylate esters, esters of the formula $H_2C=CHR^{75}CO_2R^{76}$ wherein $R^{75}$ is alkylene, preferably n-alkylene, and $R^{76}$ is hydrocarbyl or substituted hydrocarbyl, and vinyl ketones.

Other useful hydrocarbon olefins include norbornene, and cyclopentene. Another type of olefin is a fluorinated olefin, particularly a fluorinated olefin which have no vinylic fluorine atoms. A particularly useful type of such fluorinated monomer has the formula $H_2C=CH(CH_2)_a(CF_2)_bF$ wherein a is an integer of 2 to 20 and b is an integer of 1 to 20. When fluorinated monomers are included within the polymer produced, the surface properties of the polymer may be modified, for instance hydrophilicity and/or lipophilicity. It will be understood that not all types of transition metal complexes will copolymerize some or all of the above comonomers. References to these complexes as polymerization catalysts, as for instance cited herein, often have information on what comonomers can be copolymerized by these complexes. Another copolymerizable monomer which may be present is carbon monoxide.

In the context of the present invention, the use of "a" or "an" refers to one or more unless otherwise specifically stated. For example, "a vinylsilane" or "an allylsilane" refers to one or more vinylsilanes or allylsilanes respectively.

Also in the context of the present invention, the use of "comprising" is open-ended as in its normal meaning, unless otherwise specifically stated. For example, "a monomer mixture comprising ethylene and a vinylsilane" may also include one or more other copolymerizable monomers, as discussed further below. As another example, "an active polymerization catalyst comprising a transition metal complex" may include the complex itself if such complex is in and of itself an active polymerization catalyst, or may also include one or more cocatalysts as required to activate such complex.

The polymerization catalyst systems used herein include a Group 8, 9, 10 or 11 transition metal. In one preferred variation with a Group 8, 9, 10, or 11 transition metal complex the transition metal atom is coordinated to a bidentate ligand. In another preferred variation with a Group 8 or 9 transition metal, the transition metal is complexed with a tridentate ligand. When the complex contains a bidentate ligand (other than including acetonylacetonate, π-allyl or π-benzyl groups) preferred transition metals are Ni, Fe, Cu and Pd, Pd and Ni are very preferred, and Ni is especially preferred. When the complex contains a tridentate ligand, preferred transition metals are Fe and Co, and Fe is especially preferred.

The present invention concerns the copolymerization of olefins with one or both of allylsilanes and vinylsilanes. Vinylsilanes are preferred.

Generally vinylsilanes (and to a lesser extent allylsilanes) may become parts of a polymer by either being copolymerized or being grafted onto a polymer. Herein the word "copolymerized" means the silane is a monomer that is copolymerized into the polymer when the polymer is originally formed from its constituent monomers. Herein the product of this polymerization is referred to as a copolymer. When the silane is attached to an already formed polymer, most commonly by using free radically catalyzed reactions, the polymer is referred to herein as a graft or grafted polymer. This grafted polymer may itself be a copolymer (formed originally from two or more monomers), but the allyl- or vinylsilane attached to the polymer did not become attached to the polymer until after the polymer was formed.

Bidentate ligands suitable for the nickel and palladium complexes include neutral and monoanionic ligands. Examples of suitable neutral ligands, transition metal complexes thereof, methods of making such ligands and complexes and active polymerization catalysts, and polymerization processes involving the same, are described in US-A-2001025244, U.S. Pat. No. 5,714,556, U.S. Pat. No. 5,852,145, U.S. Pat. No. 5,880,241, U.S. Pat. No. 5,955,555, U.S. Pat. No. 6,030,917, U.S. Pat. No. 6,034,240, U.S. Pat. No. 6,090,900, U.S. Pat. No. 6,103,658, U.S. Pat. No. 6,232,259, U.S. Pat. No. 6,200,925, U.S. Pat. No. 6,242,377, U.S. Pat. No. 6,262,194, U.S. Pat. No. 6,372,682, JP-A-09025713, JP-A-11158213, JP-A-11158214, WO9847934, WO9849208, WO0006620, WO0018776, WO0020377, WO0021971, WO0050470, WO0050474, WO0059956, WO0059961, WO0068280, WO0110876, WO0125298, WO0142257, WO0174743, WO0174831, WO0187996, WO0216033, and U.S. Provisional Application Ser. No. 60/294,794 (filed May 31, 2001), all of which are hereby incorporated by reference herein for all purposes as if fully set forth.

Examples of suitable monoanionic ligands, transition metal complexes thereof, methods of making such ligands and complexes and active polymerization catalysts, and polymerization processes involving the same, are described in U.S. Pat. No. 6,057,466, U.S. Pat. No. 6,060,569, U.S. Pat. No. 6,174,975, U.S. Pat. No. 6,174,976, U.S. Pat. No. 6,184,428, U.S. Pat. No. 6,245,871, U.S. Pat. No. 6,242,623, WO0020377, WO0056785, WO0059956, WO0119786, WO0130865, WO0172854, WO0144324, WO0144325, WO183571, WO0192347, WO0208236, EP-A-0950667, EP-A-1101768, JP-A-11199592, JP-A-11199593, JP-A-2000086677, JP-A-2000028170, U.S. patent application Ser. No. 09/871,099 (filed May 31, 2001), U.S. patent application Ser. No. 09/871,100 (filed May 31, 2001), and U.S. Provisional Application Ser. No. 60/308,974 (filed Jul. 31, 2001), all of which are hereby incorporated by reference herein for all purposes as if fully set forth.

Other useful general references on late transition metal polymerization catalysts and processes are S. D. Ittel, L. K. Johnson and M. Brookhart, *Chem. Rev.,* 2000, 100, 1169, and G. J. P. Britovsek, et al., Angew. Chem. Int. Ed., vol. 38, p. 428-447 (1999), which are both hereby included by reference. Besides describing the ligands and complexes and how to make them, most of these references also describe the types of olefins that may be polymerized, conditions for activating the transition metal complexes (where needed), useful cocatalyst(s), and other polymerization conditions (e.g., pressure, temperature). These and many other references describe variations on the use of these polymerization catalysts, such as the use of supports, chain transfer agents, mixed (two or more) catalysts, process types (for example gas phase, liquid slurry, etc.). The conditions described in these documents for carrying out the polymerizations, particularly polymerizations of ethylene, are also applicable to the first process described herein.

In solution or slurry polymerizations-organic liquids are usually used as the slurrying medium or solvent (sometimes collectively referred to herein as the solvent). By a solution polymerization is meant the polymer produced is soluble in the solvent during the polymerization, while by a slurry polymerization is meant that the produced polymer is (largely) insoluble in the liquid (solvent) present. The nature of the polymerization does not necessarily imply the state of the catalyst, though most commonly an insoluble heterogeneous catalyst will be used for a slurry polymerization, and a soluble catalyst will be used for a solution polymerization. Useful solvents preferably include organic compounds which are liquids under the polymerization process conditions, which are relatively inert to the process ingredients, and do not interfere substantially with the polymerization process. Such useful compounds include hydrocarbons such as toluene, xylene, hexane, isobutane, cyclohexane, pentane and 2,2,4-trimethylpentane, halocarbons such a trichlorobenzene, and can include mixed solvents which include compounds such as ethyl acetate and diethyl ether. Preferred solvents are hydrocarbons, and preferred hydrocarbons are saturated hydrocarbons, that is hydrocarbon compounds which do not contain olefinic, acetylenic or aromatic unsaturation. Such compounds include hexane, isobutane, cyclohexane, pentane, and 2,2,4-trimethylpentane. For example in some instances incorporation of vinyltrialkoxysilanes into some ethylene copolymers is improved when saturated hydrocarbons are used as the solvent.

Preferred bidentate ligands are either neutral or monoanionic.

Preferred neutral ligands are α-diimines, such as those described in previously incorporated U.S. Pat. No. 5,880,241, U.S. Pat. No. 6,103,658, WO0050470 and WO0142257. By an "α-diimine" in a general sense is meant a compound having the structure

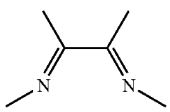

(II)

wherein the free bond to the carbon atoms are any organic grouping (including an organic grouping which is attached to the carbon atom through a heteroatom and/or is cyclic in nature involving both such carbon atoms) halogen, or hydrogen, and the free bonds to nitrogen are any organic grouping (including an organic grouping which is attached to the carbon atom through a heteroatom). In one particularly preferred form (II) has the formula

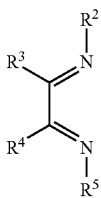

(V)

wherein:

$R^2$ and $R^5$ are each independently hydrocarbyl or substituted hydrocarbyl, provided that the atom in $R^2$ and $R^5$ bound to the imino nitrogen atom has at least two carbon atoms bound to it; and $R^3$ and $R^4$ are each independently hydrogen, hydrocarbyl, a heteroatom connected monovalent radical, or substituted hydrocarbyl, or $R^3$ and $R^4$ taken together are a heteroatom connected divalent radical, hydrocarbylene or substituted hydrocarbylene to form a ring.

When a heteroatom is present in one or more of groups $R^2$, $R^3$, $R^4$ or $R^5$, that heteroatom is preferably from Group 14 (other than carbon and especially Si), 15 16 or 17 of the Periodic Chart (IUPAC) and, more preferably, N, O, F, Cl or Br.

In general, specific preferred ligands (V) are those preferred in previously incorporated U.S. Pat. No. 5,880,241, U.S. Pat. No. 6,103,658, WO0050470 and WO0142257.

Preferably $R^2$ and $R^5$ are o-disubstituted (hetero)aryl groups (that is the positions next to the atom of the (hetero) aryl atom bound to the imino nitrogen atom are both substituted). A preferred type of group for $R^2$ and $R^5$ is a 2,6-disubstituted phenyl group, with the other positions on the phenyl ring optionally substituted. Such useful groups include 2,6-dimethylphenyl, 2,4,6-trimethylphenyl, 2,6-dichlorophenyl, 2,6-diisopropylphenyl, 2,6-dimethoxyphenyl, 2-chloro-6-methoxyphenyl, 2,6-dibromophenyl, 2-methyl-6-methoxyphenyl, 2-chloro-6-methylphenyl, 2-bromo-6-methylphenyl, and 2,6-diphenylphenyl groups in which with 2- and 6-phenyl groups are optionally substituted. Also useful are heteroatom connected monovalent radicals such a pyrryl or substituted pyrryl groups, especially 2,5-disubstituted pyrryl groups.

A preferred grouping for $R^3$ and $R^4$ being taken together to form a ring is

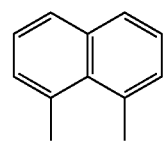

(VI)

herein abbreviated "An".

A useful neutral ligand is

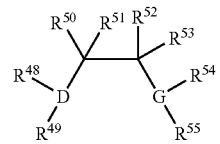

(XII)

wherein:

G is nitrogen or oxygen; and

D is nitrogen or phosphorous;

provided that:

when D is phosphorous and G is nitrogen: $R^{48}$ and $R^{49}$ are each independently hydrocarbyl or substituted hydrocarbyl having an $E_S$ of about −0.90 or less; $R^{50}$, $R^{51}$, $R^{52}$, $R^{53}$ and $R^{54}$ are each independently hydrogen, hydrocarbyl or substituted hydrocarbyl; and $R^{55}$ is aryl or substituted aryl, provided that any two of $R^{50}$, $R^{51}$, $R^{52}$, $R^{53}$, $R^{54}$ and $R^{55}$ vicinal or geminal to one another together may form a ring;

when D is phosphorous and G is oxygen: $R^{48}$ and $R^{49}$ are each independently hydrocarbyl or substituted hydrocarbyl having an $E_S$ of about −0.90 or less; $R^{50}$ and $R^{51}$ are each independently hydrogen, hydrocarbyl or substituted hydrocarbyl; $R^{52}$ and $R^{54}$ taken together form a double bond; $R^{55}$ is not present; and $R^{53}$ is —$OR^{56}$, —$NR^{57}R^{58}$, hydrocarbyl or substituted hydrocarbyl, wherein $R^{56}$ is hydrocarbyl or substituted hydrocarbyl, and $R^{57}$ and $R^{58}$ are each independently hydrogen, hydrocarbyl or substituted hydrocarbyl;

when D is nitrogen: $R^{48}$ is hydrocarbyl or substituted hydrocarbyl having an $E_S$ of about −0.90 or less; $R^{49}$ and $R^{50}$ are each independently hydrogen, hydrocarbyl or substituted hydrocarbyl, or taken together form a ring or a double bond; $R^{51}$ is hydrogen, hydrocarbyl or substituted hydrocarbyl; G is oxygen; $R^{53}$ and $R^{54}$ taken together form a double bond; $R^{55}$ is not present; $R^{52}$ is —$OR^{59}$, —$R^{60}$ or —$NR^{61}R^{62}$, wherein $R^{59}$ and $R^{60}$ are each independently hydrocarbyl or substituted hydrocarbyl, and $R^{61}$ and $R^{62}$ are each hydrogen, hydrocarbyl or substituted hydrocarbyl; provided that when $R^{49}$ and $R^{50}$ taken together form an aromatic ring, $R^{48}$ and $R^{51}$ are not present.

Ligands of the formula (XII) can be found in previously incorporated U.S. Provisional Application Ser. No. 60/294, 794 (filed May 31, 2001), along with methods of making these ligands and their transition metal complexes and methods for using these complexes in olefin polymerizations. Preferred ligands (XII) herein are the same as those preferred in previously incorporated U.S. Provisional Application Ser. No. 60/294,794 (filed May 31, 2001).

Preferably when a neutral bidentate ligand is coordinated to the transition metal atom, and particularly when a single neutral bidentate ligand is coordinated to a metal atom having a +2 oxidation state, it is preferred that the transition metal complex has the formula

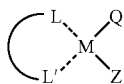

(XVII)

wherein

(XVIII)

is a neutral bidentate ligand, M is a Group 8, 9, or 10 transition metal, preferably Ni or Pd, especially preferably Ni. A cocatalyst for this system may be a Lewis acid or a protic acid whose anion is a relatively noncoordinating anion. If it is a Lewis acid, the Lewis acid should be a strong enough Lewis acid to abstract a Q or Z anion, and with that abstraction a relatively noncoordinating anion is formed. Preferably the molar ratio of the Lewis acid to (XVII) is about 500:1 to about 1:1, more preferably about 100:1 to about 2:1, while the ratio of protic acid to (XVII) is about 0.2:1 to about 10:1, more preferably about 0.5:1 to about 2:1. Using this combination of transition metal complex and cocatalyst often results in higher copolymer productivity and/or higher polymer molecular weights. Preferred groups for Q and/or Z are halide (chloride or bromide for example), π-allyl, acetylacetonate, aryl (anion such a phenyl), methyl, trialkylsilyl, and (trialkylsilyl)alkyl, especially preferred are (trimethylsilyl)methyl, and methyl, and (trimethylsilyl)methyl is very preferred. Useful Lewis acids include tris(pentafluorophenyl)borane, tris[3,5-bis(trifluoromethyl)phenyl]borane, triphenylborane, methyl-bis(butylated hydroxytoluene)aluminum, and di-i-butyl(pentafluorophenoxy)aluminum. Useful cationic activators include hydrogen tetrakis[3,5-bis(trifluoromethyl)phenyl]borate, hydrogen tetrakis(pentafluorophenyl)borate, [HNMe$_2$Ph]$^+$ [B(C$_6$F$_5$)$_4$]$^-$, [AlMe$_2$(Et$_2$O)$_2$]$^+$[MeB(C$_6$F$_5$)$_3$]$^-$, and (Ph$_3$C)$^+$ {B[(3,5-CF$_3$)$_2$—C$_6$H$_4$]$_4$}. These cationic catalysts are especially useful for activating transition metal complexes which have alkyl groups bound to the transition metal, such as a nickel [II] complex which has two methyl anions bound to the Ni atom. A preferred combination of activators is a Lewis acid, and an alkali metal salt of a noncoordinating anion. This combination often has higher polymer productivity than the Lewis acid alone. For example one could use a combination of the Lewis acid tris(pentafluorophenyl)borane and the salt NaBAF. A typical molar ratio for a polymerization would be Lewis acid:alkali metal salt:transition metal of about 5:1:1. It also has the advantage of requiring small amounts of Lewis acid, thereby decreasing the chances of premature crosslinking of the polymer product (see below).

Useful monoanionic bidentate ligands are:

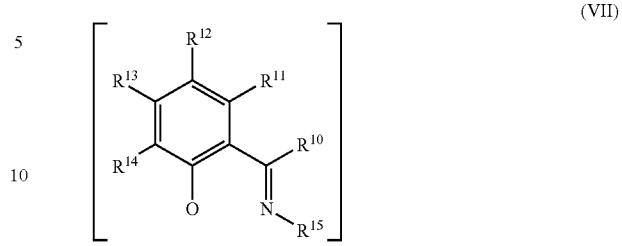

(VII)

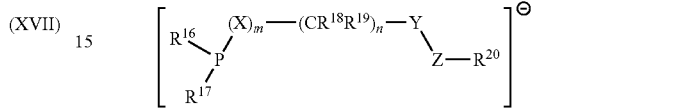

(VIII)

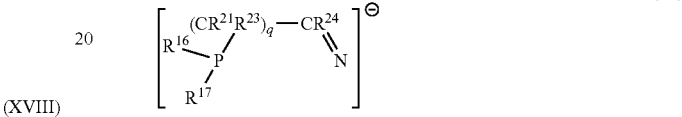

(IX)

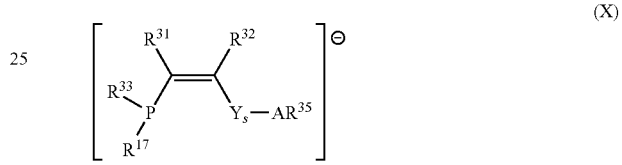

(X)

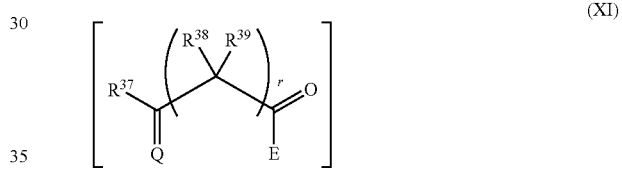

(XI)

wherein:

$R^{10}$ is hydrogen, hydrocarbyl or substituted hydrocarbyl;

$R^{11}$, $R^{12}$, $R^{13}$, and $R^{14}$ are each independently hydrogen, hydrocarbyl, substituted hydrocarbyl, an inert functional group, and provided that any two of these groups vicinal to one another taken together may form a ring;

$R^{15}$ is hydrocarbyl, substituted hydrocarbyl or a heteroatom connected monovalent radical;

$R^{16}$ and $R^{17}$ are each independently hydrocarbyl, substituted hydrocarbyl or a functional group;

Y is $CR^{25}R^{26}$, S(T), S(T)$_2$, P(T)Q, $NR^{36}$ or $NR^{36}NR^{36}$;

X is O, $CR^{27}R^{28}$ or $NR^{27}$;

A is O, S, Se, N, P or As;

Z is O, S, Se, N, P or As;

each Q is independently hydrocarbyl or substituted hydrocarbyl;

$R^{18}$, $R^{19}$, $R^{27}$, $R^{28}$, $R^{25}$ and $R^{26}$ are each independently hydrogen, hydrocarbyl, substituted hydrocarbyl or a functional group;

$R^{20}$ is hydrogen, hydrocarbyl, substituted hydrocarbyl or a functional group, provided that when Z is O, S or Se, $R^{20}$ is not present;

$R^{21}$ and $R^{23}$ are each independently hydrogen, hydrocarbyl, substituted hydrocarbyl or a functional group;

$R^{24}$ is hydrogen, hydrocarbyl, substituted hydrocarbyl or a functional group;

each T is independently =O or =NR$^{30}$;

$R^{30}$ is hydrogen, hydrocarbyl, substituted hydrocarbyl or a functional group;

$R^{31}$ and $R^{32}$ are each independently hydrogen, hydrocarbyl, substituted hydrocarbyl or a functional group;

$R^{33}$ and $R^{34}$ are each independently hydrocarbyl or substituted hydrocarbyl, provided that each is independently an aryl substituted in at least one position vicinal to the free bond of the aryl group, or each independently has an $E_S$ of $-1.0$ or less;

$R^{35}$ is hydrogen, hydrocarbyl, substituted hydrocarbyl or a functional group, provided that when A is O, S or Se, $R^{35}$ is not present;

each $R^{36}$ is independently hydrogen, hydrocarbyl, substituted hydrocarbyl or a functional group;

m is 0 or 1;
s is 0 or 1;
n is 0 or 1; and
q is 0 or 1;

and provided that:

any two of $R^{18}$, $R^{19}$, $R^{27}$, $R^{28}$, $R^{21}$, $R^{23}$, $R^{25}$ and $R^{26}$ bonded to the same carbon atom taken together may form a functional group;

any two of $R^{16}$, $R^{17}$, $R^{18}$, $R^{19}$, $R^{27}$, $R^{28}$, $R^{20}$, $R^{21}$, $R^{23}$, $R^{25}$, $R^{26}$, $R^{31}$, $R^{32}$, $R^{33}$, $R^{34}$, $R^{35}$ and $R^{36}$ bonded to the same atom or vicinal to one another taken together may form a ring; and when said ligand is (VIII), Y is C(O), E is O, and $R^{16}$ and $R^{17}$ are each independently hydrocarbyl, then $R^{16}$ and $R^{17}$ are each independently an aryl substituted in one position vicinal to the free bond of the aryl group, or $R^{16}$ and $R^{17}$ each independently have an $E_S$ of $-1.0$ or less;

Q is oxo, $NR^{41}$ or $PR^{41}$
Z is O, $NR^{42}$, S or $PR^{42}$;

each of $R^{37}$, $R^{38}$ and $R^{39}$ is independently hydrogen, hydrocarbyl, substituted hydrocarbyl or a functional group;

r is 0 or 1;

each $R^{41}$ is independently hydrogen, hydrocarbyl, substituted hydrocarbyl or a functional group;

each $R^{42}$ is independently hydrogen, hydrocarbyl, substituted hydrocarbyl or a functional group;

and provided that any two of $R^{37}$, $R^{38}$ and $R^{39}$ geminal or vicinal to one another taken together may form a ring.

Ligands of the formula (VII) can be found in previously incorporated U.S. Pat. No. 6,174,975, and WO0056785, along with methods of making these ligands and their transition metal complexes and methods for using these complexes in olefin polymerizations. Preferred ligands (VII) are those preferred in previously incorporated U.S. Pat. No. 6,174,975 Ligands of the formula (VIII), (IX) and (X) can be found in previously incorporated U.S. patent application Ser. No. 09/871,099 (filed May 31, 2001), along with methods of making these ligands and their transition metal complexes and methods for using these complexes in olefin polymerizations. Preferred ligands (VIII), (IX) and (X) are those preferred in previously incorporated U.S. patent application Ser. No. 09/871,099 (filed May 31, 2001).

Ligands of the formula (XI) can be found in previously incorporated U.S. patent application Ser. No. 09/871,100 (filed May 31, 2001), along with methods of making these ligands and their transition metal complexes and methods for using these complexes in olefin polymerizations. Preferred ligands (XI) are those preferred in previously incorporated U.S. patent application Ser. No. 09/871,100 (filed May 31, 2001).

Iron or cobalt complexes, preferably an iron complexes, of a bisimine of a 2,6-diacylpyridine or a bisimine of a 2,6-pyridinedicarboxaldehyde, both are neutral tridentate ligands, are also useful as part of the polymerization catalyst system. References describing these catalysts include, for example, U.S. Pat. No. 5,955,555, WO9912981 and WO0050470, all of which are hereby incorporated by reference herein for all purposes as if fully set forth. Other types of useful tridentate ligands are found in U.S. Pat. No. 6,281,303, U.S. Pat. No. 6,294,495, U.S. Pat. No. 6,313,243, U.S. Pat. No. 6,339,161, U.S. Pat. No. 6,365,690, U.S. Pat. No. 6,369,177, WO0158874, WO0158966, WO0168726, WO0174830 and WO0177186, all of which are hereby included by reference. In addition these and numerous other references describe the synthesis of the ligands and their transition metal complexes as well as the use of the complexes in various polymerization processes. The polymerizations with these complexes may be run similar to the conditions described in these references, using the same types of process conditions (temperature, pressure, etc.), methods of activating the transition metal complex (if necessary), type of process (gas, slurry or solution), etc.

Preferred bisimines of 2,6-diacylpyridines or 2,6-pyridinedicarboxaldehydes are the same as those preferred compound as described in previously incorporated U.S. Pat. No. 5,955,555, WO9912981 and WO0050470. Other preferred bisimines of diacylpyridines are 2,6-(bis-1-(N-(2,4,6-trimethylphenyl)imino)ethyl)pyridine and 2,6-(bis-1-(N-(2,6-dimethyl-4-t-butylphenyl)imino)ethyl)pyridine. It is preferred that a bidentate ligand, particularly a neutral bidentate ligand, have bonded to it an olefinic group, such as an allyl group.

Polymerizations may be carried out for catalysts based on these ligands in the manner and under the conditions generally set out in the aforementioned incorporated references. It is, however, particularly noteworthy that it is often preferred to carry out the first process at temperatures somewhat higher than are used for many of the ethylene homopolymerizations described in these references. This often results in higher incorporations of the allyl- or vinylsilane into the copolymers. Typically these "higher" temperature range from about 50° C. to about 250° C., preferably about 50° C. to about 180° C., more preferably about 60° to about 140° C.

Particularly depending upon the catalyst and type of polymerization process used, and the product desired (for example, level of branching, allyl- or vinylsilane incorporation, and polymer molecular weight) optimum conditions for any particular polymerization may vary. The examples described herein, together with information in available references, allow one to optimize the first process with relatively little experimentation. Generally speaking the higher the relative concentration of allyl- or vinylsilane present in the first process, the higher the amount of allyl- or vinylsilane which will be incorporated into the final polymer product.

Although the polymerization may be run in gas phase, solution or liquid slurry, it is often preferred to run it in solution or liquid slurry because of the relatively low volatility of the allyl- and vinylsilanes.

In the polymerization process in general, one or more other (than allyl or vinyl) alkenylsilanes may be present in place of or in addition to the vinylsilane(s). By an "alkenylsilane" herein is meant a silicon compound having the (partial) formula $H_2C=CHR^{72}Si\equiv$, wherein $R^{72}$ is alkylene containing two or more carbon atoms. In a preferred compound, $R^{72}$ is $-(CH_2)_f-$ wherein f is an integer of 2 to 20. The preferred groups (other than the alkenyl group or allyl group or vinyl group) are the same as listed below for the vinylsilanes.

In the polymerization process in general, but in particular when a bidentate ligand is present as part of the transition metal complex other copolymerizable monomers may also be present. These include α-olefins, preferably of the formula $H_2C=CHR^{70}$, wherein $R^{70}$ is n-alkyl containing 1 to 19 carbon atoms and it is more preferred that $R^{70}$ is methyl, n-butyl or n-hexyl; a norbornene; a compound of the formula $H_2C\!=\!CH(CH_2)_dC(O)R^{71}$ or $H_2C\!=\!CH(CH_2)_dR^{73}$ wherein d is 0 or an integer of 1 to 20, preferably 0, and $R^{71}$ is hydrocarbyloxy, preferably alkoxy, substituted hydrocarbyloxy, siloxy, hydroxyl, and $R^{73}$ is hydrogen or $-C(O)R^{74}$ wherein $R^{74}$ is hydrocarbyl or substituted hydrocarbyl; and cyclic olefins such as cyclopentene and substituted cyclopentenes. The structures of all these polymers with respect to the ethylene and allyl- or vinylsilane units present are similar to those for polymers containing repeat units derived from only ethylene and one or more allyl- or vinylsilanes.

In the present polymerization process, allyl- or vinylsilanes are particularly useful in the polymerization, because they yield benefits other than merely copolymerizing the silane into the resulting polyolefin. It has been found that allyl- or vinylsilanes, particularly allyl- or vinylsilanes in which at least one alkoxy group is bound to the silicon atom, often give higher yields of ethylene copolymers than when no such allyl- or vinylsilanes are present, or when other alkenylsilanes are present. Also the incorporation of the allyl- or vinylsilane, especially the vinylsilane, into the copolymer, is higher than other similar alkenylsilanes. See Tables 33 and 34 for some of these effects.

Another unusual aspect of the copolymerization of vinylsilanes is that one would expect (without so-called chain walking) that the repeat unit derived from the vinylsilane would be (I). From an allylsilane one would expect a similar repeat unit, (XIX). However chain walking usually takes place in the process when a neutral or monoanionic bidentate ligand is present as part of the transition metal complex, resulting in the vinylsilanes being present in branches of the formula $-(CH_2)_eSi\!\equiv\!$ wherein e is an integer of 1 or more. Analogous structures are formed from allylsilanes, where without chain walking e would be 1, but structures in which e is 0 or 2 or more are found. This is indicative of chain walking of the active metal center away from the silicon atom, and it happens to an unusually high degree compared to other functional (or polar) olefins that are copolymerized by these catalysts. It is believed that the longer the branches on a polyethylene or other polyolefin, the more effective the branches are in depressing the melting point of the polymer and/or improving the polymer rheology for certain uses. It may also help the polymer crosslink by faster hydrolysis (see below).

In the above-mentioned polymerization processes, the transition metal complexes may in and of themselves be active catalysts, or may be "activated" by contact with a cocatalyst/activator. More than one such cocatalyst may be used in combination.

The catalysts herein may be "heterogenized" by coating or otherwise attaching them to solid inorganic or organic supports, such as silica, alumina, polyethylene, or polystyrene. Where an active catalyst species is formed by reaction with a compound such as an alkylaluminum compound or Lewis acid, a support on which the alkylaluminum compound or Lewis acid may be first coated or otherwise attached is contacted with the transition metal compound precursor to form a catalyst system in which the active transition metal catalyst is "attached" to the solid support. These supported catalysts may be used in polymerizations in organic liquids. They may also be used in so-called gas phase polymerizations in which the ethylene and any comonomers being polymerized are added to the polymerization as a gas and no liquid supporting phase is present. For materials for and methods of making heterogeneous catalysts see G. G. Hlatky, Chem. Rev., vol. 100, p. 1347-1376 (2000).

The polymerization processes described herein may be run in any manner common for coordination olefin polymerization processes, such as batch, semi-batch, and continuous. The processes may be run in solution, slurry or gas phases. Typically a gas phase polymerization process is run as a fluidized bed process in which polymer particles are fluidized by ethylene (or other gaseous monomer) and optionally an inert gas.

Hydrogen or other chain transfer agents such as silanes (for example trimethylsilane or triethylsilane) may be used to lower the molecular weight of polyolefin produced in the polymerization process herein. It is preferred that the amount of hydrogen present be about 0.01 to about 50 mole percent of the olefin present, preferably about 1 to about 20 mole percent. The relative concentrations of a gaseous olefin such as ethylene and hydrogen may be regulated by varying their partial pressures.

Further details on cocatalysts and the use thereof, as well as various other catalyst and polymerization process details, can be found in the previously incorporated references.

A preferred vinylsilane for use in the present invention has the formula $H_2C\!=\!CHSiR^{63}R^{64}R^{65}$ (XX) wherein $R^{63}$ is a hydrolyzable group, and $R^{64}$ and $R^{65}$ are each independently a hydrolyzable group, siloxy, hydrocarbyl or substituted hydrocarbyl, provided that any two of $R^{63}$, $R^{64}$ and $R^{65}$ together may form a ring, or all of $R^{63}$, $R^{64}$ and $R^{65}$ together may form a ring structure (see Example 135 below for instance). By a hydrolyzable group in this context is meant a group bound to silicon which is hydrolyzed when exposed to liquid water or water vapor at 25° C. Useful hydrolyzable groups include hydrocarbyloxy, dialkylketoximino, acyloxy, amino, and N-amido, and hydrocarbyloxy, especially alkoxy or aryloxy, is a preferred hydrolyzable group. Preferably in any vinylsilane there is no halogen bound directly to a silicon atom. In another preferred vinylsilane, only one vinyl group is present in the compound. In another type of preferred vinylsilane, $R^{63}$ is a hydrolyzable group, and $R^{64}$ and $R^{65}$ are each independently hydrocarbyl, especially alkyl, or a hydrolyzable group. In a more preferred vinylsilane $R^{63}$ is alkoxy, and $R^{64}$ and $R^{65}$ are each independently alkyl or alkoxy. In another type of preferred vinylsilane $R^{64}$ and/or $R^{65}$ are fluorinated alkyl. Preferred alkoxy groups for the vinylsilane are methoxy, ethoxy, t-butoxy and i-propoxy, and methoxy and ethoxy are especially preferred, and a preferred alkyl group is methyl. A preferred aryloxy group is phenoxy. In (XX) any combination of these preferred structural features may be present. Specific preferred vinylsilanes include vinyltrimethoxysilane, vinyltriethoxysilane, vinyltri-i-propoxysilane, vinyltri-t-butoxysilane, vinyltriphenoxysilane, vinylmethyldimethoxysilane, vinylmethyldiethoxysilane, vinyldimethylmethoxysilane, vinyldimethylethoxysilane, vinylphenyldimethoxysilane, vinylphenyldiethoxysilane, vinyldiphenylmethoxysilane, vinyldiphenylethoxysilane, and vinyltris(2-methoxyethoxy)silane. Another type of preferred vinylsilane is a siloxane having at least one (preferably one or two, more preferably one) vinyl group. Preferred polymerization processes and copolymers herein also contain any of the above preferred vinylsilanes, when vinylsilanes are used to make the copolymers.

A preferred allylsilane for use in the present invention has the formula $H_2C\!=\!CHCH_2SiR^{63}R^{64}R^{65}$ (XV), wherein $R^{63}$, $R^{64}$ and $R^{65}$ are as defined above. Preferred (and nonpreferred) groups for $R^{63}$, $R^{64}$ and $R^{65}$ are the same as in (XX). A particularly preferred hydrolyzable group for (XV) is methoxy. Specific preferred allylsilanes are analogous to the specific preferred vinylsilanes. Preferred polymerization processes and copolymers herein also contain any of the above preferred allylsilanes, when allylsilanes are used to make the copolymers.

It has also been found that certain allyl- and vinylsilane monomers bearing fluorinated groups, especially fluorinated alkyl groups, may be copolymerized with olefinic comonomers. Note that these fluorinated substituents are included within the definition of substituted hydrocarbyl, the substitution being fluorine and possibly other substituents are also present. Silanes which may be copolymerized include [$R^{43}(CH_2)_m]_x R^{44}{}_y Si(OR)_z[(CH_2)_k CH{=}CH_2]$ wherein each $R^{43}$ is independently perfluoroalkyl optionally containing one or more ether groups; $R^{44}$=is substituted hydrocarbyl or hydrocarbyl, m is an integer of 2 to 6, k is 0 or 1 (vinyl or allyl), x is 1, 2 or 3, y is 0, 1 or 2, and z is 0, 1 or 2, provided that x+y+z=3. Suitable functional groups for $R^{43}$ include ether, chlorine, bromine or iodine, ester, sulfonic acid ($—SO_3H$), and sulfonyl halide. The perfluoroalkyl group may also be substituted with hydrogen. A sulfonic acid group containing monomer does not have to be polymerized directly. It is preferably made by hydrolysis of a sulfonyl halide group already present in an already made polymer. It is preferred that the perfluoroalkyl group contain 2 to 20 carbon atoms and preferred perfluoroalkyl groups are —$F(CF_2)_b$— wherein b is 2 to 20, and $F(CF_2)_d OCF_2 CF_2$— wherein d is 2 to 20. A preferred olefinic comonomer is ethylene or a linear α-olefin, and ethylene is especially preferred. Polymerizations may be carried out with many of the catalysts described herein.

The resulting fluorine containing polymers may be useful for compatibilizing fluorinated and nonfluorinated polymers, for changing the surface characteristics of fluorinated or nonfluorinated polymers (by being mixed with them), as molding resins, etc. Those polymers containing functional groups may be useful where those functional groups may react or be catalysts. For instance, if a polymer is made with a sulfonyl fluoride group that group may be hydrolyzed to a sulfonic acid, which being highly fluorinated is well known to be a very strong acid. Thus the polymer may be used as an acid catalyst, for example for the polymerization of cyclic ethers such as tetrahydrofuran.

The hydrolytic reactivity of allyl- and vinylsilane copolymers which contain hydrolyzable groups is useful in a number of applications. Hydrolysis may lead to the formation of a reactive intermediate silanol group. This Si—O—H functionality can then undergo self-condensation, evolving water to form stable Si—O—Si bonds to crosslink the polymer. Alternatively, the Si—O—H functionality can react with inorganic, hydroxyl-containing surfaces such as glass, ceramics, or surface-oxidized metals forming adherent bonds to those surfaces. Surface-oxidized metal surfaces would include the Al—O—H and Al—O functionality of exposed aluminum, the Fe—O—H and Fe—O functionality of exposed steel, and many other similar species.

In many polymer applications it is desirable to have staged curing or adhesion. Thus, it is sometimes desirable to incorporate two or more different allyl- or vinylsilanes monomers into the polymerization. Terpolymerization of ethylene or other olefin with vinyltrimethoxysilane and vinylmethyldimethoxysilane would provide two cure sites with differing reactivity, such that initial faster reaction would occur at the trimethoxysilyl group and a slower final curing reaction would occur at the methyldimethoxysilyl group. In adhesive applications, this differential curing could aid fabrication by providing quick initial tack followed by longer-term formation of a stronger adhesive bond.

The low-temperature crosslinking reaction provided by the siloxane functionality is of use in wire and cable applications. In addition, siloxane crosslinking provides increased melt-strength required for the foaming of polyolefins.

The rates of hydrolysis and condensation of alkoxysilane functionalities on a polymeric backbone are usually dependent upon their concentration, the pH of the siloxane microenvironment, the presence of solvents or plasticizers, the molecular weight of the polymer, the degree of crystallinity of the polymer, the presence of catalysts, the nature of the organic groups on the silicon atom and the permeability of water in the polymer. For instance, the rate of hydrolysis of a trialkoxysilyl group usually decreases with increasing length of the alkyl chain of the alkoxy substituent or the presence of branching in the alkyl chain near the oxygen atom. The rate of hydrolysis usually decreases in the order

wherein R and R' are hydrocarbyl or substituted hydrocarbyl groups.

The presence of phenyl as R' usually decreases the rate of hydrolysis more than, for example, methyl. The presence of additional polar functionality in R usually increases the rate of hydrolysis in that methoxyethyl hydrolyzes faster than n-butyl though they have the same number of atoms in the chain and both acetoxy and methylethylketoximino hydrolyze faster still. Incorporation of two or more of the alkoxy groups on the silane in ring structures can slow or speed the hydrolytic reactions depending upon the ring size. In alkylalkoxysilanes, it is also possible to incorporate both the alkyl and alkoxy groups in a ring structure.

It is also likely that the rates of hydrolysis and condensation of alkoxysilane functionalities in a polymer matrix are also dependent upon the nature of the polymer backbone and the location of the alkoxysilane with regard to the polymer backbone. Alkoxysilane groups tied directly to the main chain of a polymer molecule are usually less mobile than alkoxysilane groups tethered at the end of a short chain. A crosslinking process requires that a minimum of two silanol groups react to form a Si—O—Si linkage, but often, these condensations result in the formation of Si—O clusters. The often higher functional group mobility afforded by being tethered to a branch rather than a main backbone may afford a higher degree of clustering. Also, a higher amorphous content in the polymer or exclusion of the siloxane functionality from crystalline regions of the polymer would increase clustering.

In a variety of adhesion and other applications, it may be advantageous to incorporate one or more other functional groups in addition to those afforded by alkoxyvinylsilane monomers. Thus terpolymerization of alkoxyvinylsilanes and acrylics with ethylene or alpha-olefins may be advantageous. For example, a polymer resulting from ethylene polymerization with vinyltrimethoxysilane and methyl acrylate often would be useful for adhesion between glass and acrylic polymers.

While it is often of benefit to have at least one alkoxy group on silicon in addition to the allyl or vinyl group, the alkoxysilane functionality may also be pendant in the monomer. Thus a molecule such as

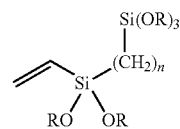

would provide two different types of alkoxysilane groups with differing reactivity all in a single monomer.

The allyl- or vinylsilane may be introduced into the polymerization process in much the same way as any other olefin is introduced. If it is a gas phase polymerization the allyl- or vinylsilane may be volatilized and then introduced as a separate stream, or mixed with ethylene before introduction into the reactor. Alternatively, one may use the "condensing phase" mode of operating a gas phase polymerization and introduce the allyl- or vinylsilane monomer in the condensing phase. If there is a liquid phase present (slurry or solution for example) in the polymerization it may be introduced as a liquid, for instance in solution in the liquid phase or as a separate stream. If the polymerization is a batch or semibatch process it may be present before the polymerization is started or added at or close to the beginning of the polymerization reaction. The allyl- or vinylsilane itself may be the liquid phase, or it may be present as a component of the liquid phase. Concentrations of the allyl- or vinylsilane in the liquid phase may be from about 0.1% by volume to about 40% by volume, more preferably about 0.1% to about 10% by volume.

Isolation of the polyolefin product may be by any means normally used to isolate polymers from such polymerization processes, although most of the time one would not want to "prematurely" crosslink the polyolefin if the allyl- or vinylsilane had hydrolyzable groups present. Care should therefore be taken not expose the polyolefin to conditions that would cause premature crosslinking, for example exposure to moisture coupled with addition of catalysts for the crosslinking reaction and/or excessive heating of the polyolefin.

As described above, previous ethylene polymers which contain vinylsilanes were made by a high pressure polymerization process or were grafted onto a preexisting polymer, usually using a free radically catalyzed process. These polymers have certain structural characteristics, and the table below shows the percentage of various structures containing silanes in each polymer, as measured by $^{13}$C NMR spectroscopy. The percentage given are the percent of the total amount of silane present in the polymer. In Table A, G is a graft polymer, and HP is a high pressure copolymer. The "n" in the Table refers to "n" in (XVI).

TABLE A

| Polymer Type | Si Comonomer mole % | Other comonomer mole % | % Branching | | | | |
|---|---|---|---|---|---|---|---|
| | | | n = 0 | n = 1 | n = 2 | n = 3 | n = 4+ |
| HP | VTMoS, 0.5 | methyl acrylate, 7.0 | 16 | 0 | 0 | 0 | 84 |
| HP | VTMoS, 0.5 | butyl acrylate, 4.6 | 60 | 0 | 0 | 0 | 60 |
| G | VTMoS, 0.28 | none | 0 | 0 | 100 | 0 | 0 |

The n=4+ values for the HP polymers are believed to be chain ends, and/or result from a "back biting" mechanism known for radical-type polymerizations. When compared with the data of Table B (below), the data in Table A show that the structures of previously known vinylsilane containing polymers are different from the polymers described herein.

Many of the late metal catalysts used herein have the potential to form vinylsilane copolymers with high degrees of branching due to chain-walking. Even hyperbranched or dendritic type structures are possible. The level of vinylsilane incorporation can be varied from low to high in these amorphous copolymers and their state can be varied from solids to free-flowing oils dependent on the amount and type of branching, the molecular weight, the level of vinylsilane and other comonomer incorporation, etc. High vinylsilane incorporation, high levels of branching, the presence of longer branch lengths, and the presence of branches on branches all typically lower the crystallinity of the copolymer, as does the incorporation of alpha olefins such as 1-butene, 1-hexene and 1-octene. The amorphous nature of these vinylsilane copolymers is unique as compared to the higher crystallinity of the current commercial radical vinylsilane copolymers and grafted vinylsilane polymers.

Numerous novel copolymers incorporating the allyl- or vinylsilanes are described herein. The first copolymer is a copolymer of ethylene and one or both of an allyl- and vinylsilane having a density of 0.920 or more, preferably about 0.930 or more, and especially preferably about 0.940 or more. Previous copolymers of ethylene and vinylsilanes were made by high pressure free radical copolymerization of these monomers, which leads to a low density polyethylene (LDPE) type polymer having some copolymerized vinylsilane. LDPEs made by high pressure polymerization have a different branching pattern than the polymers described herein, and because the LDPE usually has a substantial number of total branches, it typically has a relatively low density. Some of the polymers made herein have relatively low amounts of branching and so have higher densities. Polymers made using iron or cobalt complexes of tridentate ligands are believed be essentially branchless, except for the "branches" due the silyl groups of the allyl- or vinylsilanes themselves. Amorphous polymers tend to have relatively low densities.

The second copolymer herein has a branching level of at least about 10 alkyl branches per 1000 methylene groups [after correction (subtraction of) for end of chain methyl groups, and excluding lower alkyl groups bound directly to silicon]. Such branching levels are measured by NMR and these methods are described in the section on NMR analysis. Preferably these polymers have at least about 20 branches per 1000 methylene groups, and more preferably have at least about 40 branches per 1000 methylene groups. Also preferably at least about 20 mole percent of these branches in the polymer are methyl branches.

A third polymer has at least 2 methyl branches per 1000 methylene groups, more preferably at least about 5 methyl branches per 1000 methylene groups in the copolymer. This too is measured by NMR, and the same "corrections" and "exclusions" apply to this third polymer as the second polymer.

A fourth copolymer has a melting point of at least about 115° C., more preferably at least about 120° C. when measured by Differential Scanning Calorimetry according to ASTM D3417, at a heating rate of 10° C./min, and the melting point is taken as the peak of the melting endotherm.

Figure 2:
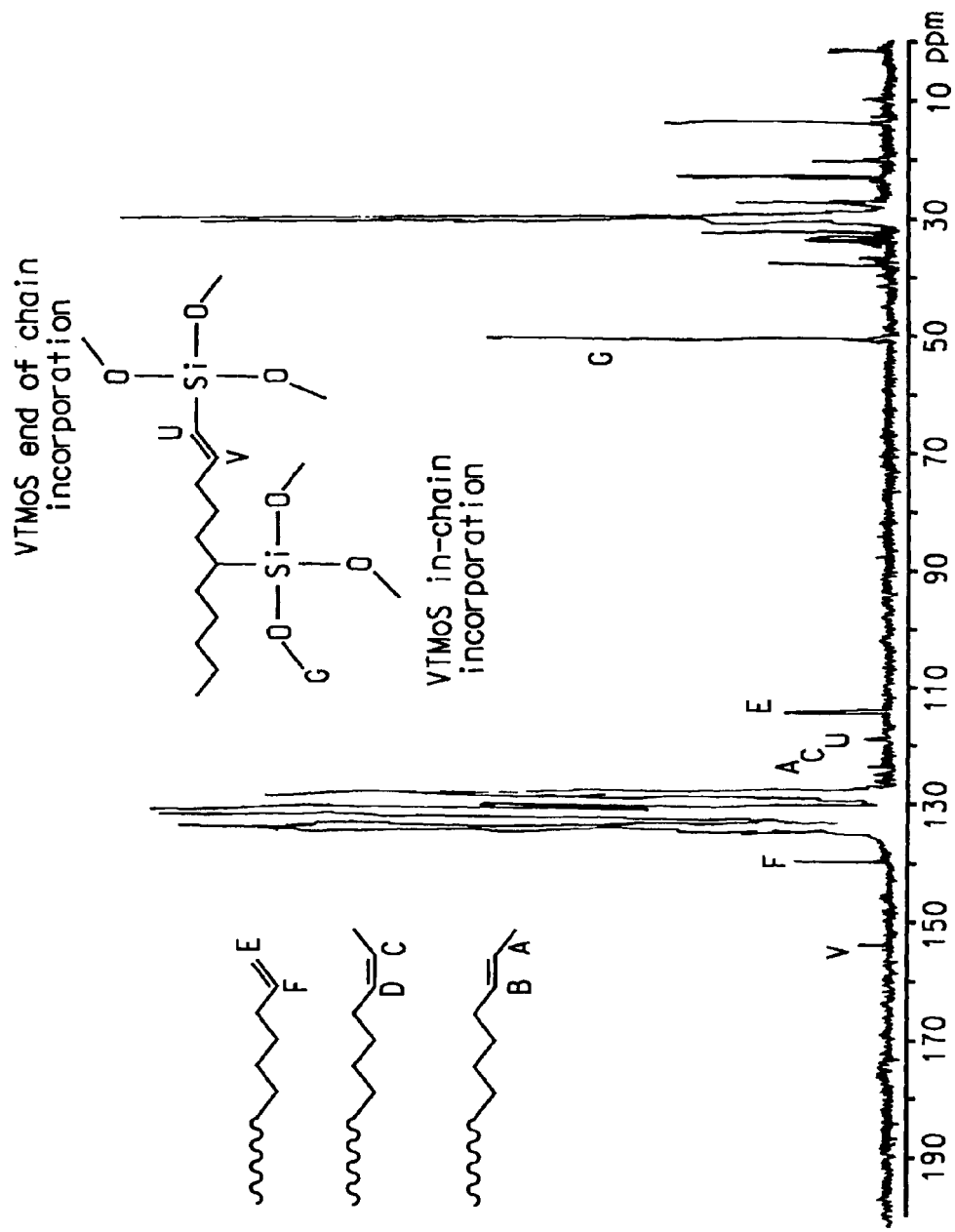
FIG. 2 shows the $^{13}$C NMR spectrum of the polymer of Example 34, and some of the assignments of the peaks.

As shown in the $^{13}$C NMR spectrum for the polymer produced in Example 34 (see FIG. 2 and listing after Table 15) at least some of the vinylsilane copolymers, fifth copolymers, contain the group

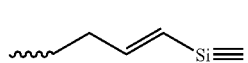

(XIII)

wherein ~~~~ represents the rest of the polymer (chain), and the three free bonds to silicon represent the other groups bound to the silicon, for example three alkoxy groups. The structure does not imply whether the olefinic bond is cis or trans. It is theorized that these groups may be end groups for the polymer chains, which would be advantageous from the point of view of the physical properties of the ensuing crosslinked polymer. (XIII) may (theoretically) arise by a β-hydride elimination chain transfer mechanism when the vinyl silane is attached to the growing polymer molecule. In some polymers, a structure such as (XIII) may represent about 0.5 to about 50 mole percent of the vinylsilane (based on the total amount of vinylsilane) incorporated into the copolymer, preferably about 1 to about 30 mole percent, and especially preferably about 3 to about 20 mole percent. All of these minimum and maximum limitations may be mixed with each other. Preferably the end groups (XIII) are at least 0.001 mole percent, more preferably at least 0.01 mole percent, and especially preferably at least about 0.1 mole percent of the total repeat units (ethylene, silane and any other comonomers) in the copolymer. For example in the polymer of Example 34, the $^{13}$C NMR (see FIG. 2) indicates that about 16 mole percent of the vinylsilane incorporated is present as (XIII).

A sixth copolymer of ethylene, one or both of an allyl- and a vinylsilane, and optionally other copolymerizable monomers, contains at least 1.0 or more mole percent (total) of incorporated allyl- or vinylsilane, more preferably at least about 2.0 mole percent, and especially preferably at least about 3.0 mole percent, very preferably at least about 5.0 mole percent. Mole percentages are based on the total amount of all repeat units in the copolymer.

As shown in the $^{13}$C NMR spectrum for the polymer produced in Example 360 and 361, at least some of the vinylsilane copolymers, seventh copolymers, contain the group

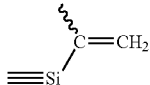

(XXI)

wherein ~~~~ represents the rest of the polymer (chain), and the three free bonds to silicon represent the other groups bound to the silicon, for example three alkoxy groups. It is theorized that these groups may be end groups for the polymer chains, which would be advantageous from the point of view of the physical properties of the ensuing crosslinked polymer. In some polymers, a structure such as (XXI) may represent about 0.5 to about 80 mole percent of the total end groups which contain silicon atoms. Preferably the end groups (XXI) are at least 0.001 mole percent, more preferably at least 0.01 mole percent, and especially preferably at least about 0.1 mole percent of the total repeat units (ethylene, silane and any other comonomers) in the copolymer. In such seventh copolymers it is preferred that at least some of incorporated silicon containing groups are of the formula (XVI), and in such groups (XVI) in at least about 10 mole percent or more n is 4 or more, and/or in at least about 5 mole percent or more of (XVI) n is 0.

Aside from the alkyl branching described above, which is believed to be due to a phenomenon called "chain walking" (see World patent application Ser. No. 96/23010), in many of the allyl- or vinylsilane containing copolymers herein the silicon containing monomer is incorporated into the polymer in unusual ways (also believed due to chain walking). In a "normal" olefin coordination polymerization (if it could be achieved with these olefinic silanes) it would be expected that the repeat unit derived from a vinylsilane would be

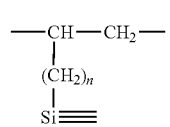

(XVI)

wherein n is 0, while in a repeat unit from an allylsilane n would be 1. While these results are sometimes obtained, very often n is not the "expected" number shown above. This is illustrated in Table B below, where the branching analyses on the incorporated olefinic silane monomers (as a percent of total incorporated silane monomer, less any silane monomer incorporated as unsaturated end groups) in copolymerization with ethylene are given for selected Examples from this application.

TABLE B

| Ex. | Monomer Type | n = 0, % | n = 1, % | n = 2, % | n = 3, % | n = 4+, % |
|---|---|---|---|---|---|---|
| 103 | vinyl | 25.6 | 20.0 | 21.0 | 7.8 | 25.6 |
| 104 | vinyl | 29.6 | 26.2 | 17.9 | 9.6 | 16.7 |
| 106 | allyl | 16.1 | 41.4 | 16.3 | 12.5 | 13.7 |
| 107 | allyl | 5.9 | 43.4 | 26.3 | 9.1 | 15.3 |
| 108 | vinyl | 43.3 | 31.3 | 16.0 | 3.4 | 6.0 |
| 109 | vinyl | 28.9 | 22.7 | 19.8 | 7.5 | 21.2 |
| 111 | allyl | 6.4 | 45.8 | 25.8 | 8.0 | 14.0 |
| 116 | vinyl | 36.7 | 16.5 | 8.8 | 11.5 | 26.5 |
| 120 | vinyl | 31.9 | 20.7 | 31.5 | 5.9 | 10.0 |
| 123 | vinyl | 100.0 | | | | |
| 124 | vinyl | 100.0 | | | | |
| 125 | vinyl | 28.1 | 29.6 | 19.9 | 7.4 | 15.1 |
| 126 | vinyl | 34.9 | 14.8 | 25.3 | 7.6 | 17.4 |
| 129 | vinyl | 40.4 | 21.3 | 19.2 | 1.4 | 17.6 |

These results show that in many instances the "expected" repeat unit from the allyl- or vinylsilane is often a minority of the total incorporated units. Indeed a wide range of n values is obtained (the NMR method used can't distinguish between different n's having a value of 4 or more). For example such vinylsilane copolymers often have at least about 5 mole %, more preferably at least about 10 mole % of incorporated silane monomer wherein n is 0, 1, 2, 3 and 4+, or any combination of such n's or single n which are (is) about 5 mole percent or more, or about 10 mole percent or more. In some vinylsilane copolymers n=1 is about 15 mole percent or more, preferably about 20 mole percent or more of the total vinylsilane monomer incorporated and/or n=3 is about 4 mole percent or more, preferably about 10 mole percent or more of the total silicon monomer incorporated. It should be emphasized that any combination of preferred amount of "n" in silane containing branches described in this paragraph may be combined with any other preferred amount (not just values of "n", but also alkyl branching, polymer density, polymer melting points, etc.) and that these molar percentages do not include olefinic silanes that are incorporated as olefinic end groups such as (XIII) and (XXI).

Allylsilane copolymers often have at least about 5 mole %, more preferably at least about 10 mole % of incorporated silane monomer wherein n is 0, 1, 2, 3 and 4+, or any combination of such n's or single n which are (is) about 5 mole percent or more, or about 10 mole percent or more. In some allylsilane copolymers n=0 is about 4 mole percent or more of the total allylsilane monomer incorporated, and/or n=2 is about 5 mole percent or more, more preferably about 10 mole percent of more of the total allylsilane incorporated, and/or n=3 is about 5 mole percent or more of the total silicon monomer incorporated. It should be emphasized that any combination of preferred amount of "n" in silane containing branches described in this paragraph may be combined with any other preferred amount (not just values of "n", but also alkyl branching, polymer density, polymer melting points, etc.) and that these molar percentages do not include allylsilanes which are incorporated as olefinic end groups such as (XIII).

The "n value" of branches formed by incorporation of the olefinic silanes will vary to some extent with the olefinic silane chosen. For example when the other three groups on silicon are alkyl, n tends to be the value from a "normal" polymerization, for example 0 when a vinylsilane is used. When there are three alkoxy groups bound to the silicon of an allyl- or vinylsilane, the value of n tends to range broadly. When relatively low temperatures and/or particularly high ethylene pressures are used (particularly in combination) n tends to be more like that from a "normal" polymerization, that is n tends to be 0 when a vinylsilane is used, and 1 when an allylsilane is used, although a range of "n" values is still often obtained (by tending to be a more "normal" polymerization may mean that a larger percentage of n is 0 or 1).

In another preferred vinylsilane copolymer, in at least about 70 mole percent, more preferably at least about 80 mole percent and very preferably at least about 90 mole percent of the repeat units n is 0. Preferably the olefinic silane was a vinylsilane, and/or a comonomer is ethylene and/or one or more α-olefins of the formula $H_2C=CH(CH_2)_tCH_3$ wherein t is 0 or an integer of 1 to 20 and/or carbon monoxide, and more preferably the comonomer is ethylene. Other comonomers, such as acrylate esters, vinyl ketones, acrylic acid, epoxy group containing acrylate esters, selected olefins containing epoxy, ester, keto, orthoester, silyl, sulfone, and fluorine, which are known in the art to be copolymerized by some of the polymerization catalysts described herein, may also be present (and copolymerized). Most preferably this copolymer is a copolymer of a vinylsilane and ethylene.

When Pd catalysts (as opposed for example to Ni catalysts) are used to form the vinyl- or allylsilane copolymer other branching patterns may result, see in particular Tables 65, 66, 68 and 69 below. Herein the values of "n" in (XVI) in the polymerization of vinylsilanes may be: n=0 less than 10 mole percent (of the total Si groups present, not including unsaturated end groups); n=1 less than 10 mole percent; n=3 at least 10 mole percent; and n=4+ at least about 40 mole percent. In ethylene copolymers of the vinylsilanes made with Pd catalysts, typically at least 30 alkyl branches per 1000 methylene groups are present in the polymer. Typically there are: at least about 10, more typically at least about 20, methyl branches per 1000 methylene groups; at least about 0.5 but no more than about 5 n-propyl branches per 1000 methylene groups; and no more than about 25 n-butyl branches per 1000 methylene groups. Preferably these copolymers contain at least about 1.0 mole percent, more preferably at least about 3 mole percent of copolymerized vinylsilane.

Amorphous copolymers of ethylene and vinyl- or allylsilanes, and optionally small amounts (<5 mole percent) of other comonomers, are unique and are amorphous because of the relatively high levels of alkyl group branching present due to the "normal" chain walking that occurs when ethylene is polymerized alone (see WO 96/23010).

In all of the copolymers described herein it is preferred that at least about 0.05 mole percent of the total of all repeat units are derived from an allyl- or vinylsilane, more preferably at least about 0.10 mole percent, still more preferably at least about 0.3 mole percent, again still more preferably at least about 0.6 mole percent, and especially at least about 1.0 mole percent.

It will be recognized that any particular copolymer produced by the processes herein may meet the limitations of any, some or all of the first, second, third, fourth, and so on, polymers, and so "properties" (limitations) of each of these polymers as described above may be applied to any of the other polymers, in any combination. For example a copolymer may have 12 branches per 1000 methylene groups, and/or have 4 branches which are methyl branches, and/or have a density of >0.930, and/or have a melting point of >115° C.

The copolymers made in the polymerization process, for instance as described above, are often novel, and so are their crosslinked counterparts. The polymers may be crosslinked by hydrolysis of hydrolyzable groups on the silicon, and subsequent condensation of the silanol groups formed. These reactions may be almost simultaneous or they may be sequential.

In general, a condensation catalyst is utilized in conjunction with the siloxane-containing polymers to promote hydrolytic crosslinking and/or adhesion. The condensation catalyst is chosen from any compound that will promote the condensation reaction between silanol groups produced by hydrolysis of the initial hydrolyzable groups so as to cure the polymeric system by the formation of —Si—O—Si-bonds. Examples of suitable catalysts include carboxylates of such metals as tin, titanium, bismuth, lead and zirconium. The silanol condensation reaction may be interpolymer to effect crosslinking or may be the reaction of polymeric silanol groups with other silanols or metal-OH groups on inorganic surfaces to effect adhesion.

Examples of suitable tin catalysts include dibutyltin diacetate, dibutyltin dilaurate, tin tripropyl acetate, stannous octoate, stannous oxalate, stannous naphthenate, dibutylbis (2,4-pentadionate)tin. Specific titanates include tetra butyl titanate, titanium diisopropoxy-bis-ethylacetoacetate, tetraisopropoxytitanate and tetrabutoxytitanate. Additionally, amines such as triethylamine, diethylenetriamine, butylamine, octylamine, dibutylamine, monoethanolamine, diethanolamine, triethanolamine, diethylenetriamine, triethylenetetramine, cyclohexylamine, benzylamine, diethylaminopropylamine, xylylenediamine, triethylenediamine, guanidine, diphenylguanidine and morpholine can be used as catalysts.

Preferred condensation catalysts are selected from the above described tin carboxylates, titanium carboxylates or mixtures thereof. It has also been found that addition of a minor amount of an organic amine, such as lauryl amine at about 0.1 to about 2 parts by weight for each 100 parts by weight of the polymer is useful when employing the tin compounds since it acts as a stabilizer. Very preferred catalysts are tin (IV) carboxylates since these have been observed to provide the polymers most stable to storage prior to crosslinking or adhesion.

The silane containing copolymers described herein are useful in many applications. In general, the ability of the silane groups to hydrolyze and self condense (for example to crosslink the copolymer) and/or to bond to other substrates is the basis for many of these uses. As mentioned above, these copolymers can be made with a wide range of silane content, molecular weight, and crystallinity. In the list of uses below, uncrosslinked polymer properties that are believed to be preferred for the use listed are given by the following abbreviations: HMW, high molecular weight; LMW, low molecular weight, including oligomers; HS, high silane content, above about 1.0 mole percent of the polymer repeat units; LS, low silane content, below about 0.5 mole percent of the polymer repeat units; HC, highly crystalline, for instance for a polyethylene approaching or at the crystallinity of a typical high density polyethylene; LC, low crystallinity, having a total heat of fusion above 30° C. of less than 5 J/g. When more than one of these preferred properties are listed for a particular use, one, some or all of them may be present in any combination.

Wire coating, insulation, or jacketing for electrical wires. HMW

House siding HMW

Pipes, especially hydraulic pipes. HMW, HC

Foams, for example for use in sporting goods, toys, packaging, and medical uses. HS, HMW Components for automotive coatings and other types of coatings (paints). LC, HS Safety glass interlayer. HS, LC (preferably very transparent)

Seismic bearings. HS, LC

Packaging film for various items such as food, and medical equipment.

Polymer modifier/polymer additives/polymeric tougheners, for example as additives to multi-component thermoplastic elastomers.

Gaskets (e.g., form-in-place gaskets) for gas-tight applications since the permeability of the cured compositions is close to that of the unmodified polymer. LMW, HS Elastomeric seals for insulating glass structures and formulation of sealants for construction and vibration damping applications (e.g., in automobiles, appliances, disc drives, and audio speakers). LC Sheets materials, for example pond liners. HMW Fibers.

Rotomolding (powder), for example for making fuel tanks chemical tanks, and underground storage tanks. HMW, LS Medical instruments and apparatus.

Films and tapes. HMW

Parts for radiant heating systems. HC, HMW

Adhesives (component). HS, LMW

Release film.

Stain resistant nonwoven fabric (from fibers).

Films, sheets and other forms for acoustic damping.

Cladding for glass bottles, steel and other wire (aside from electrical wire) and rods such as reinforcing rods. HMW Packaging materials, for example in the form of sheets, foams and films HMW Heat shrinkable tape. HMW, HC Cable (such as telephone cable, optical fiber cable, and coaxial cable) jacketing. HMW Sheets for coating/laminating onto other substrates such as metal or other resins, such as coating for house siding. HMW Caulks LMW, HS Dispersants, for example for pigments, inks and metal oxide nanoparticles.

Modifier for inorganic polymer.

Waxes, for example ski waxes. LMW

In some of these applications, it is contemplated that the formulated moisture sensitive copolymers will be packaged in hermetically-sealed containers such as a cartridge or flexible tube. Such containers can be stored for extended periods and, when needed, the formulations contained therein can be dispensed (extruded) using a caulking gun, or the like.

To avoid premature crosslinking, it may be desirable to add a stabilizer (towards crosslinking) to the allyl- or vinylsilane copolymers. Such stabilizer(s) may be added during the polymerization, isolation, and/or storage of the stages of the process for making the polymer, and the stabilizer(s) chosen for any or all these stages may be the same or different. A useful stabilizer may be a Lewis base, such as an amine, ester, alkoxysilane not containing a vinyl or allyl group, etc. During the copolymerization stage itself, even the presence of a Lewis base termonomer, such as an acrylate ester, can act as a stabilizer (e.g., Example 59). For some illustrations of the use of such stabilizers in the processes herein, see Examples 59-75 where $Et_3N$ sometimes $(EtO)_3Si$-i-Bu or $(EtO)_4Si$ were added during the isolation procedure. See also Example 61 vs. 98 in Table 30, and Examples 99 vs. 100 in Table 31, where the addition of ethyl acetate and $(MeO)_3Si(i$-Bu), respectively, during the copolymerization stage resulted in polymers with measurable melt indices vs. "no flow" for polymer produced in the absence of these Lewis bases. As may be expected from the fact that Lewis bases stabilize these polymers against "premature" crosslinking, maintaining the levels of any Lewis acids present during the polymerization stage as low as possible (commensurate with obtaining the desired polymer product) is also believed to help prevent premature crosslinking.

Included in this invention are copolymers of vinylsilanes and allylsilanes based upon nonhydrolyzable groups, including vinyl- or allyltrialkylsilanes and vinyl or allylsiloxanes. Incorporation of these comonomers is useful in modifying a number of copolymer properties, including crystallinity and surface properties, for instance hydrophilicity and/or lipophilicity. Potential general uses of non-hydrolyzable, low-crystallinity silane copolymers include viscosity modifiers, dendrimers, oils, greases, waxes, lubricants, and dispersants. In particular, siloxane-derived copolymers are potentially useful as pressure-sensitive adhesives. Copolymers derived from vinyl- and allyltrialkylsilanes are useful for modifying copolymer crystallinity. Copolymers derived from vinylsilanes and allylsilanes based upon fluorinated nonhydrolyzable alkyl or siloxy groups are particularly useful for modifying surface properties.

EXAMPLES

Abbreviations

The following abbreviations are used in the Examples:

| | |
|---|---|
| $\Delta H_f$ | heat of fusion |
| 1B1 | percentage of total methyl branches occurring in sec-butyl branches |
| 1B2 | percentage of total ethyl branches occurring in sec-butyl needed branches |
| acac | acetylacetonate or 2,4-pentanedionato |
| Am | amyl |
| ATEoS | allyltriethoxysilane |
| ATMoS | allyltrimethoxysilane |
| BAF | tetrakis[3,5-bis(trifluoromethyl)phenyl]borate |
| BArF | tetrakis(pentafluorophenyl)borate |
| BHT | butylated hydroxytoluene |
| Bu | butyl |
| EB | end-of-branch, refers to the functional group of a polar olefin, e.g., the ester group of an acrylate or the $Si(OR)_3$ group of an allyl- or vinylsilane, being located at the end of a branch of the polymer |
| E-10-U | ethyl 10-undecenoate |
| EG | end group, refers to the functional group of a polar olefin, e.g., the ester group of an acrylate or the $Si(OR)_3$ group of an allyl- or vinylsilane, being located in an unsaturated end group of the polymer |
| EGPEA | ethylene glycol phenylether acrylate |
| eoc | end-of-chain |

| | | |
|---|---|---|
| Et | ethyl | |
| GPC | gel permeation chromatography | |
| hex | hexyl | |
| IC | in chain (bound directly to the main polymer chain) | |
| MA | methyl acrylate | |
| MAO | methylaluminoxane | |
| Me | methyl | |
| MI or M.I. | melt index, usually at a load of 2.14 kg | |
| MMAO | methylaluminoxane containing a minority of isobutyl groups in place of methyl groups (IP refers to a grade available from Akzo-Nobel, Inc.) | |
| Mn | number average molecular weight | |
| Mp | peak molecular weight | |
| m.p. | melting point | |
| Mw | weight average molecular weight | |
| NF | no flow | |
| PD or PDI | polydispersity, Mw/Mn | |
| pk | peak | |
| Ph | phenyl | |
| PMAO-IP | polymethylalumoxane in toluene, 13 wt % Al, from Akzo-Nobel Chemicals | |
| Pr | propyl | |
| RI | refractive index | |
| RT | room temperature | |
| SMAO | A grade of MAO treated silica gel available from Albermarle Corp as XPO-2409 and containing about 12.01 wt. % Al | |
| TCB | 1,2,4-trichlorobenzene | |
| TCE | 1,1,2,2-tetrachloroethane | |
| TEoS | triethoxysilane (a group) | |
| THF | tetrahydrofuran | |
| TMS | trimethylsilyl | |
| TMoS | trimethoxysilane (a group) | |
| TPB | triphenylborane | |
| UV | ultraviolet | |
| VS | vinylsilane | |
| VTEoS | vinyltriethoxysilane | |
| VTMoS | vinyltrimethoxysilane | |

NMR Analyses:

$^1$H NMR spectra were typically obtained on a 500 MHz Bruker Avance® spectrometer on a 5 mm quad probe on about 10 mg samples diluted in 0.5 ml TCE-$d_2$ at 120° C. using a 90 degree pulse of 15 μsec, a spectral width of 12.8 kHz, digital filtering, an acquisition time of 2.6 sec and a recycle delay of 30 sec. A total of 16 transients were acquired. Spectra were referenced to TCE-$d_2$ at 5.928 ppm.

$^1$H NMR spectra were also obtained on a 500 MHz Bruker Avance® spectrometer on a 5 mm probe on 40-45 mg samples diluted in 0.5 ml TCE-$d_2$ at 120° C. using a 90 degree pulse of 8.6 μsec, a spectral width of 7 kHz, digital filtering, an acquisition time of 4.7 sec and a recycle delay of 30 sec. A total of 16-64 transients were acquired. Spectra were referenced to tce-$d_2$ at 5.928 ppm.

The $^{13}$C NMR spectra were typically obtained on a Varian® 400 MHz Unity® NMR spectrometer with a 10 mm BB probe at 120° C. using typically 310 mg of sample dissolved in 3.1 ml total volume with TCB with an acquisition time of 0.64 sec, a recycle delay of 30 sec, about 19 μsec 90° pulse, a spectral width of 35 kHz, inverse gated Waltz $^1$H decoupling, 2808 transients averaged.

Spectra were also obtained on a Bruker Avance® 500 MHz NMR spectrometer with a 10 mm quad probe at 120° C. using 310 mg sample dissolved in 3.1 ml total volume with 1,2,4 trichlorobenzene with an acquisition time of 0.64 sec, a recycle delay time of 30 sec, a 15.5 μsec 90° pulse, a spectral width of 29 kHz, digital filtering, inverse gated Waltz $^1$H decoupling, 2767 transients averaged. Sometimes 60 mg of CrAcAc was added to the sample, although typically this was not done with Si containing polymers for fear the CrAcAc would promote crosslinking. If CrAcAc was used, the recycle delay was 5 sec and the total experiment time was cut in half. Spectra were referenced to the upfield TCB carbon at 127.918 ppm. DEPT 135 spectra were collected on the same samples under similar conditions except that the recycle delay was typically 2 sec and the total experiment time was typically 30-90 min.

The $^{29}$Si NMR spectra were typically obtained on a Varian 400 MHz Unity® NMR spectrometer with a 10 mm BB probe at 120° C. using typically 310 mg of sample dissolved in 3.1 ml total volume with TCB with an acquisition time of 0.64 sec, a recycle delay time of 30 sec, about 12 μsec 90° pulse, a spectral width of 16 kHz, inverse gated Waltz $^1$H decoupling, 2500-transients averaged. Spectra were externally referenced to a sample of tetramethylsilane in TCB at 120° C. as 0.0 ppm.

The NMR resonance assignments for Si related polymer structures quoted herein were determined by the 2D NMR techniques cosy, tocsy, hsqc, hsqc-tocsy and lrhmbc (the latter for $^1$H-$^{29}$Si correlations).

For the polymer shown in the $^1$H NMR spectrum of FIG. 1, 2D $^1$H-$^{13}$C NMR experiments show that peak A is related to at least three different kinds of $CH_2$ carbons. These were verified as $CH_2$ in a $^{13}$C DEPT experiment. Also, peak A is related to at least three different Si containing structures, as verified by $^1$H-$^{29}$Si 2D NMR and 1D $^{29}$Si NMR. Peak B is related to one CH carbon by $^1$H-$^{13}$C 2D NMR and to 1 type of Si containing structure by $^1$H-$^{29}$Si 2D NMR and $^{29}$Si 1D NMR. The chemical shifts are as follows:

| | $^1$H NMR | $^{13}$C NMR | $^{29}$Si NMR |
|---|---|---|---|
| Peak A | 0.60 ppm | 7.9, 11.2, 17 ppm | 44-47 ppm (3 or more pks) |
| Peak B | 073 ppm | 24.0 ppm | 48 ppm |

For the nomenclature of the types and positions of various groups such as polymer branches in the NMR spectra, see World patent application Ser. No. 96/23010, which is hereby included by reference. For silyl ended branches, derived for example from the copolymerization of alkenyl-, allyl- or vinylsilanes, the nomenclature is x$SB_y$, wherein x is the carbon atom being referred to, with the carbon atom next to the silicon atom is 1, or if the silicon atom is bound directly to a methine carbon atom that carbon atom is "M", and y is the number of methylene groups between the silicon atom and a methine carbon atom (usually the branch point on the polymer chain).

| $^{13}$C NMR Chemical Shifts of Carbon Atoms Next to Si in Various Compounds | | | | | |
|---|---|---|---|---|---|
| Compound or Polymer | $MSB_o$ | $1SB_1$ | $1SB_2$ | $1SB_3$ | $1SB_{4+}$ |
| E/VTEoS | 24.0 | 16.9 | 7.9 | 11.7 | 11.2 |
| E/VTMoS | 23.4 | 16.0 | 6.8 | 10.3 | 9.8 |
| 1-oct-7-enylTEoS | | | | | 11.2 |
| 1-oct-7-enylTMoS | | | | | 9.8 |
| E/ATMoS | | 15.6 | | | |
| E/1-oct-7-enylTEoS | | | | | 11.2 |

Transition Metal Complexes
The following transition metal complexes are used in the Examples:
A
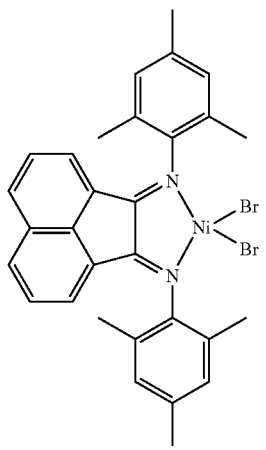
B
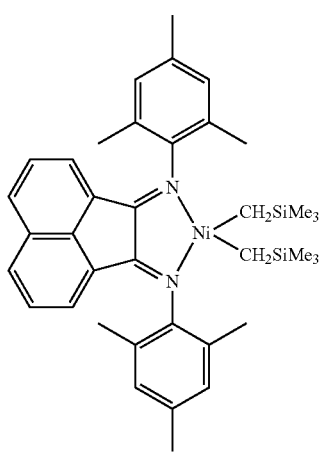
C
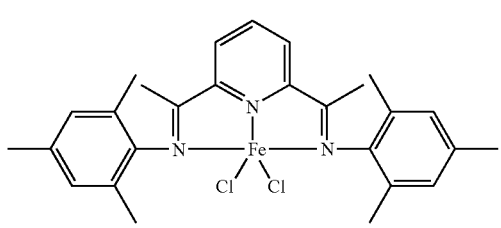
D
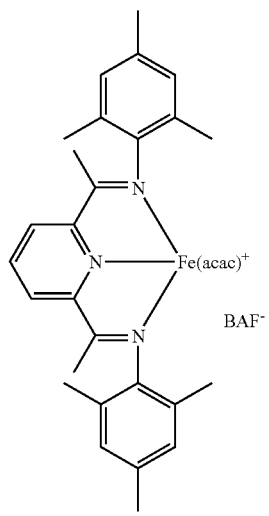
E
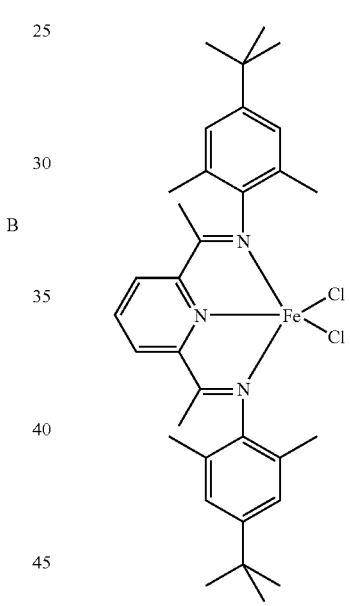
F
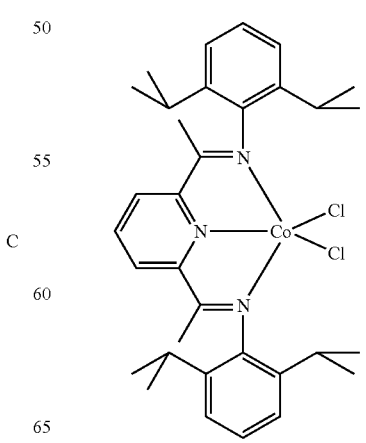

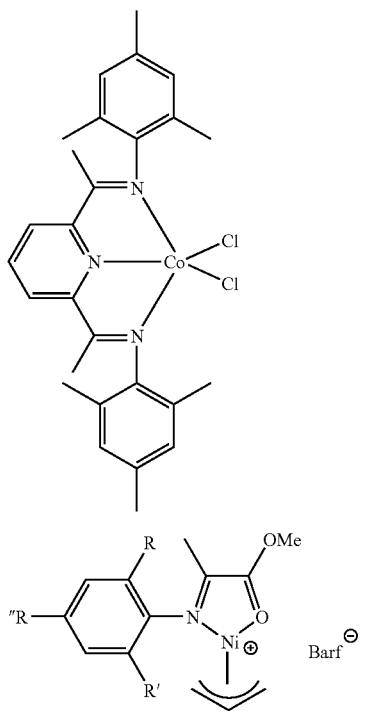
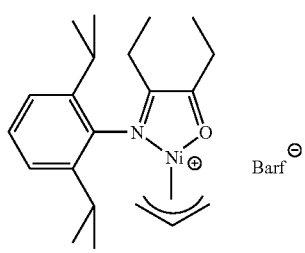
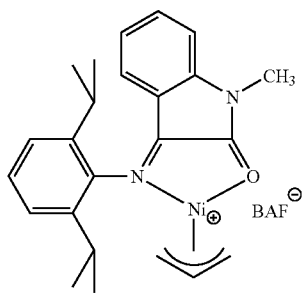
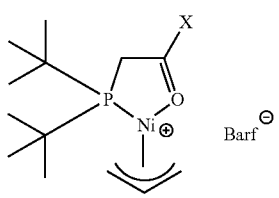
H. R, R' = iPr; R'' = H
I. R, R' = Me, R'' = H
J. R, R', R'' = Me
K. R, R'' = Me; R' = Cl
L. R, R' = Me; R'' = Br
O: X = NPh$_2$
P: X = OPh
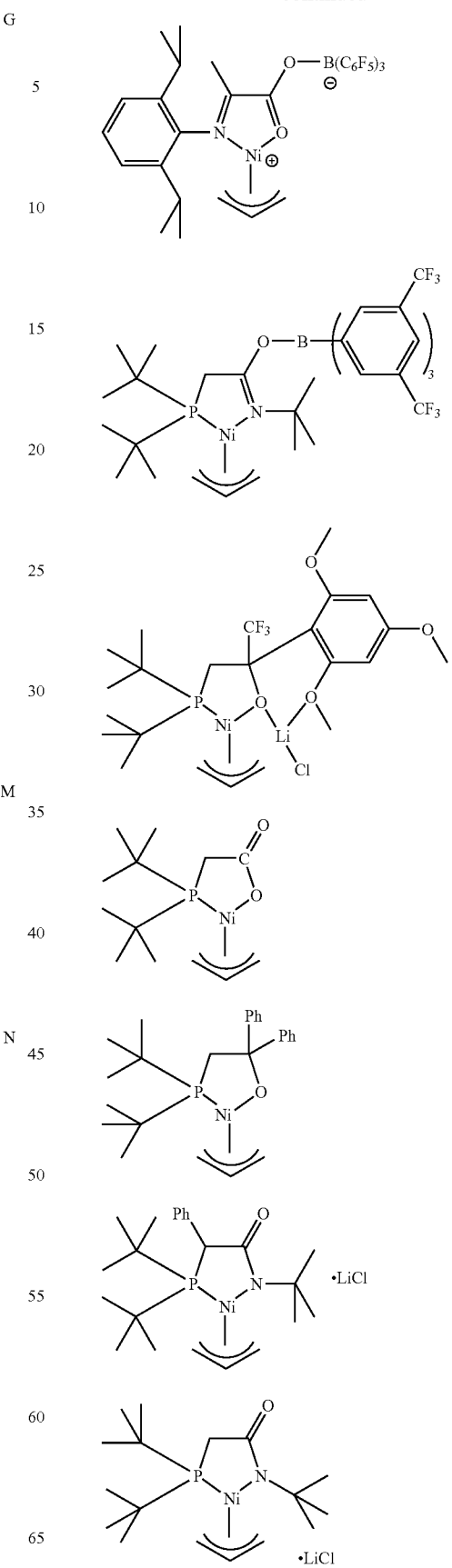

33
-continued
| | |
|---|---|
| 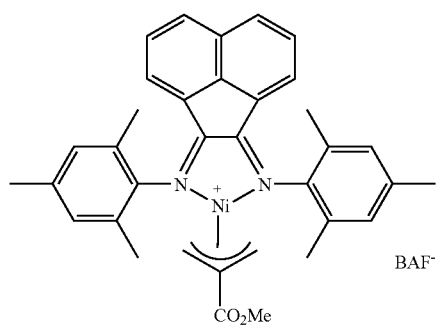 | X |
| 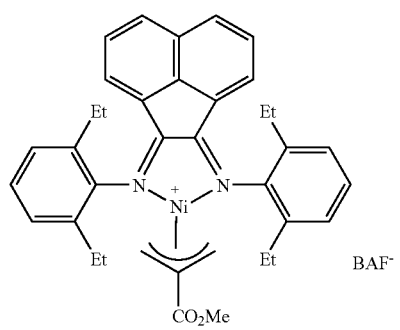 | Y |
| 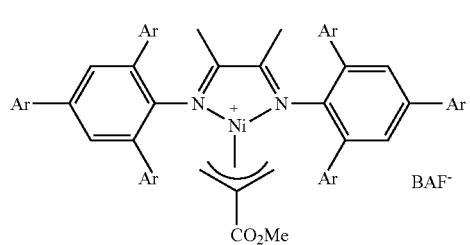<br>Ar = C₆H₄-p-(t-Bu) | Z |
| 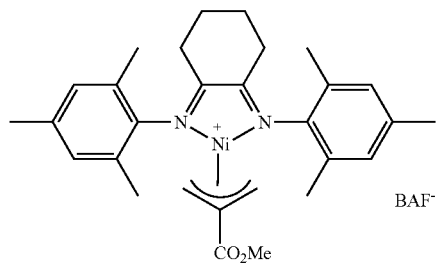 | AA |
| 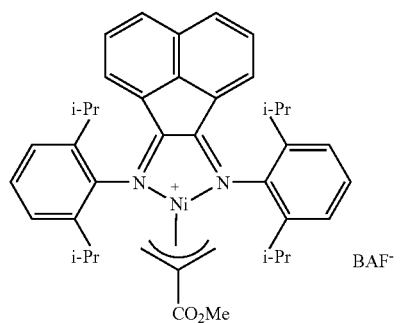 | BB |
34
-continued
| | |
|---|---|
| 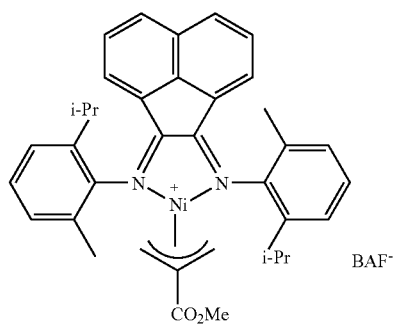 | CC |
| 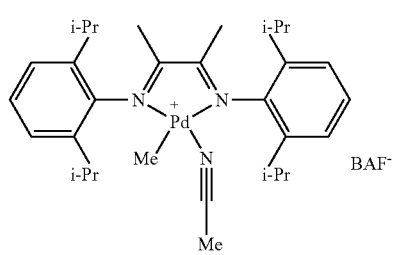 | DD |
| 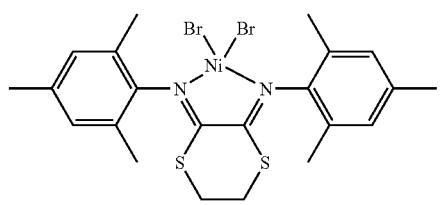 | EE |
| 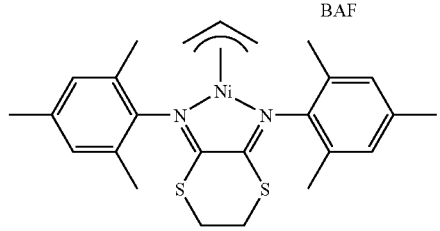 | FF |
| 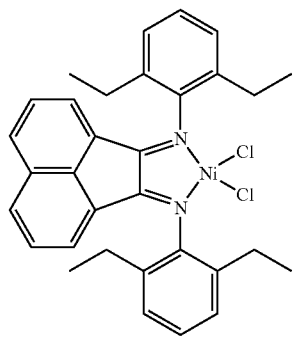 | GG |

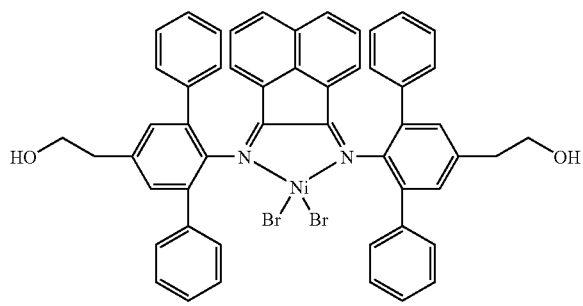

HH

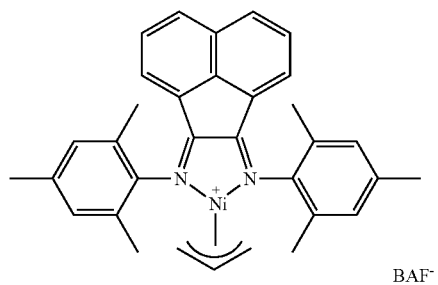

II

BAF⁻

Syntheses of the compounds similar to A, B and X through DD are found in previously incorporated U.S. Pat. No. 5,880,241, syntheses of compounds similar to C through G are in previously incorporated U.S. Pat. No. 5,955,555, syntheses of compound similar to H through P are found in previously incorporated U.S. Provisional Application Ser. No. 60/294,796 (filed May 31, 2001); syntheses similar to compound are found in previously incorporated U.S. patent application Ser. No. 09/871,100 (filed May 31, 2001); and syntheses of compounds similar to Q through U and W are found in previously incorporated U.S. patent application Ser. No. 09/871,099 (filed May 31, 2001). The specific syntheses of B and V are described below.

Examples 1-3

In a drybox, separate stock solutions of A and MMAO-IP (Akzo Nobel, solvent removed in vacuo) were prepared in 5 mL of anhydrous chlorobenzene. For each polymerization aliquots of the A solution and MMAO solution were removed and placed in separate vials and the vials were diluted as necessary with chlorobenzene to adjust the volume of each solution to 2.5 mL. The vial containing the A solution was then charged with 3 mL of VTMoS for each run. Anhydrous isooctane (142 mL) was cannulated into a dry steam-jacketed 600 mL autoclave under $N_2$ followed by the MMAO-IP solution in chlorobenzene. A metal catalyst addition tube was charged with the A/VTMoS solution and attached to the autoclave under $N_2$. The reactor was then purged 3× with ethylene at >689 kPa to saturate the solvent with ethylene and then heated to the reaction temperature. The ethylene pressure was then set to about 4.00-4.07 MPa. The catalyst addition tube was pressurized with ethylene to 4.14 MPa. After achieving the desired temperature in the autoclave, the catalyst solution was pressure injected into the autoclave. The ethylene pressure in the autoclave rose to 4.14 MPa and was maintained there throughout the reaction. The reactions were allowed to proceed for varying lengths of time based on the observed rate of ethylene uptake.

Polymer workups: The autoclave was depressurized and cooled to room temperature. Polymer of Example 1 was filtered and washed with methanol on the filter. Polymer of Example 2 was filtered and washed with acetone. Polymer of Example 3 was filtered and washed with hexanes. Polymer of Example 1 was dried at 60° C. for 24 h under vacuum in a vacuum oven. Polymers of Examples 2 and 3 were dried at RT in vacuo for 8 h and 50 h respectively. Branching and VTMoS content were determined by $^1$H NMR in $d_2$-1,1,2,2-tetrachloroethane at 120° C. The $(CH_3O)_3Si$— peaks come at approximately 3.58-3.68 ppm downfield of tetramethylsilane. Results and other conditions are given in Table 1.

TABLE 1

| | Example | | |
|---|---|---|---|
| | 1 | 2 | 3 |
| A (mmol) | 0.00052 | 0.00052 | 0.00078 |
| MMAO-IP (mmol Al) | 0.52 | 0.52 | 1.5 |
| Reaction Temp (° C.) | 60 | 75 | 67.5 |
| Reaction time (min) | 120 | 60 | 40 |
| Polymer Yield (g) | 3.7 | 1.1 | 2.43 |
| Incorporation of VTMoS (wt %) | 0.58 | 4.1 | 1.2 |
| Productivity (kg polymer/g Ni) | 121.2 | 36 | 53.1 |
| $^1$H NMR Branching ($CH_3$ per 1000 $CH_2$) | 3.1 | 12.3 | 4.2 |
| Melt Index (190° C., 2.16 kg) | no flow | no flow | no flow |

Example 4

The same autoclave and procedure were used as in Examples 1-3. A stock solution of B was prepared by dissolving 10 mg of Ni complex in 5 mL of chlorobenzene. VTMoS (3 mL) and isooctane (137 mL) were charged as a solution to the reactor via cannula followed by 0.354 g (0.691 mmol) of $B(C_6F_5)_3$ dissolved in 1 mL of chlorobenzene also by cannula. The reaction was initiated by pressure injecting a 150 μl aliquot of the catalyst stock solution diluted in 5 mL via the catalyst addition tube (0.0231 mmol Ni). Reaction conditions were 67.5° C., 4.14 MPa ethylene. The reaction was run for about 10 min. The polymer was filtered and washed with 3 portions of anhydrous ether and then dried overnight at room temperature in vacuo. Polymer yield 1.06 g (0.78 kg polymer/g Ni). Melt index (190° C., 2.16 kg): no flow. VTMoS content: 4.06 wt %. $^1$H NMR branching ($CH_3$ per 1000 $CH_2$): 18.9.

Example 5

A 600 mL Parr® reactor was heated under vacuum and was then allowed to cool under nitrogen. In a drybox, 15 mL of vinyltrimethoxysilane and 135 mL 2,2,4-trimethylpentane were mixed in a 500 mL RB flask. It was sealed using a rubber septa and was removed out of the drybox. The solution in the RB flask was transferred into the autoclave via cannula under positive nitrogen pressure. In a drybox, 1.0 mL 7.3 wt % (in Al) MMAO heptane solution was dissolved in 3 mL 2,2,4-trimethylpentane in a scintillation vial. It was sealed with a rubber septum. The vial was taken out of the drybox. The solution was transferred via cannula into the autoclave under positive nitrogen pressure. The autoclave was sealed and was pressured up to 690 kPa of nitrogen. Nitrogen was vented. The pressuring/venting was repeated two more times. At about 35 kPa nitrogen, the autoclave was stirred at about 600 rpm. Ethylene pressure (~2.07 MPa) was applied. The autoclave was placed in a preheated 80° C. oil bath. In a drybox, 200 mg 0.5 wt % biphenyl solution of C was dissolved in 5 mL 1,2,4-trichlorobenzene. The solution was transferred to an addition cylinder. The cylinder was removed from the drybox and was attached to the reactor. Ethylene pressure (3.10 MPa) was applied to the cylinder to push the catalyst into the autoclave. The pressure of the reactor was adjusted to 3.45 MPa and the temperature of the heating bath was adjusted to make the reaction temperature ca. 80° C. It was stirred at this temperature and pressure for 2 h. Heating source was removed. Ethylene was vented to ~69 kPa. The reactor was back filled with 2.07 MPa nitrogen and nitrogen was vented to about 69 kPa after brief stirring. The pressuring/venting was repeated two more times. The autoclave was brought into the drybox. Polymer was filtered, washed five times with hexanes and was dried in vacuo. White polymer (17.18 g) was obtained. $^1$HNMR (TCE, 120° C.): 0.14 mole % VTMoS incorporation; 5.7 Me/1000CH$_2$. GPC (TCB, 135° C.): Mw=18,243; Mn=5,386; P/D=3.4.

Example 6

In a drybox, 10.0 mg of C was mixed with 15 mL toluene in a 20 mL vial. To this mixture was added 0.714 g silica gel (Akzo-Nobel 948 silica gel). The mixture was shaken for 30 min. Solid was filtered, washed with 3×5 mL toluene and dried in vacuo. Blue-gray solid (0.676 g) was obtained.

A 600 mL Parr® reactor was heated under vacuum and was then allowed to cool under nitrogen. In a drybox, 71.4 mg of the silica supported C was placed in an addition tube. A Hoke® cylinder containing 20 mL of 2,2,4-trimethylpentane was attached on the top of it. Then 110 mL 2,2,4-trimethylpentane, 20 mL VTMoS and 1.0 mL 7.3 wt % (in Al) MMAO heptane solution were added to a 500 mL RB flask. The flask was sealed with a rubber septa. Both the RB flask and the addition tube/Hoke® cylinder were brought out of the drybox. The addition tube/Hoke® cylinder was attached to the reactor under positive nitrogen flow. Then the mixture in the RB flask was cannulated to the reactor under positive nitrogen flow. The solution in the reactor was heated to 80° C., then, pressurized with 2.76 MPa ethylene. The supported catalyst and 20 mL of 2,2,4-trimethylpentane were added from the Hoke® cylinder/addition tube at 3.45 MPa of ethylene pressure. The reaction mixture was allowed to stir at 80° C. under 3.45 MPa for 2 h. Heating source was removed. Ethylene was vented. The reactor was back filled with 2.07 MPa nitrogen and was then vented. The pressuring/venting was repeated two more times. The reactor was brought into the drybox under nitrogen. Polymer was filtered, washed four times with pentane and was dried in vacuo. White polymer (5.78 g) was obtained.

Examples 7-21

The alkyl aluminum cocatalysts were purchased from commercial sources, PMAO-IP (3) (polymethylaluminoxane (PMAO-IP) from Akzo Nobel Inc.; 12.7 wt % aluminum in toluene (0.88 g/mL at 30° C.)), or synthesized by literature methods, AlMe(2,6-$^t$Bu-4-Me(OC$_6$H$_2$))$_2$ (1) ((a) Shreve, A. P.; Mulhaupt, R.; Fultz, W.; Calabrese, J.; Robbins, W.; Ittel, S. D. *Organometallics* 1988, 7, 409. (b) Healy, M. D.; Wierda, D. A.; Barron, A. R. *Organometallics* 1988, 7, 2543], and (Al$^i$Bu$_2$(OC$_6$F$_5$))$_2$ (2) (Hendershot, D. G.; Kumar, R.; Barber, M.; Oliver, J. P. *Organometallics* 1991, 10, 1917).

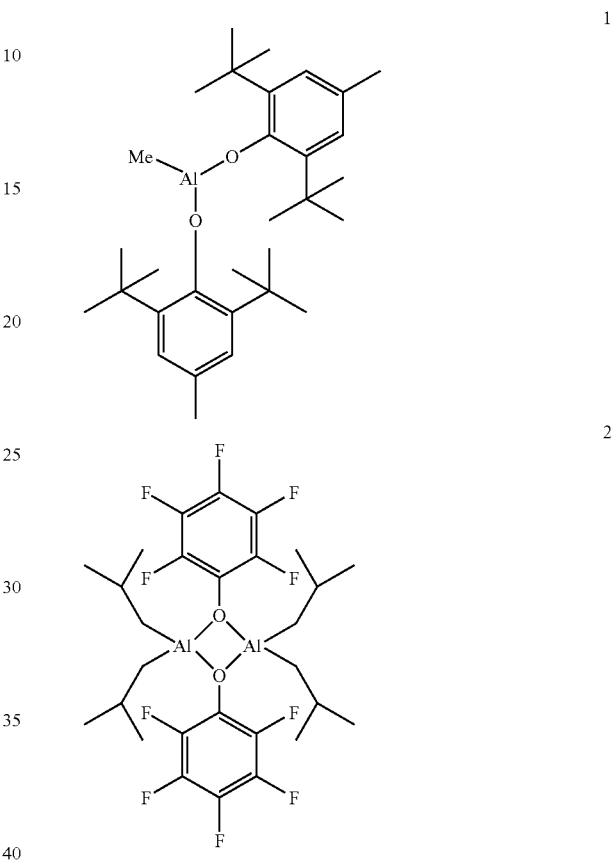

In a drybox, a glass insert was loaded with a combination of ligand and metal precursor or an isolated metal precatalyst and 2 mL of solvent. The solution was cooled to −30° C. and a solid portion of aluminum cocatalyst (1 or 2) or solution of PMAO-IP (3, 12.8 wt % Al in toluene) was added followed by 4 mL of solvent and the solution was cooled to −30° C. The liquid monomer was added to the frozen solution followed by the remaining amount of solvent and then cooled to −30° C. The inserts were capped and placed in a rack and sealed in two plastic bags. Outside the drybox the rack was transferred to a pressure vessel and flushed with ethylene. The pressure vessel was pressurized with ethylene and heated to the desired temperature and mechanically shaken for 18 h. The reaction solution was quenched with 30 mL of methanol and the polymer was isolated by filtration, rinsed with additional methanol and dried under vacuum. Other details of the polymerization conditions and products are given in Table 2.

TABLE 2

| Catalyst Ex. (mmol) | Al (eq) | Monomer | solvent$^a$ | Temp | Pressure MPa | Yield (g) | Incorp mole % | M.W. ($M_p$, $M_w$, $M_n$, PDI) |
|---|---|---|---|---|---|---|---|---|
| 7 D (0.01) | 1 (100) | VTMoS 3 mL | p-xylene | 80° C. | 3.45 | 5.112 | 0.06 | |
| 8 D (0.0014) | 2 (714) | VTMoS 0.5 mL | p-xylene | 80° C. | 3.45 | 3.451 | 0.02 | 7328, 8199, 3656, 1.77 |
| 9 D (0.0014) | 2 (714) | VTMoS 1.0 mL | p-xylene | 80° C. | 3.45 | 2.929 | 0.01 | 6876, 7609, 3384, 2.25 |
| 10 D (0.0014) | 1 (714) | VTMoS 0.5 mL | p-xylene | 80° C. | 3.45 | 2.683 | 0.015 | 7127, 11470, 3045, 3.77 |
| 11 D (0.0014) | 1 (714) | VTMoS 0.5 mL | p-xylene | 80° C. | 3.45 | 5.811 | 0.05 | 7519, 15133, 3439, 4.40 |

TABLE 2-continued

| Ex. | Catalyst (mmol) | Al (eq) | Monomer | solvent[a] | Temp | Pressure MPa | Yield (g) | Incorp mole % | M.W. ($M_p$, $M_w$, $M_n$, PDI) |
|---|---|---|---|---|---|---|---|---|---|
| 12 | D (0.0014) | 1 (714) | VTMoS 0.5 mL | p-xylene | 100° C. | 5.17 | 6.97 | 0.02 | 4790, 19184, 2173, 3.40 |
| 13 | E (0.002) | 3 (2000) | VTMoS 1.0 mL | p-xylene | 80° C. | 2.07 | 5.382 | 0.023 | 4394, 11341, 2387, 4.75 |
| 14 | F (0.002) | 3 (2000) | VTMoS 1.0 mL | p-xylene | 80° C. | 2.07 | 0.982 | 0.03 | |
| 15 | G (0.002) | 3 (2000) | VTMoS 1.0 mL | p-xylene | 80° C. | 2.07 | 6.309 | 0.008 | 482, 964, 386, 2.50 |
| 16 | D (0.0014) | 1 (714) | VTMoS 1.0 mL | 1,2,4-TCB | 120° C. | 5.17 | 1.63 | 0.032 | 4895, 7524, 2410, 3.12 |
| 17 | D (0.0014) | 1 (714) | VTEoS 1.0 mL | p-xylene | 120° C. | 5.17 | 6.981 | 0.033 | 1959, 3314, 1043, 3.13 |
| 18 | D (0.0014) | 1 (714) | VTEoS 1.0 mL | 1,2,4-TCB | 120° C. | 5.17 | 0.606 | 0.12 | |
| 19 | D (0.0014) | 1 (714) | VTEoS 1.0 mL | p-xylene | 120° C. | 5.17 | 1.184 | 0.015 | 1804, 4242, 1076, 3.94 |
| 20 | D (0.0014) | 1 (714) | ATMoS 1.0 mL | p-xylene | 80° C. | 3.45 | 2.377 | 0.013 | Insoluble |
| 21 | D (0.0014) | 1 (714) | ATMoS 1.0 mL | p-xylene | 120° C. | 5.17 | 4.744 | 0.014 | |

[a] Solvent volume is 10 mL minus the volume of the monomer

Experiment 1

Benzyl-di-t-butylphosphine

Di-t-butylchlorophosphine (75.0 g (0.415 mole)) and 0.5 mole of 12M solution of benzylmagnesium chloride in THF (200 ml) were refluxed under argon for 2 days. The reaction mixture was allowed to cool off to RT and an aqueous solution of ammonium chloride was added slowly. The organic phase was separated, and dried with magnesium sulfate. After removal of the solvent, the product was purified by distillation in vacuum. The yield of benzyl-di-t-butylphosphine was 94.3 g (96%) with b.p. 56-59° C./0.1 mm. 31-P-NMR ($CDCl_3$)+ 36.63 ppm. $^1H$ NMR ($CDCl_3$) 1.18 (s, 9H, $Me_3C$), 1.20 (s, 9H, $Me_3C$), 2.90 (d, $^2J_{PH}$=2.92 Hz, P—$CH_2$-Ph), 7.1-7:6 (m, 5H, aromatic protons).

Experiment 2

TMEDA Lithium Salt of Benzyldi-t-butylphosphine

Benzyldi-t-butylphosphine [5.0 g (0.021 mole)], 2.705 g (0.023 mole) of tetramethylethylenediamine (TMEDA), 20 ml of pentane and 15 ml of 1.7 M solution of tert-butyllithium in pentane were stirred at room temperature under nitrogen atmosphere for one day. After that the volume of the reaction mixture was decreased twice. The slow crystallization produced 3.8 g (51% yield) of lithium salt of benzyl-di-tert-butylphosphine as the TMEDA adduct with m.p. at 98.6° C. Elemental analysis for $C_{21}H_{40}LiN_2P$. Calculated % P 8.65. Found % P 8.74. $^{31}P$-NMR (THF-$D_8$) 17.94 ppm. The structure was proved by X-ray analysis.

Experiment 3

Synthesis of V

In a drybox, to a −30° C. THF solution of t-butylisocyanate (0.138 g in 15 mL THF) was added dropwise a −30° C. solution of TMEDA lithium salt of benzyl-di-t-butylphosphine in THF (0.50 g in 15 mL THF). As the orange solution warmed up to RT, solids formed. The thickened solution was stirred at RT overnight. To this solution was added 0.189 g ((allyl)$NiCl)_2$. The mixture was stirred overnight. The mixture was evaporated to dryness. The residue was extracted with toluene and was filtered through Celite®, followed by a toluene wash of the pad. The solution was evaporated to dryness and the solid was dried in vacuo overnight. Dark red-brown solid (0.579 g) was obtained.

Examples 22-58

General Polymerization Procedure

In a drybox, a glass insert was loaded with the isolated Ni catalysts. TCB, and optionally comonomers, were added to the glass insert. A Lewis acid cocatalyst (typically $BPh_3$ or $B(C_6F_5)_3$) was often added to the solution. The insert was then capped and sealed. Outside of the drybox, the tube was placed under ethylene and was shaken mechanically at the temperature listed in Table 3 for about 18 h. The resulting reaction mixture was mixed with methanol, filtered, repeatedly washed with methanol and the solid polymer dried in vacuo.

Standard conditions for most of these polymerizations are given in Table 3. Some other details of the polymerization processes are given in Tables 4-15, together with results on the polymeric products. "Mole %" in these tables refers to the mole percent incorporation of that monomer into the polymers.

TABLE 3

Conditions for Ethylene Copolymerizations In Glass Vials

| | |
|---|---|
| I | 0.005 mmol catalyst, 7 mL TCB, 3 mL VTMoS, 80° C., 18 h, 3.45 MPa ethylene, 40eq $BPh_3$ |
| II | 0.00125 mmol Catalyst H, 7 mL TCB, 3 mL VTMoS, 18 h, 6.89 MPa ethylene |
| III | 0.005 mmol catalyst, 7 mL TCB, 3 mL VTMoS, 80° C., 18 h, 3.45 MPa ethylene, 40eq $B(C_6F_5)_3$ |
| IV | 0.00125 mmol Catalyst H, 9 mL TCB, 1 mL VTMoS or VTEoS, RT, 18 h, 5.52 MPa ethylene, 80 q $B(C_6F_5)_3$ |
| V | 0.005 mmol Catalyst, 9 mL TCB, 1 mL VTMoS, RT, 18 h, 5.52 MPa ethylene, 40eq $B(C_6F_5)_3$ |
| VI | 0.002 mmol Catalyst, 9 mL TCB, 1 mL VTMoS, RT, 18 h, 5.52 MPa ethylene, 40eq $B(C_6F_5)_3$ |
| VII | 0.02 mmol Catalyst, 5 mL TCB, 5 mL VTMoS, 60° C., 18 h, 690 kPa ethylene |
| VIII | 0.005 mmol Catalyst, 8 mL TCB, 1 mL VTMoS, 1.0 g norbornene, 60° C., 18 h, 4.1 MPa ethylene |

TABLE 4

Condition I in Table 3

| Ex | Catalyst | Yield (g) | #Me/1000CH$_2$ | Mole % VTMoS | m.p. (° C.) ($\Delta H_f$*) | Mw/PDI |
|---|---|---|---|---|---|---|
| 22 | R | 0.523 | 24 | 7.3 | 91<br>66 (93.4) | 3,773/4.2 |
| 23 | Q | 3.465 | 16 | 3.9 | 102 (101.8) | 7,160/2.3 |
| 24 | H | 10.663 | 25 | 2.1 | 110 (125.0) | 12,075/4.4 |
| 25 | O | 0.716 | 23 | 9.2 | 85<br>63 (57.0) | 7,565/7.1 |

TABLE 5

Condition II in Table 3

| Ex | T (° C.) | BPh$_3$ (equiv.) | Yield (g) | #Me/1000CH$_2$ | Mole % VTMoS | m.p. (° C.) ($\Delta H_f$*) | Mw/PDI |
|---|---|---|---|---|---|---|---|
| 26 | 60 | 0 | 2.829 | 24 | 4.0 | 118 (233.4) | 4,496/2.3 |
| 27 | 60 | 40 | 3.853 | 23 | 4.3 | 116 (239.5) | 4,982/2.4 |
| 28 | 80 | 0 | 2.269 | 30 | 4.3 | 116 (90.3) | 3,440/2.1 |
| 29 | 80 | 40 | 2.522 | 23 | 2.6 | 116 (171.2) | 7,225/3.4 |
| 30 | 100 | 0 | 2.727 | 30 | 2.2 | 108<br>115 (177.9) | 2,910/2.0 |
| 31 | 100 | 40 | 2.602 | 40 | 3.8 | 108<br>116 (165.2) | 3,596/2.6 |

TABLE 6

Condition III in Table 3

| Ex | Catalyst | Yield (g) | #Me/1000CH$_2$ | Mole % VTMoS | m.p. (° C.) ($\Delta H_f$*) | Mw/PDI |
|---|---|---|---|---|---|---|
| 32 | V | 0.026 | 20 | 4.7 | / | / |
| 33 | U | 0.691 | 12 | 2.8 | 102 (54.6) | 8,118/8.9 |
| 34 | T | 1.689 | 27 | 3.5* | 105 (136.1) | 5,166/4.6 |

*According to $^{13}$CNMR spectroscopy of the same copolymer, VTMoS incorporation was 2.51 mole % (2.32% IC, 0.19% EG).

TABLE 7

Condition IV in Table 3

| Ex | Monomer | Yield (g) | #Me/1000CH$_2$ | Mole % VT(M)(E)oS | Mw/PDI |
|---|---|---|---|---|---|
| 35 | VTMoS | 4.306 | 5 | 0.2 | 40,133/3.7 |
| 36 | VTEoS | 1.992 | 4 | 0.3 | 71,664/5.6 |

TABLE 8

Reaction Using 0.00125 mmol Catalyst O, 9 mL TCB, 1 mL VTMoS, RT, 18 h, 5.52 MPa Ethylene, 80eq BPh$_3$

| Ex | Yield (g) | #Me/1000CH$_2$ | Mole % VTMoS | Mw/PDI |
|---|---|---|---|---|
| 37 | 0.681 | 6 | 0.2 | 156,984/2.2 |

TABLE 9

Reaction Using 0.00125 mmol Catalyst H, 9 mL TCB, 1 mL VTMoS or VTEoS, 100° C., 18 h, 6.89 MPa Ethylene, 80eq B(C$_6$F$_5$)$_3$

| Ex | Monomer | Yield (g) | #Me/1000CH$_2$ | Mole % VTMoS or VTEoS | Mw/PDI |
|---|---|---|---|---|---|
| 38 | VTMoS | 3.028 | 10 | 0.4 | 21,183/5.1 |
| 39 | VTEoS | 3.242 | 10 | 0.6 | 12,475/3.6 |

TABLE 10

Reaction Using 0.00125 mmol Catalyst H, 7 mL TCB, 1 mL VTEoS and 2 mL 1-hexene, 100° C., 18 h, 6.89 MPa ethylene, 80eq B(C$_6$F$_5$)$_3$

| Ex | Yield (g) | #Me/1000CH$_2$ | Mole % 1-hexene | Mole % VTEoS | Mw/PDI |
|---|---|---|---|---|---|
| 40 | 0.76 | 21* | 0.9* | 3.4* | 7,663/3.2 |

*Based on $^{13}$CNMR

TABLE 11

Reaction Using 0.00125 mmol Catalyst Q, 9 mL TCB, 1 mL VTMoS, 100° C., 18 h, 6.89 MPa Ethylene, 80eq BPh$_3$

| Ex | Yield (g) | #Me/1000CH$_2$ | Mole % VTMoS | Mw/PDI |
|---|---|---|---|---|
| 41 | 3.25 | 29 | 0.3 | 32,800/4.5 |

TABLE 12

Reactions Using 0.0005 mmol Catalyst, 9 mL TCB, 1 mL VTMoS, RT, 18 h, 5.52 MPa Ethylene

| Ex | Catalyst | B(C$_6$F$_5$)$_3$ (equiv.) | BPh$_3$ (equiv.) | Yield (g) | #Me/1000CH$_2$ | Mole % VTMoS | Mw/PDI |
|---|---|---|---|---|---|---|---|
| 42 | H | 0 | 0 | 8.10 | 6 | 1.1 | 15,700/2.7 |
| 43 | H | 80 | 0 | 8.04 | 3 | 0.2 | 67,800/8.0 |
| 44 | H | 0 | 80 | 7.47 | 6 | 0.8 | 57,000/7.4 |
| 45 | M | 0 | 0 | 3.15 | 11 | 3.7 | 8,800/2.5 |
| 46 | M | 0 | 80 | 4.48 | 8 | 1.1 | 113,900/18.9 |

TABLE 13

Condition V in Table 3

| Ex | Catalyst | Yield (g) | #Me/1000CH$_2$ | Mole % VTMoS | Mw/PDI |
|---|---|---|---|---|---|
| 47 | S | 8.57 | 10 | 0.1 | Not Soluble |
| 48 | P | 2.24 | 17 | 0.04 | 50,500/37.2 |
| 49 | N | 6.01 | 26 | 1.2 | 11,000/6.1 |

TABLE 14

Condition VI in Table 3

| Ex | Catalyst | Yield (g) | #Me/1000CH$_2$ | Mole % VTMoS | Mw/PDI |
|---|---|---|---|---|---|
| 50 | I | 5.505 | 8 | 0.4 | 14,415/5.5 |
| 51 | J | 15.117 | 9 | 0.8 | 23,643/6.7 |
| 52 | K | 1.839 | 11 | 0.3 | 17,158/11.6 |
| 53 | L | 4.746 | 12 | 0.8 | 5,588/4.1 |
| 54 | H | 8.894 | 11 | 0.8 | 21,868/3.7 |

TABLE 15

Condition VII in Table 3

| Ex | Catalyst | Yield (g) | #Me/1000CH$_2$ | Mole % VTMoS |
|---|---|---|---|---|
| 55 | I | 3.206 | 21 | 10.2 |
| 56 | J | 1.114 | 18 | 6.2 |
| 57 | H | 5.837 | 21 | 9.2 |
| 58 | M | 2.583 | 18 | 7.0 |

The following listing gives the data of a $^{13}$C NMR spectrum of the polymer made in Example 34 (see Table 6). The calibration is such that the TCB peak is at 127.918 ppm. The spectrum was run on a Bruker Avance® 500 MHz spectrometer at 120° C. using 317 mg of polymer dissolved in TCB to a total volume of 3.1 ml. In the listing below the designations the structures represented by some of the peaks (last column) are found in FIG. 2. Other designations are defined in previously incorporated U.S. Pat. No. 5,880,241.

| Index | Frequency, Hz | δ, ppm | Intensity | |
|---|---|---|---|---|
| 1 | 19340.297 | 153.735 | 0.34 | V |
| 2 | 17492.873 | 139.050 | 1.5 | F |
| 3 | 17093.461 | 135.875 | 0.31 | |
| 4 | 17006.227 | 135.181 | 0.79 | |
| 5 | 16968.494 | 134.882 | 2.46 | |
| 6 | 16846.947 | 133.915 | 193.71 | |
| 7 | 16786.719 | 133.437 | 236.8 | |
| 8 | 16754.234 | 133.178 | 5.14 | |
| 9 | 16711.967 | 132.842 | 1.23 | |
| 10 | 16553.945 | 131.586 | 203.19 | TCB |
| 11 | 16532.863 | 131.419 | 17.71 | |
| 12 | 16488.236 | 131.064 | 600 | TCB |
| 13 | 16460.029 | 130.840 | 13.91 | |
| 14 | 16435.576 | 130.645 | 25.14 | |
| 15 | 16407.293 | 130.421 | 561.1 | TCB |
| 16 | 16369.630 | 130.121 | 6.72 | |
| 17 | 16189.216 | 128.687 | 5.88 | |
| 18 | 16092.383 | 127.918 | 528.55 | TCB |
| 19 | 16059.675 | 127.657 | 5.95 | |
| 20 | 16008.888 | 127.254 | 2.28 | |
| 21 | 15808.684 | 125.662 | 0.17 | A |
| 22 | 15549.071 | 123.599 | 0.33 | C |
| 23 | 14968.029 | 118.980 | 0.39 | U |
| 24 | 14368.763 | 114.216 | 1.68 | E |
| 25 | 6345.199 | 50.438 | 6.64 | G |
| 26 | 6315.521 | 50.202 | 1.92 | |
| 27 | 4718.032 | 37.503 | 1.99 | αB |
| 28 | 4622.789 | 36.746 | 0.38 | |
| 29 | 4379.232 | 34.810 | 0.17 | |
| 30 | 4345.250 | 34.540 | 0.44 | |
| 31 | 4284.008 | 34.053 | 0.26 | |
| 32 | 4259.902 | 33.862 | 1.39 | |
| 33 | 4178.984 | 33.219 | 1.23 | MB$_1$ |
| 34 | 4117.910 | 32.733 | 0.2 | |
| 35 | 4044.209 | 32.147 | 3.08 | 3B$_{6+}$, 3EOC |
| 36 | 3813.351 | 30.312 | 7.18 | |
| 37 | 3769.264 | 29.962 | 191.68 | CH$_2$'s |
| 38 | 3715.886 | 29.537 | 4.95 | |
| 39 | 3700.814 | 29.418 | 3.02 | |
| 40 | 3677.321 | 29.231 | 3.91 | |
| 41 | 3621.997 | 28.791 | 0.72 | |
| 42 | 3447.644 | 27.405 | 2.47 | β$_{to}$ branch |
| 43 | 3432.221 | 27.283 | 0.84 | |
| 44 | 3363.793 | 26.739 | 0.25 | |
| 45 | 3059.051 | 24.316 | 0.18 | |
| 46 | 2944.907 | 23.409 | 1.62 | MSB$_0$ |
| 47 | 2887.730 | 22.954 | 0.73 | |
| 48 | 2872.384 | 22.832 | 3.48 | 2B$_{5+}$, 2EOC |
| 49 | 2508.885 | 19.943 | 1.27 | 1B$_1$ |
| 50 | 1764.188 | 14.023 | 3.66 | 1B$_{4+}$, 1EOC |
| 51 | 1589.083 | 12.632 | 0.26 | |
| 52 | 1236.953 | 9.833 | 0.37 | 1SB$_{4+}$ |

Examples 59-75

General Information Regarding Molecular Weight Analysis: GPC molecular weights are reported versus polystyrene standards. Unless noted otherwise, GPC's were run with RI detection at a flow rate of 1 mL/min at 135° C. with a run time of 30 min. Two columns were used: AT-806MS and WA/P/N 34200. A Waters RI detector was used and the solvent was TCB with 5 grams of BHT per gallon. Dual UV/RI detection GPC was run in THF at RT using a Waters 2690 separation module with a Waters 2410 RI detector and a Waters 2487 dual absorbance detector. Two Shodex columns, KF-806M, were used along with one guard column, KF-G. In addition to GPC, molecular weight information was at times determined by $^1$H NMR spectroscopy (olefin end group analysis) and by melt index measurements (g/10 min at 190° C.).

General Procedure for Ethylene Polymerizations and copolymerizations: In a nitrogen-purged drybox, a glass insert was loaded with the nickel or palladium compound and, optionally, a Lewis acid (e.g., BPh$_3$ or B(C$_6$F$_5$)$_3$) and borate (e.g., NaBAF or LiBArF) and any other specified cocatalysts. Next, the solvent was added to the glass insert followed by the addition of any co-solvents and then comonomers. The insert was greased and capped. The glass insert was then loaded in a pressure tube inside the drybox. The pressure tube was then sealed, brought outside of the drybox, connected to the pressure reactor, placed under the desired ethylene pressure and shaken mechanically. After the stated reaction time, the ethylene pressure was released and the glass insert was removed from the pressure tube. The polymer was precipitated by the addition of MeOH (~20 mL). A small amount of triethylamine was added to the solution, and optionally, approximately 1 mL of (EtO)$_3$Si(i-Bu) or (EtO)$_4$Si. The polymer was then collected on a frit and rinsed with MeOH. The polymer was transferred to a pre-weighed vial and dried under vacuum overnight. The polymer yield and characterization were then obtained.

$^{13}$C NMR spectrum were run without Cr(acac)$_3$ unless specified otherwise.

Tables 16-21 gives the conditions of the polymerizations and information on the polyolefins obtained. Table 22 gives branching analyses (by $^{13}$C NMR) of polymers produced in several of these examples. The branching stated in Tables 22A and 22B is per 1000 methylene groups, but is not corrected for ends of chains.

TABLE 16

Terpolymerization of Ethylene (6.9 MPa), VTEoS (1 mL) and EGPEA (1 mL) at 120° C. (8 mL p-Xylene, 204.8 mg B(C$_6$F$_5$)$_3$, 177.2 mg of NABAF, 18 h)

| Ex. | Cmpd (mmol) | Yield g | VTEoS Incorp. Mol % | Acrylate Incorp. Mol % | M.W. | Total Me |
|---|---|---|---|---|---|---|
| 59 | W | 4.41 | 0.70 ($^{13}$C) | 0.36; 0.14 IC 0.22 EG ($^{13}$C$^a$) | M$_p$ = 2,922; M$_w$ = 13,467; M$_n$ = 1,591; PDI = 8.47 | 11.9 ($^{13}$C$^a$) |

$^a$$^{13}$C NMR spectrum was run with Cr(acac)$_3$ present. According to $^1$H NMR spectroscopy of the same copolymer, EGPEA incorp. is 1.4% (0.49% IC, 0.91% EG) and VTEoS incorp. is 0.43% (0.13% IC, 0.14% EB, 0.16% EG).

TABLE 17

Copolymerization of Ethylene and VTEoS or VTMoS at 60° C. [102.4 mg B(C$_6$F$_5$)$_3$, 18 h]

| Ex. | Cmpd (mmol) | Comonomer mL | Press. MPa | Solvent(s) ML | Yield g | VTEoS/VTMoS Incorp. Mol % | M.W. | Total Me |
|---|---|---|---|---|---|---|---|---|
| 60 | X | VTEoS 1 | 4.1 | p-Xylene 8.5 Ethyl Acetate 0.5 | 5.54 | 1.63 ($^{13}$C) | M$_p$ = 34,515; M$_w$ = 57,305; M$_n$ = 17,310; PDI = 3.31 | 12.9 ($^{13}$C) |
| 61 | X | VTEoS 1 | 1.0 | p-Xylene 8 Ethyl Acetate 1 | 3.88 | 3.39 ($^{13}$C) | M$_p$ = 24,226; M$_w$ = 31,963; M$_n$ = 12,963; PDI = 2.47 | 28.7 ($^{13}$C) |
| 62 | W | VTMoS 1 | 5.5 | Isooctane 9 | 0.41 | 1.80 ($^1$H) | M$_n$($^1$H) = 11,260 | 4.9 ($^1$H) |
| 63 | X | VTMoS 1 | 5.5 | p-Xylene 9 | >3.49$^b$ | 1.46 ($^1$H) | M$_n$($^1$H) = No olefins | 12.9 ($^1$H) |
| 64 | Y | VTMoS 1 | 5.5 | p-Xylene 9 | >0.25$^b$ | 13.59 ($^1$H) | M$_n$($^1$H) = No olefins | 32.9 ($^1$H) |
| 65 | Z | VTMoS 1 | 5.5 | p-Xylene 9 | >0.08$^b$ | 0.05 ($^1$H) | M$_n$($^1$H) = No olefins | 3.9 ($^1$H) |
| 66 | W | VTMoS 1 | 5.5 | p-Xylene 9 | 0.39 | 1.29 ($^1$H) | M$_n$($^1$H) = 8,780 | 3.5 ($^1$H) |
| 67 | DD | VTEoS 1 | 4.1 | p-Xylene 9 | 1.72 | 0.19 ($^{13}$C) | M$_p$ = 59,937; M$_w$ = 56,187; M$_n$ = 29,531; PDI = 1.90 | 112.4 ($^{13}$C) |

$^a$For the $^{13}$C NMR spectrum run with Cr(acac)$_3$: 5.43 mole % VTEoS incorporation; 19.2 Total Me. For the $^1$H NMR spectrum: 1.9 mole % VTEoS incorporation; 35-45% of Si(OEt)$_3$ groups are incorporated in-chain and the remainder are located at the ends of branches or at the ends of chains; 14.6 Total Me; M$_n$ = 18,150. From the $^{29}$Si NMR spectrum: 29-35% of Si(OEt)$_3$ groups are incorporated in-chain and the remainder are located at the ends of branches or at the ends of chains.
$^b$Only a fraction of the polymer was isolated and weighed.

The $^{13}$C NMR analysis of the polymer of Example 61 is detailed in the table immediately below:

| Index | Frequency, Hz | Frequency, ppm | Intensity | Peak assignment |
|---|---|---|---|---|
| 1 | 7360.012 | 58.504 | 4.36 | CH$_2$'s of RSiOEt$_3$, EtOH |
| 2 | 7339.097 | 58.338 | 7.27 | CH$_2$'s of RSiOEt$_3$, EtOH |
| 3 | 5084.703 | 40.418 | 0.47 | |
| 4 | 4992.975 | 39.689 | 0.40 | MB$_2$ |
| 5 | 4804.840 | 38.193 | 1.05 | MB$_3$+ |
| 6 | 4781.408 | 38.007 | 0.80 | MB$_3$+ |
| 7 | 4719.437 | 37.515 | 6.48 | B$_1$ |
| 8 | 4668.750 | 37.112 | 0.96 | B$_1$ |
| 9 | 4377.204 | 34.794 | 0.69 | |
| 10 | 4346.790 | 34.552 | 3.86 | B$_{3+}$ |
| 11 | 4308.405 | 34.247 | 0.50 | |
| 12 | 4285.451 | 34.065 | 1.06 | |
| 13 | 4269.436 | 33.938 | 1.16 | MB$_1$ |
| 14 | 4239.156 | 33.697 | 0.93 | |
| 15 | 4180.149 | 33.228 | 3.60 | MB$_1$ |
| 16 | 4109.614 | 32.667 | 0.27 | 3B$_5$ |
| 17 | 4045.341 | 32.156 | 0.72 | 3B$_6$+, 3EOC |
| 18 | 3832.184 | 30.462 | 7.24 | |

-continued

| Index | Frequency, Hz | Frequency, ppm | Intensity | Peak assignment |
|---|---|---|---|---|
| 19 | 3818.750 | 30.355 | 11.43 | $CH_2$'s |
| 20 | 3770.353 | 29.970 | 162.79 | $CH_2$'s |
| 21 | 3716.071 | 29.539 | 1.22 | $CH_2$'s |
| 22 | 3683.974 | 29.284 | 1.81 | $CH_2$'s |
| 23 | 3498.051 | 27.806 | 0.81 | $B_2+$ |
| 24 | 3448.654 | 27.413 | 7.47 | $B_2+$ |
| 25 | 3432.628 | 27.286 | 5.39 | $B_2+$ |
| 26 | 3392.604 | 26.968 | 0.64 | $B_2+$ |
| 27 | 3362.671 | 26.730 | 0.52 | $B_2+$ |
| 28 | 3093.992 | 24.594 | 0.20 | |
| 29 | 3013.120 | 23.951 | 0.76 | $MSB_0$ |
| 30 | 2984.014 | 23.720 | 0.25 | $2SB_4$ (tent) |
| 31 | 2937.068 | 23.347 | 0.33 | $2B_4$ |
| 32 | 2915.681 | 23.177 | 0.56 | $2SB_5+$ (tent) |
| 33 | 2873.521 | 22.841 | 0.95 | $2B_5+$ |
| 34 | 2594.025 | 20.620 | 0.31 | $2SB_3$ (tent) |
| 35 | 2554.888 | 20.309 | 0.44 | $2B_3$ |
| 36 | 2508.997 | 19.944 | 3.92 | $1B_1$ |
| 37 | 2330.085 | 18.522 | 13.12 | $CH_3$'s of $RSiOEt_3$, EtOH |
| 38 | 2129.444 | 16.927 | 0.50 | $1SB_1$ |
| 39 | 1832.811 | 14.569 | 0.35 | $1B_3$ |
| 40 | 1765.824 | 14.036 | 1.06 | $1B_4+$, 1EOC |
| 41 | 1466.504 | 11.657 | 0.40 | $1SB_3$ |
| 42 | 1411.958 | 11.224 | 0.73 | $1SB_4+$, $1B_2$ |
| 43 | 1001.326 | 7.960 | 0.51 | $1SB_2$ |

TABLE 18

Terpolymerization of Ethylene (1.03 MPa), VTMoS (1 mL), and 1-Hexene (1 mL) at 60° C. (102.4 mg $B(C_6F_5)_3$, 18 h)

| Ex. | Cmpd (mmol) | Solvent(s) ML | Yield g | VTMoS Incorp. Mol % | M.W. | Total Me |
|---|---|---|---|---|---|---|
| 68 | X | p-Xylene 8 | 1.87 | 6.43 ($^1H$) | $M_n(^1H) = 15,650$ | 47.7 ($^1H$) |
| 69 | X | p-Xylene 7 Ethyl Acetate 1 | 3.26 | 4.59 ($^1H$) | $M_n(^1H) = 20,400$ | 57.9 ($^1H$) |

TABLE 19

Terpolymerization of Ethylene (1.0 MPa), VTMoS (1 mL), and NBFOH (2 mL) at 60° C. (102.4 mg $B(C_6F_5)_3$, 18 h)

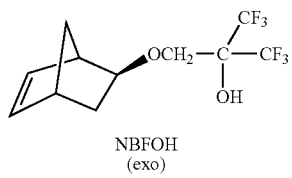

NBFOH
(exo)

| Ex. | Cmpd (mmol) | Solvent(s) mL | Yield g | VTMoS Incorp. Mol % | NBFOH Incorp. Mol % | M.W. | Total Me |
|---|---|---|---|---|---|---|---|
| 70 | W | p-Xylene 7 | 0.47 | 2.97[a] ($^{13}C$) 2.56 IC & EB 0.41 EG | 0.03 | $M_n(^1H)$ = 3,160 | 15.2 ($^{13}C$) |

[a] $^1H$ NMR analysis of the same copolymer gives 0.49% NBFOH incorp. and 4.84% VTMoS incorp. (3.96% IC, 0.45% EB, 0.43% EG)

TABLE 20

Copolymerization of Ethylene (2.1 MPa) and VTEoS (1 mL) at 120° C. [102.4 mg $B(C_6F_5)_3$, 18 h]

| Ex. | Cmpd (mmol) | Solvent(s) mL | Yield g | VTEoS Incorp. Mol % | M.W. | Total Me |
|---|---|---|---|---|---|---|
| 71 | AA | p-Xylene 8 Ethyl Acetate 1 | 1.51 | 2.30 ($^{13}C$) | $M_p = 8,875; M_w = 10,949;$ $M_n = 5,108;$ PDI = 2.14 | 82.0 ($^{13}C$) |
| 72 | BB | p-Xylene 8 Ethyl Acetate 1 | 0.86 | 0.98 ($^{13}C$) | $M_p = 34,661; M_w = 40,509;$ $M_n = 18,431;$ PDI = 2.20 | 129.9 ($^{13}C$) |
| 73 | Y | p-Xylene 8 Ethyl Acetate 1 | 0.92 | 2.41 ($^{13}C$) | $M_p = 12,132; M_w = 26,986;$ $M_n = 8,100;$ PDI = 3.33 | 111.8 ($^{13}C$) |
| 74 | CC | p-Xylene 8 Ethyl Acetate 1 | 2.48 | 1.42 ($^{13}C$) | $M_p = 18,367; M_w = 19,846;$ $M_n = 9,123;$ PDI = 2.18 | 76.3 ($^{13}C$) |

TABLE 21

Copolymerization of Ethylene (3.5 MPa) and VTMoS (10 mL) at 90° C. [102.4 mg $B(C_6F_5)_3$, 18 h]

| Ex. | Cmpd (mmol) | Solvent(s) mL | Yield g | VTMoS Incorp. Mol % | M.W. | Total Me |
|---|---|---|---|---|---|---|
| 75 | CC | None | 0.18 | 31.95 ($^1H$) | $M_n(^1H) = 7,940$ | 36.8 ($^1H$) |

TABLE 22A

13C NMR Branching Analysis for VTMoS and VTEoS Copolymers

| Ex. | Total Me | Me | Et | Pr | Bu | Hex+ & eoc | Am+ & eoc | Bu+ & eoc |
|---|---|---|---|---|---|---|---|---|
| 59 | 11.9 | 3.0 | 1.4 | 0.2 | 0.3 | 6.5 | 5.9 | 7.3 |
|  |  | 25.2% | 11.6% | 2.0% | 2.3% | 54.6% | 49.4% | 61.2% |
| 60 | 12.9 | 10.4 | 0.0[a] | 0.4 | 1.0 | 6.1 | 1.7 | 2.2 |
|  |  | 80.3% |  | 2.8% | 8.1% | 47.0% | 13.2% | 16.9% |
| 61 | 28.7 | 20.8 | 2.1 | 1.0 | 2.7 | 2.3 | 3.8 | 4.8 |
|  |  | 72.4% | 7.3% | 3.5% | 9.2% | 8.1% | 13.2% | 16.9% |
| 67 | 112.4[b] | 38.4 | 26.5 | 2.5 | 8.5 | 25.8 | 30.0 | 45.0 |
|  |  | 34.2% | 23.6% | 2.2% | 7.6% | 22.9% | 26.7% | 40.0% |
| 70 | 15.2 | 4.9 | 1.3 | 0.4 | 5.6 | 5.8 | 7.2 | 8.6 |
|  |  | 32.1% | 8.5% | 2.6% | 36.8% | 38.0% | 47.4% | 56.7% |
| 71 | 82.0 | 44.6 | 13.0 | 3.7 | 4.1 | 10.2 | 13.2 | 20.7 |
|  |  | 54.4% | 15.8% | 4.6% | 5.0% | 12.5% | 16.0% | 25.3% |
| 72 | 129.9 | 78.0 | 19.5 | 4.1 | 6.4 | 14.1 | 19.1 | 28.3 |
|  |  | 60.0% | 15.0% | 3.2% | 4.9% | 10.8% | 14.7% | 21.8% |
| 73 | 111.8 | 61.5 | 19.3 | 4.3 | 7.7 | 12.3 | 14.5 | 26.7 |
|  |  | 55.0% | 17.2% | 3.9% | 6.9% | 11.0% | 13.0% | 23.9% |
| 74 | 76.3 | 44.5 | 11.9 | 3.3 | 4.1 | 8.4 | 10.3 | 16.5 |
|  |  | 58.4% | 15.7% | 4.4% | 5.4% | 11.0% | 13.5% | 21.6% |

[a]Et branching peak under n = 4+ Si branching peak.
[b]1B1 = 18.0%, and 1B2 = 37.3%

TABLE 22B

Analysis of the Spacing (n) between Si and the Copolymer Backbone for VTMoS and VTEoS Copolymers

| Ex. | n = 0, % | n = 1, % | n = 2, % | n = 3, % | n = 4+, % |
|---|---|---|---|---|---|
| 59 | 50.0 | 12.5 | 0.0 | 0.0 | 37.5 |
| 60 | 40.0 | 13.3 | 13.3 | 6.7 | 26.7 |
| 61 | 21.6 | 20.9 | 20.2 | 12.6 | 24.6 |
| 70 | 87.5 | 8.3 | 0.0 | 0.0 | 4.2 |
| 73 | 25.0 | Nd[a] | 25.0 | 25.0 | 25.0 |
| 74 | 50.0 | 12.5 | 12.5 | 12.5 | 12.5 |

[a]Nd: Not detected.

Example 76

Copolymerization of Propylene with VTEoS

A 600 mL autoclave was charged with 100 mL of toluene, 2 mL of MMAO (3M) and ~480 kPa of propylene at RT. Then 10 mL of toluene solution containing 0.0169 g (0.01 mmol) of X, 0.6041 g (1.18 mmol) of tris(pentafluorophenyl)borane and 5 mL of VTEoS were transferred to the reactor. The autoclave was maintained at a pressure of 460-480 kPa with propylene and stirred for one h. The propylene was vented and the solution with some sticky material was rotary evaporated to yield a tan color powder which was rinsed with ether, methylene chloride and ethanol. copolymer (2.45 g) was collected. $^1$HNMR (TCE-d$_2$, 120° C.): 3.6 (q, 6, CH$_2$O), 1.22 (s, 1, CH), 1.5 (t, 9H, CH$_3$), 0.93 (br, 2H).

Example 77

Copolymerization of Propylene with VTEoS

A 600 mL autoclave was charged with 100 mL of toluene, 2 mL of MMAO (3M) and ~480 kPa of propylene at RT. Then 10 mL of toluene solution containing 0.0169 g (0.01 mmol) of X, 0.6041 g (1.18 mmol) of tris(pentafluorophenyl)borane and 0.5 mL of VTEoS was transferred to the reactor. The autoclave was maintained at a pressure of 460-480 kPa with propylene and stirred for one h. The propylene was vented and the solution with some sticky material was rotary evaporated to yield a tan color powder which was rinsed with ether, methylene chloride and ethanol. Brown powder product (1.02 g) was collected.

Examples 78-79

Terpolymerizations of Ethylene, VTMoS and VTEoS

Glass vials (50 mL) were charged with 0.001 mmol of catalyst, 0.1024 g (0.2 mmol) of tris(pentafluorophenyl)-borane, 3 mL of cyclohexane, 1 ml of VTMoS (6.54 mmol) and 1 ml of VTEoS (4.74 mmol). The vials were placed into a pressure tube, sealed and removed from the dry box. The pressure tube was connected to a high pressure ethylene shaker reaction unit and the polymerization was carried out at 50° C. and 6.9 MPa ethylene for 18 h. After the reaction, the reaction mixture was worked up by pumping under high vacuum to remove all the volatile materials and then washed with dry methanol. Product details are given in Table 23. It was observed during characterization and manipulation of the polymer that the NMR signals of the two incorporated vinylsilanes generally reflected their relative concentrations in the monomer mixture. However during purification and workup, the intensity of the trimethoxysilyl group decreased relative to that of the triethoxysilyl group.

TABLE 23

| Ex. | Catalyst | Polymer (g) |
|---|---|---|
| 78 | X | 5.8821 |
| 79 | J | 0.717 |

Examples 80-86

Terpolymerizations of Ethylene with VTMoS and Non-Silane Vinyl Monomers

Glass vials (50 mL experiments) were charged with 0.001 mmol of J, 0.1024 g (0.2 mmol) of tris(pentafluorophenyl)-borane, 3 mL cyclohexane, 1 ml of vinyl monomer (see table below) and 1 ml of VTEoS. The vials were placed into a pressure tube, sealed and removed from the dry box. The pressure tube was connected to a high pressure ethylene shaker reaction unit and the polymerization was carried out at 50° C. and 6.9 MPa ethylene for 18 h. After the polymerization, the reaction mixture was worked up by pumping under high vacuum to remove all the volatile materials and then washing with dry methanol. Results are given in Table 24.

TABLE 24

| Ex. No. | Termonomer | Polymer yield (g) | Product. KgPE/gNi | Mw, PDI | VTEoS Incorp (%) | Termon. Incorp (%) |
|---|---|---|---|---|---|---|
| 80 | E-10-U | 1.543 | 28.3 | 9411 5.16 | 1.02 | 0.43 |
| 81 | Cyclopentene | 6.881 | 138 | 24010 4.47 | 0.41 | ND |
| 82 | 1-hexene | 2.974 | 32.3 | 6916 6.08 | ~0.3 | ND |
| 83 | TMS-acrylate | 0.267 | 1.22 | 1809 2.39 | 0.73 | 2-3 |
| 84 | MA | 0.328 | 1.38 | 2408 2.54 | 0.72 | 2.23 |
| 85 | EGPEA | 0.196 | 0.86 | 7076 4.28 | ND | ND |
| 86 | dicyclo-pentadiene | 7.65 | 13 | 371249 4.469 | 0.12 | 4.85 |

Examples 87-90 and Comparative Examples A-D

General Information Regarding Molecular Weight Analysis

GPC molecular weights are reported versus polystyrene standards. Unless noted otherwise, GPC's were run with RI detection at a flow rate of 1 mL/min at 135° C. with a run time of 30 min. Two columns were used: AT-806MS and WA/P/N 34200. A Waters® RI detector was used and the solvent was TCB with 5 grams of BHT per gallon. Dual UV/RI detection GPC was run in THF at rt using a Waters® 2690 separation module with a Waters® 2410 RI detector and a Waters® 2487 dual absorbance detector. Two Shodex® columns, KF-806M, were used along with one guard column, KF-G. In addition to GPC, molecular weight information was at times determined by $^1$H NMR spectroscopy (olefin end group analysis) and by melt index measurements (g/10 min at 190° C.).

General Procedure for Ethylene Polymerizations and Copolymerizations

In a nitrogen-purged drybox, a glass insert was loaded with the specified amount of $B(C_6F_5)_3$. Next, the solvent was added to the glass insert followed by the addition of any co-solvents and then comonomers. Finally, the nickel compound dissolved in 0.4 mL of $Et_2O$ was added to the glass insert via syringe. The same standard solution of the nickel complex was used for all of the entries in each table below. The insert was greased and capped. The glass insert was then loaded in a pressure tube inside the drybox. The glass inserts for all of the entries in each table below were loaded inside the same pressure tube. The pressure tube was then sealed, brought outside of the drybox, connected to the pressure reactor, placed under the desired ethylene pressure and shaken mechanically. After the stated reaction time, the ethylene pressure was released and the glass insert was removed from the pressure tube. The polymer was precipitated by the addition of MeOH (~20 mL). A small amount of triethylamine was added to the solution, and optionally, approximately 1 mL of $(EtO)_3Si(i-Bu)$ or $(EtO)_4Si$. The polymer was then collected on a frit and rinsed with MeOH. The polymer was transferred to a pre-weighed vial and dried under vacuum overnight. The polymer yield and characterization were then obtained.

$^{13}$C NMR spectra for any Si-containing copolymer were run without $Cr(acac)_3$ unless specified otherwise. $^{13}$C NMR spectra for any homopolymer of ethylene were run in the presence of $Cr(acac)_3$. For methods for NMR analysis for branching and interpretations of those results see previously incorporated U.S. Pat. No. 5,880,241, which is hereby included by reference.

Polymerization conditions and results of the polymerizations are found in Tables 25-28.

TABLE 25

Copolymerization of Ethylene (4.1 MPa) at 60° C. with X (0.0001 mmol) (10 mL p-Xylene, 102.4 mg $B(C_6F_5)_3$, 18 h)

| Ex. | Comonomer or Additive 1.7 mmol | Yield G | Comon. Incorp. Mol % | M.W. | Total Me |
|---|---|---|---|---|---|
| 87 | VTMoS | 0.92 | 0.78 | $M_w = 29,564$; $M_n = 13,613$ | 8.7 ($^1$H) |
| 87a | ATMoS | 0.21 | 0.60 | $M_w = 22,495$; $M_n = 10,711$ | 8.8 ($^1$H) |
| A | 1-Docos-21-enyl-TEoS | 1.44 | 0.0 | $M_w = 86,456$; $M_n = 37,394$ | Nd |

TABLE 26

Copolymerization of Ethylene (4.1 MPa) at 60° C. with A (0.0001 mmol) (10 mL p-Xylene, 102.4 mg $B(C_6F_5)_3$, 18 h)

| Ex. | Comonomer or Additive 1.7 mmol | Yield G | Comon. Incorp. Mol % | M.W. | Total Me |
|---|---|---|---|---|---|
| 88a | ATMoS | 0.17 | 0.38 | $M_w = 92,565$; $M_n = 14,298$ | 8.0 ($^1$H) |
| 88 | VTMoS | 1.86 | 0.70 | $M_w = 85,725$; $M_n = 28,907$ | 8.9 ($^1$H) |
| B | 1-Oct-7-enyl-TMoS | 0.48 | 2.59 | $M_w = 58,766$; $M_n = 13,745$ | 13.9 ($^1$H) |

TABLE 27

Copolymerization of Ethylene (4.1 MPa) at 60° C. with X (0.0002 mmol) (10 mL p-Xylene, 102.4 mg B($C_6F_5$)$_3$, 18 h)

| Ex. | Comonomer or Additive 3.4 mmol | Yield g | Comon. Incorp. Mol % | M.W. | Total Me |
|---|---|---|---|---|---|
| 89a | ATMoS | 0.64 | 0.68 ($^1$H) | $M_w$ = 39,015; $M_n$ = 17,278 | 8.5 ($^1$H) |
| C | 7-Oct-1-enyl-TMoS | 1.40 | 0.22 ($^1$H) | $M_w$ = 60,351; $M_n$ = 30,271 | 8.7 ($^1$H) |
| 89 | VTMoS | 3.15 | 1.07 ($^1$H) | $M_w$ = 54,557; $M_n$ = 22,577 | 9.5 ($^1$H) |

TABLE 28

Copolymerization of Ethylene (4.1 MPa) at 60° C. with X (0.0002 mmol) (10 mL p-Xylene, 102.4 mg B($C_6F_5$)$_3$, 18 h)

| Ex. | Comonomer or Additive 3.4 mmol | Yield g | Comon. Incorp. Mol % | M.W. | Total Me |
|---|---|---|---|---|---|
| 90 | VTMoS | 3.03 | 1.1 | $M_w$ = 38,599; $M_n$ = 14,176 | 9.9 ($^1$H) |
| 90a | ATMoS | 0.66 | 0.7 | $M_w$ = 32,321; $M_n$ = 15,075 | 9.9 ($^1$H) |
| D | 1-Oct-7-enyl-TMoS | 0.89 | 0.6 | $M_w$ = 24,776; $M_n$ = 13,222 | 9.4 ($^1$H) |

Examples 91-97

The general procedures described above for Example 22-58 were used in these examples. The conditions were as described in Table 3 under Condition VIII. Results are given in Table 29.

TABLE 29

Condition VIII in Table 3

| Ex | Catalyst | B($C_6F_5$)$_3$ (equiv.) | Yield (g) | Mole % Norbornene | Mole % VTMoS |
|---|---|---|---|---|---|
| 91 | S | 40 | 2.839 | 1.2 | 1.3 |
| 92 | T | 40 | 0.604 | 1.0 | 0.4 |
| 93 | O | 0 | 0.458 | 2.3 | 2.9 |
| 94 | J | 0 | 0.610 | 35.9 | 1.0 |
| 95 | N | 0 | 0.969 | 30.7 | 1.6 |
| 96 | M | 0 | 0.917 | 83.4 | 2.0 |
| 97 | Q | 0 | 5.421 | 7.5 | 1.4 |

Examples 98-101

For polymerization procedure and method for measuring molecular weight, see Examples 59-75. Results are given in Tables 30 and 31.

TABLE 30

Copolymerization of Ethylene (1.0 MPa) and VTEoS (1 mL) at 60° C. with Cmpd X (0.001 mmol) (102.4 mg B($C_6F_5$)$_3$, 18 h)

| Ex | Solvent(s) mL | Yield g | VTEoS Incorp. Mol % | M.W. | Solubility in TCB at 120° C. | MI | Total Me |
|---|---|---|---|---|---|---|---|
| 98 | p-Xylene 8 Ethyl Acetate 1 | 3.88 | 3.39 ($^{13}$C) | $M_p$ = 24,226; $M_w$ = 31,963; $M_n$ = 12,963; PDI = 2.47 | Soluble | 1.2 | 39.4 ($^{13}$C) |
| 99 | p-Xylene 9 | 2.84 | Nd | $M_p$ = 24,382; $M_w$ = 37,675; $M_n$ = 12,210; PDI = 3.09 | Insoluble | No Flow | Nd |

Nd: Not determined.

TABLE 31

Copolymerization of Ethylene (2.1 MPa) and VTMoS (1 mL) at 90° C. with Cmpd X (0.001 mmol) (102.4 mg B($C_6F_5$)$_3$, 18 h)

| Ex | Solvent(s) mL | Yield g | VTMoS Incorp. Mol % | $M_n$($^1$H) | Solubility in TCB at 120° C. | MI | Total Me |
|---|---|---|---|---|---|---|---|
| 100 | p-Xylene 5 | 4.85 | 8.42 ($^1$H) | 14,980 | Insoluble | No Flow | 57.8 ($^1$H) |
| 101 | i-BuTMoS Me$_2$CHCH$_2$Si—(OMe)$_3$ 5 | 6.97 | 8.41 ($^1$H) | 17,160 | Soluble | 85 | 53.8 ($^1$H) |

The $^{13}$C NMR of the polymer of Example 101 is given in Table 32.

TABLE 32

| Index | Frequency, Hz | Frequency, ppm | Intensity | Peak assignment |
|---|---|---|---|---|
| 1 | 6314.146 | 50.191 | 10.43 | $CH_3$ of $RSiOMe_3$, $CH_3OH$ |
| 2 | 6282.099 | 49.936 | 16.41 | $CH_3$ of $RSiOMe_3$, $CH_3OH$ |
| 3 | 5056.362 | 40.193 | 0.57 | |
| 4 | 4963.028 | 39.451 | 0.39 | $MB_2$ |
| 5 | 4774.828 | 37.955 | 1.78 | $MB_3+$ |
| 6 | 4742.194 | 37.695 | 1.39 | $MB_3+$ |
| 7 | 4690.522 | 37.285 | 6.91 | $B_1$ |
| 8 | 4637.857 | 36.866 | 2.07 | $B_1$ |
| 9 | 4317.338 | 34.318 | 6.34 | $B_{3+}$ |
| 10 | 4257.767 | 33.845 | 1.93 | |
| 11 | 4235.311 | 33.666 | 1.83 | |
| 12 | 4192.635 | 33.327 | 1.74 | $MB_1$ |
| 13 | 4150.306 | 32.991 | 3.63 | $MB_1$ |
| 14 | 4078.868 | 32.423 | 0.31 | $3B_5$ |
| 15 | 4014.595 | 31.912 | 0.89 | $3B_6+$, 3EOC |
| 16 | 3961.837 | 31.492 | 0.42 | |
| 17 | 3801.748 | 30.220 | 10.17 | $CH_2$'s |
| 18 | 3788.414 | 30.114 | 13.30 | $CH_2$'s |
| 19 | 3740.868 | 29.736 | 78.25 | $CH_2$'s |
| 20 | 3648.688 | 29.003 | 3.66 | $CH_2$'s |
| 21 | 3467.381 | 27.562 | 2.05 | $B_2+$ |
| 22 | 3418.749 | 27.175 | 8.54 | $B_2+$ |
| 23 | 3402.893 | 27.049 | 8.40 | $B_2+$ |
| 24 | 3333.715 | 26.500 | 1.80 | $B_2+$ |
| 25 | 3080.475 | 24.487 | 0.49 | |
| 26 | 2917.079 | 23.188 | 1.80 | $MSB_0$, $2B_4$ |
| 27 | 2858.379 | 22.721 | 1.52 | $2SB_5+$ (tent) |
| 28 | 2842.526 | 22.595 | 1.53 | $2B_5+$ |
| 29 | 2535.711 | 20.156 | 0.96 | $2SB_3$ (tent), $2B_3$ |
| 30 | 2475.923 | 19.681 | 4.60 | $1B_1$ |
| 31 | 1929.196 | 15.335 | 1.33 | $1SB_1$ |
| 32 | 1799.730 | 14.306 | 0.49 | $1B_3$ |
| 33 | 1734.624 | 13.788 | 1.55 | $1B_4+$, 1EOC |
| 34 | 1372.371 | 10.909 | 0.64 | $1B_2$ |
| 35 | 1259.282 | 10.010 | 0.75 | $1SB_3$ |
| 36 | 1206.399 | 9.590 | 1.36 | $1SB_4+$ |
| 37 | 798.652 | 6.348 | 0.76 | $1SB_2$ |

Example 102

Synthesis of Complex B

In the dry box a 500 mL oven-dried Schlenk flask was charged with 3.19 g (7.67 mmol) of ligand EE (see previously incorporated U.S. Pat. No. 5,880,241), 200 mL of anhydrous pentane, and a magnetic stir bar. In a separate oven-dried 100 mL round bottom flask 3.0 g of $Ni(CH_2SiMe_3)_2(py)_2$ (7.67 mmol, Carmona, E.; Gonzalez, F.; Poveda, M. L.; Atwood, J. L.; Rogers, R. D., *Journal of the Chemical Society, Dalton Transactions* (1981) 777-782) was dissolved in 45 mL of pentane along with 1 mL of anhydrous pyridine to stabilize the complex. Both flasks were septum capped and removed from the dry box and placed under dry $N_2$. The ligand/pentane slurry was cooled to −18° C. in an ice/acetone bath. The Ni complex was added to the ligand/pentane slurry via cannula over 10 minutes at −18° C. The resulting intensely blue solution was allowed to stir at −11° C. to −18° C. for 4 hours. After 4 hours the solvent was removed under vacuum and the blue crystalline solid was collected and weighed. Net wt. 4.8 g. (96.6% yield). $^1$H NMR ($C_6D_6$, 500 MHz, ppm downfield of tetramethylsilane): 7.65 (d, 2H, An-H); 7.02 (s, 4H, ArH); 6.83 (d, 2H, An-H); 6.58 (triplet, 2H, An-H); 2.38 (s, 12H, o-ArCH$_3$); 2.33 (s, 6H, p-ArCH$_3$); 1.88 (bs, 4H, NiCH$_2$); 0.20 (s, 18H, —SiMe$_3$).

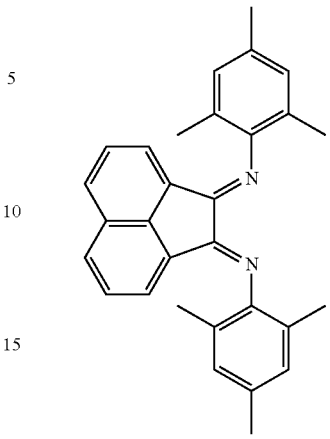

EE

Examples 103-112 and Comparative Examples D-E

General Procedure for Ethylene Copolymerizations of Tables 33 and 34

In a nitrogen-purged drybox, a glass insert with a gas inlet was loaded with the specified amounts of B, $B(C_6F_5)_3$, NaBAF or $LiB(C_6F_5)_4$·2.5Et$_2$O, comonomer and p-xylene. The $B(C_6F_5)_3$ was the first ingredient added to all experiments and was added as a standard solution in THF. The THF was allowed to evaporate prior to the addition of the other reactants. The NaBAF or $LiB(C_6F_5)_4$·2.5 Et$_2$O was added as a standard solution in Et$_2$O, and B was added as a standard solution in a cyclopentene/Et$_2$O mixture. The order of addition was (1) $B(C_6F_5)_3$, (2) p-xylene, (3) comonomer, (4) NaBAF or $LiB(C_6F_5)_4$·2.5Et$_2$O, and (5) B. For entries 105-I of Table 33, the concentrations were 0.005 mmol of B per 0.2 mL cyclopentene/Et$_2$O (6.25% solution of cyclopentene in Et$_2$O) and 0.005 mmol of NaBAF per 0.2 mL Et$_2$O. For entries 109-J of Table 33, the concentrations were 0.01 mmol of B per 0.4 mL cyclopentene/Et$_2$O (16.7% solution of cyclopentene in Et$_2$O) and 0.01 mmol NaBAF per 0.4 mL Et$_2$O. For entries 110-K of Table 34, the concentrations were 0.0005 mmol of B per 0.5 mL of cyclopentene/Et$_2$O (1.5% solution of cyclopentene in Et$_2$O) and 0.0005 mmol of $LiB(C_6F_5)_4$·2.5 Et$_2$O per 0.2 mL Et$_2$O. For entry 114 of Table 34, the concentrations were 0.001 mmol of B per 0.2 mL of cyclopentene/Et$_2$O solution (8.3% solution of cyclopentene in Et$_2$O) and 0.001 mmol of $LiB(C_6F_5)_4$·2.5 Et$_2$O per 0.2 mL Et$_2$O. The insert was greased and capped. The glass insert was then loaded in a pressure tube inside the drybox. The pressure tube was then sealed, brought outside of the drybox, connected to the pressure reactor, placed under the desired ethylene pressure and shaken mechanically. After the stated reaction time, the ethylene pressure was released and the glass insert was removed from the pressure tube. The polymer was precipitated by the addition of MeOH (~20 mL). A small amount of triethylamine was added to the solution. The polymer was then collected on a frit and rinsed with MeOH. The polymer was transferred to a pre-weighed vial and dried under vacuum for several days. The polymer yield and characterization were then obtained. $^{13}$C NMR spectra were run without Cr(acac)$_3$.

TABLE 33

Comparative VTMoS, VTEoS, ATMoS, ATEoS, and 7-Oct-1-enyl-trimethoxysilane Copolymerizations with Ethylene (4.1 MPa) at 60° C. with B (10 mL Total Volume of p-Xylene + Comonomer, 1 epuiv $B(C_6F_5)_3$, 1 equiv NaBAF, 18 h)

| Ex. | mmol B | Comonomer 17 mmol | Yield g | Comon. Incorp.[a] Mol % | M.W. | MI/ Sol.[d] | Total Me[a] |
|---|---|---|---|---|---|---|---|
| 103 | 0.005 | VTEoS 3.6 mL, 3,400 equiv | 6.30 | 5.7 | $M_w$ = 17,941; $M_n$ = 6,595; PDI = 2.31 | High[c]/S | 34.0 |
| 104 | 0.005 | VTMoS 2.6 mL, 3,400 equiv | 3.74 | 4.8 | $M_w$ = 26,270; $M_n$ = 8,410; PDI = 3.12 | 1.25/S | 26.0 |
| 105 | 0.005 | ATEoS 3.9 mL, 3,400 equiv | 0 | — | — | — | — |
| 106 | 0.005 | ATMoS 2.9 mL, 3,400 equiv | 4.81 | 4.0 | $M_w$ = 26,863; $M_n$ = 9,449; PDI = 2.84 | 2.95/S | 14.4 |
| D | 0.005 | 7-Oct-1-enylTMoS 4.3 mL, 3,400 equiv | 0.30 | 1.9[b] (¹H) | $M_w$ = 39,689; $M_n$ = 18,332; PDI = 2.16 | nd/P | 19.4 (¹H) |
| 107 | 0.01 | ATEoS 3.9 mL, 340 equiv | 0.98 | 4.1 | $M_w$ = 16,562; $M_n$ = 8,126; PDI = 2.04 | nd/P | 12.6 |
| 108 | 0.01 | 7-Oct-1-enylTMoS 4.3 mL, 340 equiv | 0.74 | 1.7 | $M_w$ = 72,231; $M_n$ = 23,255; PDI = 3.11 | nd/P | 8.1 | nd: Not determined.
[a] Data obtained from ¹³C NMR unless specified otherwise.
[b] From ¹H NMR, 0% n = 0.
[c] Flow was too fast to measure.
[d] Sol.: Solubility of copolymer in TCB at 135° C. S = Totally soluble or only a slight amount of insoluble material. P = Partially soluble, e.g., some insoluble material present.

TABLE 34

Comparative VTMoS, VTEoS, ATMoS, ATEoS, and 7-Oct-1-enyl-trimethoxysilane Copolymerizations with Ethylene (4.1 MPa) at 60° C. with B (10 mL Total V of p-Xylene + Comonomer, 2.6 mg $B(C_6F_5)_3$, 1 equiv $LiB(C_6F_5)_4$, 18 h)

| | mmol B mg $B(C_6F_5)_3$ | Comonomer 6.5 mmol | Yield g | Comon. Incorp. Mol % | M.W. | MI/ Sol. | Total Me |
|---|---|---|---|---|---|---|---|
| 109 | 0.0005 mmol 2.6 mg | VTEoS 1.4 mL 13,100 equiv | 3.82 | 1.9 | $M_w$ = 44,699; $M_n$ = 20,089; PDI = 2.23 | 4.1/S | 12.2 |
| 110 | 0.0005 mmol 2.6 mg | VTMoS 1.0 mL 13,100 equiv | 3.81 | 1.9 | $M_w$ = 44,482; $M_n$ = 18,145; PDI = 2.45 | 5.3/S | 15.5 |
| 111 | 0.0005 mmol 2.6 mg | ATEoS 1.5 mL 13,100 equiv | 0.02 | — | — | — | — |
| 112 | 0.0005 mmol 2.6 mg | ATMoS 1.1 mL 13,100 equiv | 1.00 | 1.2 | $M_w$ = 66,696; $M_n$ = 22,494; PDI = 2.96 | 0.1/S | 10.5 |
| E | 0.0005 mmol 2.6 mg | 7-Oct-1-enylTMoS 1.7 mL 13,100 equiv | 0 | — | — | — | — |
| 113 | 0.001 mmol 5.2 mg | ATMoS 1.1 mL 6,500 equiv | 7.22 | 1.3 | $M_w$ = 51,346; $M_n$ = 9,893; PDI = 5.19 | No flow/P | 11.3 |

[a] Data obtained from ¹³C NMR unless specified othewise.
[b] Sol.: Solubility of copolymer in TCB at 135° C. S = Totally soluble or only a slight amount of insoluble material. P = Partially soluble, e.g., some insoluble material present.

TABLE 35A

¹³C NMR Branching Analysis for Copolymers of Tables 33 and 34

| Ex. | Table Entry | Total Me | Me | Et | Pr | Bu | Hex+ & eoc | Am+ & eoc | Bu+ & eoc |
|---|---|---|---|---|---|---|---|---|---|
| 103 | 33-1 | 34.0 | 18.7 | 7.8 | 1.1 | 1.9 | 2.9 | 7.2 | 6.4 |
| 104 | 33-2 | 26.0 | 17.9 | 3.8 | 0.5 | 0.0 | 2.7 | 4.2 | 3.7 |
| 104 | 33-4 | 14.4 | 8.5 | 3.6 | 0.2 | 0.0 | 1.4 | 4.9 | 2.1 |
| 106 | 33-6 | 12.6 | 10.7 | 0.0 | 0.0 | 0.8 | 2.1 | 2.2 | 1.9 |
| E | 33-7 | 8.1 | 6.2 | 0.9 | 0.3 | 0.7 | 1.2 | 0.0 | 0.7 |
| 108 | 34-1 | 12.2 | 5.6 | 3.6 | 1.1 | 0.4 | 0.7 | 1.1 | 1.8 |
| 109 | 34-2 | 15.5 | 11.6 | 1.0 | 0.7 | 0.0 | 0.9 | 1.6 | 2.2 |
| 111 | 34-4 | 10.5 | 7.9 | 1.0 | 0.1 | 0.0 | 0.7 | 0.4 | 1.5 |
| 112 | 34-6 | 11.3 | 9.4 | 0.1 | 0.0 | 0.0 | 0.9 | 1.6 | 1.7 |

TABLE 35B

Analysis of the Spacing (n) between Si and the Copolymer Backbone for Co-polymers of Tables 33 and 34

|     | n = 0 % | n = 1 % | n = 2 % | n = 3 % | n = 4+ % |
|-----|---------|---------|---------|---------|----------|
| 103 | 25.62   | 20.04   | 20.97   | 7.76    | 25.61    |
| 104 | 29.55   | 26.17   | 17.92   | 9.64    | 16.72    |
| 106 | 16.12   | 41.40   | 16.30   | 12.45   | 13.73    |
| 107 | 5.89    | 43.43   | 26.31   | 9.10    | 15.27    |
| E   | 0       | 0       | 0       | 0       | 100      |
| 108 | 43.3    | 31.3    | 16.0    | 3.4     | 6.0      |
| 109 | 28.85   | 22.69   | 19.75   | 7.52    | 21.19    |
| 111 | 6.41    | 45.75   | 25.79   | 8.01    | 14.04    |
| 112 | 26.0    | 42.8    | 15.6    | 8.0     | 7.6      |

Examples 113-132

General Procedure for Ethylene Copolymerizations of Tables 36 and 37

In a nitrogen-purged drybox, a glass insert with a gas inlet was loaded with the specified amounts of B, $B(C_6F_5)_3$, LiB$(C_6F_5)_4 \cdot 2.5Et_2O$, comonomer and p-xylene. The $B(C_6F_5)_3$ was the first ingredient added to all experiments and was added as a standard solution in THF. The THF was allowed to evaporate prior to the addition of the other reactants. The LiB$(C_6F_5)_4 \cdot 2.5$ $Et_2O$ was added as a standard solution in $Et_2O$ (0.0005 mmol per 0.2 mL $Et_2O$), and B was added as a standard solution in a 10% solution of cyclopentene in $Et_2O$ (0.0005 mmol per 0.2 mL of solution). The order of addition was (1) $B(C_6F_5)_3$, (2) p-xylene, (3) comonomer, (4) LiB$(C_6F_5)_4 \cdot 2.5Et_2O$, and (5) B. The insert was greased and capped. The glass insert was then loaded in a pressure tube inside the drybox. The pressure tube was then sealed, brought outside of the drybox, connected to the pressure reactor, placed under the desired ethylene pressure and shaken mechanically. After the stated reaction time, the ethylene pressure was released and the glass insert was removed from the pressure tube. The polymer was precipitated by the addition of MeOH (~20 mL). A small amount of triethylamine was added to the solution. The polymer was then collected on a frit and rinsed with MeOH. The polymer was transferred to a pre-weighed vial and dried under vacuum for several days. The polymer yield and characterization were then obtained. $^{13}$C NMR spectra were run without $Cr(acac)_3$.

TABLE 36

Copolymerization of Ethylene (4.1 MPa) and $H_2C=CHSi(OR)_xR'_{3-x}$ (~5.25 mmol, 10,500 equiv) at 60° C. with 0.0005 mmol B, 5.2 mg $B(C_6F_5)_3$ (20 equiv) and 1 equiv LiB$(C_6F_5)_4$ for 18 h in p-Xylene (Total Volume VS + p-Xylene = 10 mL)

| Ex. | Vinylsilane | Yield g | VS Incorp. mol %[a] | M.W. | Sol.[b] | Total Me[a] |
|-----|-------------|---------|---------------------|------|---------|-------------|
| 113 | $H_2C=CHSiMe_3$ | 0.392 | 0.12 ($^1$H) | $M_w = 68,693; M_n = 31,646$ | S | 17.5 ($^1$H) |
| 114 | $H_2C=CHSiMe_3$ | 0.424 | 0.21 ($^1$H) | $M_w = 59,618; M_n = 24,237$ | S | 17.8 ($^1$H) |
| 115 | VTEoS | 2.963 | 0.99 ($^1$H) | $M_w = 57,530; M_n = 9,196$ | S | 10.4 ($^1$H) |
| 116 | VTEoS | 4.415 | 1.1 | $M_w = 57,725; M_n = 21,745$ | P | 8.4 |
| 117 | $H_2C=CHSiMe_2(OEt)$ | 2.247 | 0.48 | $M_w = 67,037; M_n = 25,048$ | P | 9.5 |
| 118 | $H_2C=CHSiMe_2(OEt)$ | 3.067 | 0.43 | $M_w = 43,474; M_n = 21,043$ | S | 13.0 |
| 119 | VTMoS | 2.269 | 1.5 ($^1$H) | $M_w = 41,503; M_n = 16,109$ | P | 9.5($^1$H) |
| 120 | VTMoS | 3.900 | 1.2 | $M_w = 68,791; M_n = 23,466$ | S | 15.0 |
| 121 | $H_2C=CHSiMe(OMe)_2$ | 2.474 | 0.95 | $M_w = 57,893; M_n = 23,722$ | S | 8.9 |
| 122 | $H_2C=CHSiMe(OMe)_2$ | 1.888 | 1.3 | $M_w = 41,486; M_n = 20,906$ | S | 13.5 |

Nd: Not determined.
[a] Data obtained from $^{13}$C NMR unless specified otherwise.
[b] Sol.: Solubility of copolymer in TCB at 135° C. S = Totally soluble or only a slight amount of insoluble material. P = Partially soluble, e.g., some insoluble material present.

TABLE 37

Copolymerization of Ethylene (2.8 MPa) and $H_2C=CHSi(OR)_xR'_{3-x}$ (~5.25 mmol, 10,500 equiv) at 60° C. with 0.0005 mmol B, 5.2 mg $B(C_6F_5)_3$ (20 equiv) and 1 equiv LiB$(C_6F_5)_4$ for 18 h in p-Xylene (Total Volume VS + p-Xylene = 10 mL)

| Ex. | Vinylsilane | Yield g | VS Incorp. mol %[a] | M.W. | Sol.[b] | Total Me[a] |
|-----|-------------|---------|---------------------|------|---------|-------------|
| 125 | $H_2C=CHSiMe_3$ | 0.921 | 0.27 | $M_w = 101,579; M_n = 30,682$ | S | 11.4 |
| 126 | $H_2C=CHSiMe_3$ | 0.863 | 0.36 | $M_w = 53,524; M_n = 24,595$ | S | 15.0 |
| 127 | VTEoS | 3.709 | 2.1 | $M_w = 45,175; M_n = 19,786$ | S | 12.8 |
| 128 | VTEoS | 4.176 | 2.2 | $M_w = 31,498; M_n = 13,391$ | S | 21.1 |
| 129 | $H_2C=CHSiMe_2(OEt)$ | 3.682 | 0.99 | $M_w = 37,604; M_n = 14,739$ | S | 17.1 |
| 130 | $H_2C=CHSiMe_2(OEt)$ | 3.482 | 1.2 | $M_w = 28,759; M_n = 9,454$ | S | 26.3 |
| 131 | VTMoS | 2.672 | 2.0 | $M_w = 37,318; M_n = 16,964$ | P | 18.6 |
| 132 | VTMoS | 3.859 | nd | $M_w = 33,483; M_n = 14,360$ | P | nd |
| 133 | $H_2C=CHSiMe(OMe)_2$ | 1.173 | 1.6 | $M_n = 33,119; M_n = 15,748$ | S | 17.1 |
| 134 | $H_2C=CHSiMe(OMe)_2$ | 2.433 | 1.8 | $M_w = 32,038; M_n = 14,919$ | S | 15.7 |

Nd: Not determined.
[a] Data obtained from $^{13}$C NMR unless specified otherwise.
[b] Sol.: Solubility of copolymer in TCB at 135° C. S = Totally soluble or only a slight amount of insoluble material. P = Partially soluble, e.g., some insoluble material present.

TABLE 38A

13C NMR Branching Analysis for Copolymers of Tables 36 and 37

| Ex. | Total Me | Me | Et | Pr | Bu | Hex+ & eoc | Am+ & eoc | Bu+ & eoc |
|---|---|---|---|---|---|---|---|---|
| 116 | 8.4 | 6.2 | 0.2 | 0.5 | 0.8 | 0.8 | 1.5 | 1.5 |
| 117 | 9.5 | 6.6 | 0.7 | 0.3 | 0.2 | 0.9 | 0.6 | 1.9 |
| 118 | 13.0 | 8.7 | 1.6 | 0.8 | 0.3 | 1.1 | 0.9 | 1.9 |
| 120 | 15.0 | 11.9 | 0.6 | 0.5 | 0.0 | 1.0 | 0.8 | 1.9 |
| 121 | 8.9 | 6.4 | 0.8 | 0.3 | 0.1 | 0.3 | 0.8 | 1.5 |
| 122 | 13.5 | 9.2 | 0.9 | 0.7 | 0.0 | 0.7 | 1.3 | 2.7 |
| 123 | 11.4 | 8.3 | 0.0 | 0.1 | 0.7 | 0.5 | 0.9 | 3.0 |
| 124 | 15.0 | 11.5 | 1.3 | 0.5 | 0.2 | 0.9 | 1.7 | 1.7 |
| 125 | 12.8 | 9.8 | 0.8 | 0.6 | 0.9 | 1.5 | 1.2 | 1.7 |
| 126 | 21.1 | 13.9 | 1.4 | 1.4 | 0.8 | 1.6 | 1.4 | 4.4 |
| 127 | 17.1 | 11.1 | 1.8 | 0.9 | 2.1 | 1.5 | 2.5 | 3.3 |
| 128 | 26.3 | 15.9 | 2.8 | 1.5 | 1.5 | 2.4 | 3.3 | 6.0 |
| 129 | 18.6 | 11.7 | 1.6 | 1.4 | 0.0 | 1.0 | 3.5 | 3.9 |
| 131 | 17.1 | 12.1 | 1.4 | 0.8 | 0.0 | 0.8 | 1.1 | 2.8 |
| 132 | 15.7 | 8.7 | 1.5 | 1.6 | 0.0 | 1.0 | 2.0 | 3.9 |

TABLE 38B

Analysis of the Spacing (n) between Si and the Copolymer Backbone for Co-polymers of Tables 36 and 37

| Ex. | n = 0 % | n = 1 % | n = 2 % | n = 3 % | n = 4+ % |
|---|---|---|---|---|---|
| 116 | 36.73 | 16.48 | 8.80 | 11.50 | 26.49 |
| 120 | 31.92 | 20.71 | 31.49 | 5.87 | 10.01 |
| 121 | ~52 | ~24 | ~24 | Trace$^a$ | Trace$^a$ |
| 122 | ~54 | ~23 | ~23 | Trace$^a$ | Trace$^a$ |
| 123 | 100 | | | | |
| 124 | 100 | | | | |
| 125 | 28.06 | 29.63 | 19.86 | 7.36 | 15.09 |
| 126 | 34.86 | 14.83 | 25.29 | 7.63 | 17.39 |
| 129 | 40.44 | 21.33 | 19.24 | 1.41 | 17.58 |
| 131 | ~47 | ~30 | ~24 | Some$^a$ | Some$^a$ |
| 132 | ~32 | ~29 | ~38 | Some$^a$ | Some$^a$ |

$^a$Present, but overlaps with other resonances.

Example 133

3-Vinyl-2,4,10-trioxa-3-silaadamantane

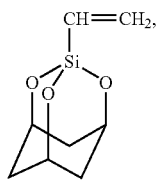

was synthesized by mixing 19.1 g (0.145 mol) of cis-fluoroglucitol, 44.51 g (0.159 mol) of vinyl tris(2-methoxyethoxy)silane and 1.0 g sodium methoxide which were then heated until removal of calculated amount of 2-methoxyethanol. The resulting solid was purified by sublimation in vacuum. Yield of 3-vinyl-2,4,10-trioxa-3-silaadamantane was 6.84 g (26%) as colorless crystals. $^1$H NMR (CD$_2$Cl$_2$) 1.80 (d, 3H, J=14 Hz), 2.49 (d, 3H, J-14 Hz), 4.42 (br, s, 3H); 5.7-6.2 (m, 3H). $^{13}$C NMR (CD$_2$Cl$_2$) 38.23 (s); 71.89 (s), 125.50 (s); 141.41 (s). $^{29}$Si NMR (C$_6$D$_6$) −42.50. The structure was confirmed by X-ray analysis.

Vials were loaded in a nitrogen filled glove box with 0.02 mmol of the transition metal catalyst, the cocatalyst [for EE 1.0 ml of 6.42% MMAO in heptane, for FF 50 eq. of B(C$_6$F$_5$)$_3$ (0.512 g)], 0.6 g (0.00325 moles) of 3-vinyl-2,4,10-trioxa-3-silaadamantane, and 9 ml p.-xylene. The vials were placed in a shaker apparatus, heated to 60° C. and pressured with ethylene to 2.8 MPa. After 18 h the polymers produced were stirred with methanol, filtered, and washed 2 times with methanol on the filter and then one time with ether. The polymer samples were dried under vacuum (0.001 mm) over night. A polymerization catalyzed by EE yielded 0.90 g of polymer with a vinylsilane incorporation of 1.39 weight percent. The polymer has a melting point of 100.8° C. with a heat of fusion of 5.78 J/g, and a Mw of 78,900 A polymerization catalyzed by FF yielded 0.39 g of polymer with a vinylsilane incorporation of 0.41 weight percent. The polymer has a melting point of 116.2° C. with a heat of fusion of 115.6 J/g, and was insoluble in solvent.

Examples 134-149 and Comparative Examples J-V

Ethylene Copolymerization with Vinylsilanes Using Supported Catalysts

The polymerization of ethylene and vinylsilanes is described in Table 39, where conditions and ingredients are listed for each example, together with the results. Typical procedures for preparing the supported catalysts for three of the polymerization examples are given below.

Example 137

Catalyst Supported on B(C$_6$F$_5$)$_3$-Treated Silica Support

A 500 g sample of Grace/Davison Sylopol® 948 silica support (available from Grace-Davison, W.R. Grace & Co., Columbia, Md. 21044, USA) was placed in an aluminum tray, covered with aluminum foil and placed in a vacuum oven with a dry nitrogen purge. The sample was heated for 18 h at 200° C. While still hot, it was quickly transferred to the inert nitrogen atmosphere of a Vacuum Atmospheres drybox and the dried support was stored in a glass bottle. A 10 g portion of this dried support was placed in a screw cap jar and 100 ml toluene was added. B(C$_6$F$_5$)$_3$ (1 mmol, 0.512 g) was added and the slurry was placed on gentle shaker table overnight. The next day, the solid was filtered off and then dried under vacuum in the antechamber overnight. A sample (2.0 g) of the activated support was weighed into a vial. In a separate vial, a sample of B (0.1 mmol, 65 mg) was dissolved in 25 ml toluene by placing it on the shaker for 30 min. All the catalyst appeared to be dissolved in the toluene. The activated support was added to the solution and the slurry was placed on the shaker overnight. The next day, the solid was allowed to settle out. The toluene had an orange color, indicating that not all the catalyst went onto the support. The residual toluene solution was decanted and the remaining solid was washed with an aliquot of toluene. The resulting supported catalyst was dried under vacuum in the antechamber overnight.

A sample (100 mgs, calculated 0.005 mmol Ni) of the supported catalyst was weighed into a tube. Cyclohexane (10 ml), vinyltriethoxysilane (2 ml) and triisobutylaluminum (0.250 ml, 5 eq) were added to the sample. The color of the catalyst changed from orange to a brown-green color. The tube was sealed and transferred outside the drybox. The polymerization was run for 16 h at 60° C. and 3.45 MPa C$_2$H$_4$. The resulting polymer was collected by vacuum filtration and washed thoroughly with methanol. It was dried in a vacuum oven under an N$_2$ purge. Yield: 1.47 g

Example 141

Catalyst Supported on BF$_3$-Treated Silica/Alumina Support

Grace/Davison's silica/alumina support (500 gm of MS13-1.1) was placed in an aluminum tray. It was covered with aluminum foil with several vent-holes. The sample was placed in a vacuum oven with a slow N$_2$ purge. and heated for 18 h at 200° C. While the sample was still hot, it was quickly transferred to the inert atmosphere of a drybox and placed in a glass bottle. In the drybox, 10 g samples of this support were weighed out. The 10 g portion was transferred to a screw cap jar and 100 ml of dried toluene was added. To the resulting suspension was added 1 mmol BF$_3$ etherate (0.127 ml) and it was placed on a gentle shaker table overnight. The next day, the solid was filtered off. The sample was dried under vacuum at room temperature overnight. A 2.0 gram sample of this treated material was weighed out. B (1 mmol, 65 mg) was weighed into a screw cap jar and 25 ml of toluene was added. After 30 min on a shaker, all the catalyst seemed to be dissolved. The solution was added to the 2.0 g of treated support and placed on the shaker overnight. The next day, the solid was allowed to settle out. The toluene was colorless, indicating that all the catalyst had gone onto the support. The toluene was removed by decantation and the sample was washed with an aliquot of toluene. The resulting solid was dried under vacuum overnight and then stored in the drybox freezer until use.

For a polymerization, the supported catalyst (20 mg, 0.001 mmol) was weighed into a tube and cyclohexane (10 ml) was added, as were 2 ml VTEoS and 0.050 ml triisobutylaluminum via micropipet. When the triisobutylaluminum was added the catalyst appeared to become more blue-green in color. The tube was sealed and transferred outside drybox. The polymerization was run for 18 h at 60° C. and 3.45 MPa C$_2$H$_4$. The tube was returned to the laboratory, opened, and the polymer was collected by vacuum filtration. The polymer was washed thoroughly with methanol and dried in a vacuum oven. Yield: 1.662 g. The samples were then analyzed by multiple means including Ml and $^1$H NMR

Example 149

Catalyst Supported on H$_2$SO$_4$.-Treated Silica/Alumina Support

A 500 g sample of Grace/Davison silica/alumina MS13-1.1 was dried in an aluminum tray in a vacuum oven with a nitrogen purge. The sample was heated for 18 h at 200° C. and then transferred, still hot, to a drybox. A 10 g portion of this silica/alumina was transferred the to a screw cap jar and slurried in 100 ml of toluene. Concentrated sulfuric acid (1 mmol, 0.101 ml) was added to the slurry which was then shaken intermittently for 1 h and then allowed to stand overnight. The next day, the solid was collected by vacuum filtration and then dried under vacuum for 4 h. The solid was transferred to a jar and dried for 12 h in a tube furnace at 400° C. under an N$_2$ purge. The sample was sealed in a jar while under N$_2$, then transferred to a drybox. The solid had a slightly gray color while previously the color was white. B (65 mg, 0.1 mmol) was dissolved in 25 ml of toluene, and placed on shaker for 30 min. The sulfuric-acid-treated support (2.0 g) was added to the solution and the resulting slurry was placed on the shaker overnight. The next day, the solid was allowed to settle out. The toluene supernatant had a very slight purple color, indicating that almost all of the catalyst had gone onto the support. The supernatant was decanted and the solid was washed with an aliquot of toluene. The solid product was dried under vacuum overnight. The solid was dark green in color.

To carry out a polymerization, the supported catalyst (100 mg, 0.005 mmol) was measured into a tube and 10 ml cyclohexane was added. VTEoS (2 ml) and triisobutylaluminum (0.250 ml) were added sequentially. The color became more blue-green in color and was very dark. The sample was sealed and transferred out of the drybox. The polymerization was run for 16 h at 60° C. and 6.45 MPa ethylene. The resulting polymer was collected by vacuum filtration and washed thoroughly with methanol. The sample was dried overnight in a vacuum oven. Yield: 9.35 g.

TABLE 39

| Ex. | Dried Support | Support Treatment | Catalyst | Activator (5 eq) | Shaker Condition. | VTEoS? | Yield (g) | Productivity (kgPE/gNi) | MI | VTEoS Incorp. (mole %) |
|---|---|---|---|---|---|---|---|---|---|---|
| J | Sylopol 948 | None | EE | None | 1 | No | 0 | 0 | — | — |
| K | Sylopol 948 | None | EE | AliBu$_3$ | 1 | No | 0.768 | 13 | | — |
| 134 | Sylopol 948 | None | EE | AliBu$_3$ | 1 | Yes | 0 | 0 | — | — |
| L | Sylopol 948 | BF$_3$•Et$_2$O | B | AliBu$_3$ | 1 | No | 0.835 | 14 | | — |
| 135 | Sylopol 948 | BF$_3$•Et$_2$O | B | AliBu$_3$ | 1 | Yes | 0.117 | 2 | | 0.30 |
| M | Sylopol 948 | B(C$_6$F$_5$)$_3$ | EE | AliBu$_3$ | 2 | No | 1.579 | 5.4 | | — |
| 136 | Sylopol 948 | B(C$_6$F$_5$)$_3$ | EE | AliBu$_3$ | 2 | Yes | 0.690 | 2.4 | | |
| N | Sylopol 948 | B(C$_6$F$_5$)$_3$ | B | AliBu$_3$ | 2 | No | 1.95 | 6.7 | | — |
| 137 | Sylopol 948 | B(C$_6$F$_5$)$_3$ | B | AliBu$_3$ | 2 | Yes | 1.47 | 5 | | |
| 138 | Sylopol 948 | H$_2$SO$_4$$^{a)}$ | EE | AliBu$_3$ | 2 | Yes | 1.35 | 4.6 | NF | 0.0 |
| 139 | Sylopol 948 | H$_2$SO$_4$$^{a)}$ | B | AliBu$_3$ | 2 | Yes | 2.45 | 8.4 | NF | 0.0 |
| O | MS-13.110 | None | EE | None | 1 | No | 0 | 0 | — | — |
| P | MS-13.110 | None | EE | AliBu$_3$ | 1 | No | 1.206 | 21 | — | — |

TABLE 39-continued

| Ex. | Dried Support | Support Treatment | Catalyst | Activator (5 eq) | Shaker Condition. | VTEoS? | Yield (g) | Productivity (kgPE/gNi) | MI | VTEoS Incorp. (mole %) |
|---|---|---|---|---|---|---|---|---|---|---|
| 140 | MS-13.110 | None | B | AliBu$_3$ | 1 | Yes | 0.256 | 4.3 | — | 0.30 |
| 141 | MS-13.110 | BF$_3$•Et$_2$O | B | None | 1 | Yes | 1.662 | 28 | | |
| 142 | MS-13.110 | BPh$_3$ | B | AliBu$_3$ | 2 | No | 3.14 | 11 | | — |
| 143 | MS-13.110 | BPh$_3$ | B | AliBu$_3$ | 2 | Yes | 0.575 | 2 | | 0.68 |
| Q | MS-13.110 | B(C$_6$F$_5$)$_3$ | EE | AliBu$_3$ | 2 | No | 3.76 | 13 | | — |
| 144 | MS-13.110 | B(C$_6$F$_5$)$_3$ | EE | AliBu$_3$ | 2 | Yes | 0.690 | 2.4 | | 0.5 |
| R | MS-13.110 | B(C$_6$F$_5$)$_3$ | B | AliBu$_3$ | 2 | No | 4.65 | 16 | | — |
| 145 | MS-13.110 | B(C$_6$F$_5$)$_3$ | B | AliBu$_3$ | 2 | Yes | 1.53 | 5 | | 0.08 |
| S | MS-13.110 | Al(iBu)$_3$ | EE | AliBu$_3$ | 2 | No | 3.01 | 10 | | — |
| 146 | MS-13.110 | Al(iBu)$_3$ | EE | AliBu$_3$ | 2 | Yes | 0.280 | 1 | | |
| T | MS-13.110 | Al(iBu)$_3$ | B | AliBu$_3$ | 2 | No | 3.25 | 11 | | — |
| 147 | MS-13.110 | Al(iBu)$_3$ | B | AliBu$_3$ | 2 | Yes | 0.505 | 2 | | |
| U | MS-13.110 | H$_2$SO$_4$[a)] | EE | AliBu$_3$ | 2 | No | 3.38 | 12 | NF | — |
| 148 | MS-13.110 | H$_2$SO$_4$[a)] | EE | AliBu$_3$ | 2 | Yes | 3.10 | 11 | NF | 0.1 |
| V | MS-13.110 | H$_2$SO$_4$[a)] | B | AliBu$_3$ | 2 | No | 5.0 | 17 | 0.06 | — |
| 149 | MS-13.110 | H$_2$SO$_4$[a)] | B | AliBu$_3$ | 2 | Yes | 9.35 | 32 | NF | 1.0 |

Description of General Procedure:
Dry the support indicated in Dried Support column at 200° C.
Treat 10 g of the Dried Support in toluene with the Lewis acid or compound indicated in the Support Treatment column and then redry the support under vacuum and nitrogen.
Support 0.1 mmol of the catalyst indicated in Catalyst column on 2 g of the treated support.
The Yield, productivity, MI and percent VTEoS incorporated are indicated in subsequent columns.
Polymerization Conditions
1. 60° C. and 3.5 MPa ethylene with 0.001 mmol of the catalyst and the activator indicated in column 6, with or without 2 mL of VTEoS comonomer as indicated in column 7.
2. 60° C. and 3.5 MPa ethylene with 0.005 mmol of the catalyst and the activator indicated in column 6, with or without 2 mL of VTEoS comonomer as indicated in column 7.
NF signifies No Flow in the melt indexer.

Examples 150-151 and Comparative Examples W-X

SMAO-Supported Catalysts for Ethylene Copolymerization with Vinylsilanes

The catalysts used in this series of experiments were A and EE. The support employed was SMAO (XPO-2409) which is a silica support which has been pretreated with methylaluminoxane by a Albemarle Corp. The polymerizations were carried out in a shaker tube run at 60° C. and 3.5 MPa ethylene with 0.001 mmol of the catalyst and the activator indicated in column 6, with or without 2 mL of VTEoS comonomer as indicated in column. The boron compounds, B(C$_6$F$_5$)$_3$ and LiB(C$_6$F$_5$)$_4$ were added at a level of 5 equivalents based upon Ni. The results are included in Table 40. The MIs of the vinylsilane-containing copolymers are the same as those observed without comonomer. Vinylsilane comonomer was incorporated to an appreciable level (1-2 mole %), and it did not crosslink despite the fact that SMAO has appreciable Lewis acidity. The prealkylated catalyst (EE) gave productivities similar to those of the non-alkylated catalyst. Thus, there would be no need to utilize this more expensive system. The results with and without vinyl silane mirror those of A.

TABLE 40

| Ex. No. | Catalyst | Equiv Borane | Equiv Borate | VTEoS (1 mL) | Yield (g) | Product. kgPE/gNi | MI | Silane (mole %) |
|---|---|---|---|---|---|---|---|---|
| W | A | 5 | 5 | No | 6.60 | 11.3 | .2 | |
| 150 | A | 5 | 5 | Yes | 6.50 | 11.1 | .4 | 1.5 |
| X | EE | 5 | 5 | No | 7.45 | 12.7 | .2 | |
| 151 | EE | 5 | 5 | Yes | 5.62 | 9.57 | 1.9 | 2.2 |

General Information for Examples 152-184

B(C$_6$F$_5$)$_3$, [HNMe$_2$Ph][B(C$_6$F$_5$)$_4$] and Li[B(C$_6$F$_5$)$_4$].(Et$_2$O)$_x$ were purchased from Boulder Scientific. B(C$_6$H$_5$)$_3$ was purchased from Aldrich. AlMe(BHT)$_2$ and AlEt(BHT)$_2$ were prepared by literature methods; (a) Shreve, A. P.; Mulhaupt, R.; Fultz, W.; Calabrese, J.; Robbins, W.; Ittel, S. D. Organometallics 1988, 7, 409. (b) Healy, M. D.; Wierda, D. A.; Barron, A. R. Organometallics 1988, 7, 2543. B((3,5-CF$_3$)$_2$—C$_6$H$_3$)$_3$ was prepared by literature method; Brookhart, M.; Grant, B.; Volpe, A. F., Jr. Organometallics 1992, 11, 3920. [AlMe$_2$(Et$_2$O)$_2$][MeB(C$_6$F$_5$)$_3$] was prepared by literature methods; (a) Klosin, J.; Roof, G. R.; Chen, E. Y.-X.; Abboud, K. A. Organometallics 2000, 19, 4684. (b) Klosin, J. PCT Int. Appl. WO 0011006 (Dow Chemical Co.). [Ph$_3$C][B((3,5-CF$_3$)$_2$—C$_6$H$_3$)$_4$] was prepared by literature method; Bahr, S. R.; Boudjouk, P.; J. Org. Chem. 1992, 57, 5545.

Examples 152-159

Ethylene Copolymerization with VTEoS with 1 to 5 Equivalents of Activator per Nickel General Polymerization Procedure In a drybox, a glass insert was loaded with a diethyl ether solution of cocatalyst. The diethyl ether was allowed to evaporate. A solution of 7.8 g of p-xylene, 0.9 g VTEoS and 14.3 mg of Li[B(C$_6$F$_5$)$_4$] was added. A solution of B in diethyl ether was added and the insert was then capped and sealed in a tube. Outside of the drybox, the tube was placed under ethylene (4.1 MPa) and was shaken mechanically at 60° C. for about 16 h. The resulting reaction mixture was mixed with methanol (with a small amount of triethylamine, approximately 0.1 vol %), filtered, repeatedly washed with methanol and the solid polymer dried in vacuo. Results are shown in Table 41, where "Mole %" refers to the mole percent incorporation of VTEoS monomer into the polymers. The Mole % was determined by $^1$H NMR spectroscopy on about 10 mg sample of isolated polymer diluted in 0.5 ml TCE-d$_2$ at 120° C.

The solutions of cocatalysts were prepared from 0.04 mmol of cocatalyst in 8.47 g of diethyl ether. An aliquot of 0.30 mL was used for 0.001 mmol of cocatalyst. Alternatively, a solution of cocatalyst prepared from 0.1 mmol of cocatalyst in 4.24 g of diethyl ether was used for 0.005 mmol of cocatalyst from a 0.30 mL aliquot of stock solution.

The solution of catalyst B was prepared from 26 mg B (0.04 mmol) and 11.3 g of diethyl ether. The solution was stored in the drybox freezer at −30° C. An aliquot of 0.4 mL catalyst B stock solution is used for 0.001 mmol catalyst and an aliquot of 0.2 mL catalyst B stock solution is used for 0.0005 mmol catalyst.

TABLE 41

| Ex | Catalyst (mmol) | Cocatalyst(mmol) | Yield (g) | Mole % VTEoS | M.W. |
|---|---|---|---|---|---|
| 152 | B (0.001) | B(C$_6$F$_5$)$_3$ (0.001) | 3.207 | 1.03 | M$_w$ = 51,859<br>M$_n$ = 27,548 |
| 153 | B (0.001) | AlMe(BHT)$_2$ (0.001) | 5.347 | 2.0 | M$_w$ = 48,725<br>M$_n$ = 23,688 |
| 154 | B (0.001) | B(C$_6$H$_5$)$_3$ (0.001) | 2.369 | 1.78 | M$_w$ = 46,829<br>M$_n$ = 26,000 |
| 155 | B (0.001) | B((3,5-CF$_3$)$_2$—C$_6$H$_3$)$_3$ (0.001) | 4.569 | 2.1 | M$_w$ = 45,299<br>M$_n$ = 21,041 |
| 156 | B (0.001) | AlEt(BHT)$_2$ (0.001) | 3.33 | 1.32 | M$_w$ = 56,087<br>M$_n$ = 23,834 |
| 157 | B (0.0005) | [AlMe$_2$(Et$_2$O)$_2$][MeB(C$_6$F$_5$)$_3$] (0.001) | 5.086 | 2.03 | M$_w$ = 46,503<br>M$_n$ = 20,888 |
| 158 | B (0.001) | [HNMe$_2$Ph][B(C$_6$F$_5$)$_4$] (0.005) | 5.409 | 3.94 | M$_w$ = 60,227<br>M$_n$ = 18,306 |
| 159 | B (0.001) | [Ph$_3$C][B(C$_6$F$_5$)$_4$] (0.005) | 5.57 | 1.29 | M$_w$ = 87,979<br>M$_n$ = 21,639 |

Conditions: LiB(C$_6$F$_5$)$_4$ (0.001 mmol), 9 mL p-xylene, 1 mL VTEoS, 60° C., 4.1 MPa, 16 h.

Examples 160-184

Ethylene Copolymerization with VTEoS Using Supported Catalysts

A 500 g sample of Grace/Davison Sylopol® 948 silica support (available from Grace-Davison, W.R. Grace & Co., Columbia, Md. 21044, USA) was placed in an aluminum tray, covered with aluminum foil and placed in a vacuum oven with a dry nitrogen purge. The sample was heated for 18 h at 200° C. While still hot, it was quickly transferred to the inert nitrogen atmosphere of a Vacuum Atmospheres drybox and the dried support was stored in a glass bottle.

Example 160

Synthesis of Catalyst

A 0.5 g sample of dried Sylopol 948 was added to a vial with 6.9 g of toluene, 13 mg of B(C$_6$F$_5$)$_3$ and 2 drops of NMe$_2$Ph. The sample vial was capped and mechanically shaken for 2 hours. The slurry was filtered and rinsed 3 times with toluene (10 mL) and dried under vacuum for 1 h. The isolated solid was added to a vial with 6.9 g of toluene and a sample of B (0.025 mmol, 16 mg). The sample vial was capped and mechanically shaken for 2 h. The slurry was filtered and rinsed 3 times with toluene (10 mL each) and dried under vacuum for 1 h.

Example 161

Synthesis of Catalyst

A 0.5 g sample of dried Sylopol 948 was added to a vial with 6.9 g of toluene, 26 mg of B(C$_6$F$_5$)$_3$ and 2 drops of NMe$_2$Ph. The sample vial was capped and mechanically shaken for 1 h and was allowed to stand overnight and shaken again for 1 h. The slurry was filtered and rinsed 3 times with toluene (10 mL each) and rinsed 3 times with pentane (10 mL each) and dried under vacuum for 30 min. The isolated solid was added to a vial with 6.9 g of toluene and a sample of B (0.025 mmol, 16 mg). The sample vial was capped and mechanically shaken for 30 min. The slurry was filtered and rinsed 3 times with toluene (10 mL each) and rinsed 3 times with pentane (10 mL each) and dried under vacuum for 30 min.

Example 162

Synthesis of Catalyst

A 0.5 g sample of dried Sylopol 948 was added to a vial with 6.9 g of toluene and 50 mg of PMAO-IP. The sample vial was capped and mechanically shaken for 2 h. The slurry was filtered and rinsed 3 times with toluene (10 mL each) and rinsed 3 times with pentane (10 mL each) and dried under vacuum for 30 min. The isolated solid was added to a vial with 6.9 g of toluene with 26 mg of B(C$_6$F$_5$)$_3$ and 2 drops of NMe$_2$Ph. The sample vial was capped and mechanically shaken for 2 h. The slurry was filtered and rinsed 3 times with toluene (10 mL each) and rinsed 3 times with pentane (10 mL each) and dried under vacuum for 30 min. The isolated solid was added to a vial with 6.9 g of toluene and a sample of B (0.025 mmol, 16 mg). The sample vial was capped and mechanically shaken for 30 min. The slurry was filtered and rinsed 3 times with toluene (10 mL each) and rinsed 3 times with pentane (10 mL each) and dried under vacuum for 30 min.

Example 163

Synthesis of Catalyst

A 0.25 g sample of dried Sylopol 948 was added to a vial with 6.9 g of toluene, 0.025 mmol of AlMe$_3$ (2.0 M in toluene and added to 0.5 mL of Et$_2$O) and 13 mg of B(C$_6$F$_5$)$_3$. The sample vial was capped and mechanically shaken for 2 h. The slurry was filtered and rinsed 3 times with toluene (10 mL each) and rinsed 3 times with pentane (10 mL each) and dried under vacuum for 30 min. The isolated solid was added to a vial with 6.9 g of toluene and a sample of B (0.0123 mmol, 8 mg). The sample vial was capped and mechanically shaken for 30 min. The slurry was filtered and rinsed 3 times with toluene (10 mL each) and rinsed 3 times with pentane (10 mL each) and dried under vacuum for 30 min.

Example 164

Synthesis of Catalyst

A 1.00 g sample of dried Sylopol 948 was added to a vial with 6.9 g of toluene, 51 mg of B(C$_6$F$_5$)$_3$ and 4 drops of NMe$_2$Ph. The sample vial was capped and mechanically shaken for 2 h. The slurry was filtered and rinsed 3 times with toluene (10 mL each) and rinsed 3 times with pentane (10 mL each) and dried under vacuum for 30 min. The isolated solid was added to a vial with 6.9 g of toluene and a sample of B (0.050 mmol, 32 mg) in 2 g of toluene. The sample vial was capped and mechanically shaken for 30 min. The slurry was filtered and rinsed 3 times with toluene (10 mL each) and rinsed 3 times with pentane (10 mL each) and dried under vacuum for 30 min.

Example 165

Synthesis of Catalyst

A 0.5 g sample of SMAO (12 wt. % Al) was added to a vial with 6.9 g of toluene and a sample of A (0.025 mmol, 16 mg). The sample vial was capped and mechanically shaken for 30 min. The slurry was filtered and rinsed 3 times with toluene (10 mL) and dried under vacuum for 1 h.

Example 166

Synthesis of Catalyst

A 0.5 g sample of SMAO (12 wt. % Al) was added to a vial with 6.9 g of toluene, 20 mg of [HNMe$_2$Ph][B(C$_6$F$_5$)$_4$] and a sample of A (0.025 mmol, 16 mg). The sample vial was capped and mechanically shaken for 30 min. The slurry was filtered and rinsed 3 times with toluene (10 mL) and dried under vacuum for 1 h.

Example 167

Synthesis of Catalyst

A 0.25 g sample of SMAO (12 wt. % Al) was added to a vial with 6.9 g of toluene and a sample of B (0.0123 mmol, 8 mg). The sample vial was capped and mechanically shaken for 1 h. The slurry was filtered and rinsed 3 times with toluene (10 mL each) and rinsed 3 times with pentane (10 mL each) and dried under vacuum for 30 min.

Examples 168-184

General Polymerization Procedure

In a drybox, a glass insert was loaded with a Ni catalyst supported on a silica-based support. A solution of 7.4 g cyclohexane and 0.45 g of VTEoS was added. A solid portion of cocatalyst (Ex. 173-174) or a solution of cocatalyst (Ex. 176-180) was added and the insert was capped and sealed in a tube. Outside of the drybox, the tube was placed under ethylene and was shaken mechanically at the temperature indicated in tables 2-4 for about 16 h. The resulting reaction mixture was mixed with methanol (with a small amount of triethylamine, approximately 0.1 vol %), filtered, repeatedly washed with methanol and the solid polymer dried in vacuo.

A solution of AlMe(BHT)$_2$ was prepared from 0.02 mmol in 7.38 g of cyclohexane. An aliquot of 0.30 mL was used for 0.0005 mmol or 0.60 mL for 0.001 mmol. Alternatively, a solution of AlMe(BHT)$_2$ was prepared from 0.1 mmol in 2.34 g of cyclohexane. An aliquot of 0.15 mL was used for 0.005 mmol or 0.30 mL for 0.010 mmol or 0.60 mL for 0.20 mmol. The amount of cyclohexane added with the AlMe(BHT)$_2$ cocatalyst was subtracted from the amount added as the polymerization solvent so that the total solvent volume was 10 mL.

"Mole %" in Tables 42-44 refers to the mole percent incorporation of that monomer into the polymers. The Mole % was determined by $^1$H NMR spectroscopy on about 10 mg sample of isolated polymer diluted in 0.5 ml TCE-d$_2$ at 120° C.

TABLE 42

| Ex | Example for Catalyst (wt. mg) | mmol Ni$^a$ | Yield (g) | Mole % VTEoS | M.W. |
|---|---|---|---|---|---|
| 168 | 160 (50) | 0.0025 | 5.474 | 0.74 | M$_w$ = 83,526 |
|  |  |  |  |  | M$_n$ = 11,857 |
| 169 | 161 (50) | 0.0025 | 5.414 | 0.16 | M$_w$ = 148,925 |
|  |  |  |  |  | M$_n$ = 31,186 |
| 170 | 162 (50) | 0.0025 | 4.684 | 0.11 | M$_w$ = 108,459 |
|  |  |  |  |  | M$_n$ = 31,698 |
| 171 | 163 (50) | 0.001 | 1.87 | 0.87 | M$_w$ = 61,345 |
|  |  |  |  |  | M$_n$ = 22,428 |
| 172 | 162 (50) | 0.001 | 2.187 | 0.09 | M$_w$ = 125,933 |
|  |  |  |  |  | M$_n$ = 34,798 |

Conditions: 9.5 mL cyclohexane, 0.5 mLV TEoS, 60° C., 4.1 MPa, 16 h.
$^a$Theoretical maximum of nickel on supported catalyst.

TABLE 43

| Ex | Ex. # for Catalyst (wt. mg) | mmol Ni[a] | Temp (° C.) | Cocatalyst (mmol) | Yield (g) | Mole % VTEoS | M.W. |
|---|---|---|---|---|---|---|---|
| 173 | 164 (4) | 0.0002 | RT | B(C$_6$F$_5$)$_3$ (0.025) | 0.896 | 0.09 | $M_w$ = 305,700 $M_n$ = 74,351 |
| 174 | 164 (4) | 0.0002 | RT | AlMe(BHT)$_2$ (0.025) | 2.279 | <0.1 | $M_w$ = 301,663 $M_n$ = 84,544 |
| 175 | 164 (4) | 0.0002 | RT | PMAO-IP (0.17) | 7.306 | 0.2 | $M_w$ = 485,860 $M_n$ = 92,239 |
| 176 | 164 (10) | 0.0005 | 60 | AlMe(BHT)$_2$ (0.0005) | 0.098 | — | |
| 177 | 164 (10) | 0.0005 | 60 | AlMe(BHT)$_2$ (0.001) | 0.541 | — | |
| 178 | 164 (10) | 0.0005 | 60 | AlMe(BHT)$_2$ (0.005) | 0.83 | — | $M_w$ = 161,028 $M_n$ = 30,360 |
| 179 | 164 (10) | 0.0005 | 60 | AlMe(BHT)$_2$ (0.01) | 1.914 | — | |
| 180 | 164 (10) | 0.0005 | 60 | AlMe(BHT)$_2$ (0.02) | 2.792 | 0.46 | $M_w$ = 145,853 $M_n$ = 28,369 |

Conditions: 9.5 mL cyclohexane, 0.5 mL VTEoS, 4.1 MPa, 16 h.
[a]Theoretical maximum of nickel on supported catalyst.

TABLE 44

| Ex | Ex. # for Catalyst (wt. mg) | mmol Ni[a] | Temp (° C.) | Yield (g) | Mole % VTEoS | M.W. |
|---|---|---|---|---|---|---|
| 181 | 165 (50) | 0.0025 | 60 | 4.501 | 0.12 | $M_w$ = 237,796 $M_n$ = 35,525 |
| 182 | 166 (50) | 0.0025 | 60 | 6.292 | 2.07 | $M_w$ = 54,788 $M_n$ = 12,997 |
| 183 | 165 (20) | 0.001 | 75 | 1.368 | 0.17 | $M_w$ = 176,977 $M_n$ = 29,688 |
| 184 | 167 (20) | 0.001 | 75 | 3.703 | 0.29 | |

Conditions: 9.5 mL cyclohexane, 0.5 mL VTEoS, 4.1 MPa, 16 h.
[a]Theoretical maximum of nickel on supported catalyst.

Example 185

Supported Iron Catalyst Preparation

In a drybox, 14 mg of 2,6-bis[1-(2,4,6-trimethylphenylimino)ethyl]pyridine iron dichloride was dissolved in 10 ml of toluene in a scintillation vial and 1 g of dehydrated silica (Grace Davidson grade 948) was added. The deep blue mixture was shaken for 30 min. The mixture was filtered through a coarse sintered glass frit and the solids were dried overnight in vacuum at RT. About 1 g of light blue solid was obtained.

Example 186

Polymerization with Supported Iron Catalyst

In a dry box, 21.3 mg of the catalyst prepared in Example 185 was mixed with 5 ml of anhydrous toluene and transferred to a reactor injector tube. Also in the drybox, 1 ml of a 1M solution of triisobutylaluminum (Aldrich) was mixed with 4 ml of toluene and transferred to another reactor injector tube. The autoclave reactor (500 ml Autoclave Engineers Zipperclave® reactor, equipped with a stirrer driven by an electric motor) was charge with 150 ml of anhydrous cyclohexane (Aldrich) and heated to 50° C. VTMoS (25 ml) was charged to a pump attached to the reactor. The pumping rate was set to 12.5 ml/h (0.2 ml/min). First, the cocatalyst was injected into the cyclohexane solvent, then the ethylene feed was started to pressurize the reactor to 1.03 MPa. The catalyst was injected into the pressurized reactor, followed by immediate starting of the comonomer pumping. The reaction was allowed to proceed for two h. At the end of the run, the dried polymer yield was 0.3 g, and the silane content by $^1$H-NMR was 0.019% mol (0.1 wt %).

Example 187

Preparation of a Supported Catalyst

HH, prepared by the method described in U.S. patent application Ser. No. 10/108,938, filed Mar. 27, 2002, which is hereby included by reference, was supported on silica as follows. Silica (8 g) was mixed with 40 mL of dry toluene and 12 mL of a 2 M Me$_3$Al hexane solution were added. During the period of two hours, the reaction mixture was shaken several times. The silica was finally washed three times with toluene and once with pentane. The silica was dried in vacuum at 25° C. HH was stirred for 15 minutes in 10 mL CH$_2$Cl$_2$, and the silica (300 mg) was added. After 1 h the CH$_2$Cl$_2$ phase was removed under vacuum and the brown solid was washed once with CH$_2$Cl$_2$.

Example 188

Polymerization with Supported Nickel Catalyst

In a dry box, 54.2 mg of the supported catalyst prepared in Example 187 was mixed with 6 ml of VTMoS and was transferred to a reactor injector tube. Also in the drybox, 1.3 ml of 1M solution of ethyl aluminum sesquichloride (Aldrich) was transferred to another reactor injector tube. The autoclave reactor described in Example 186 was charged with 250 ml anhydrous cyclohexane (Aldrich). First, the cocatalyst was injected to the cyclohexane solvent, then the reactor was heated to 60° C., and then the ethylene feed was started to pressurize the reactor to 4.14 MPa. The catalyst and comonomer were injected into the pressurized reactor. The reaction was allowed to proceed for one h. At the end of the run, the dried polymer yield was 6.7 g, and the silane content by $^1$H-NMR was 0.0151 mol % (0.08 wt %).

Example 189

Polymerization with Supported Nickel Catalyst with Hydrogen

In a dry box, 56.1 mg of the supported catalyst prepared in Example 187 was mixed with 3 ml of VTMoS which was transferred to a reactor injector tube. Also in the drybox, 1.3 ml of a 1M solution of ethyl aluminum sesquichloride (Aldrich) was transferred to another reactor injector tube. The autoclave reactor described in Example 186 was charged with 250 ml anhydrous cyclohexane (Aldrich). The cocatalyst was transferred to the reactor and the solvent was saturated with 69 kPa of hydrogen. The reactor was then heated to 60° C. The ethylene feed was started to pressurize the reactor to 4.14 MPa. The catalyst and comonomer were injected into the pressurized reactor. The reaction was allowed to proceed for one h. At the end of the run, the dried polymer yield was 5.1 g, and the silane content by 1H-NMR was 0.0192% mol (0.1 wt %).

Example 190

Polymerization with Supported Nickel Catalyst

In a dry box, 50.2 mg of the supported catalyst prepared in Example 187 was mixed with 5 ml of anhydrous toluene. Also in the drybox, 2.5 ml of a 1M solution of ethyl aluminum sesquichloride (Aldrich) was transferred to another reactor injector tube. The autoclave reactor described in Example 186 was charge with 250 ml anhydrous cyclohexane (Aldrich). The reactor was heated to 60° C., then the ethylene feed was started to pressurize the reactor to 4.14 MPa. The catalyst was injected to the pressurized reactor. VTMoS (25 ml) was charged to a pump attached to the reactor. The pumping rate was set to 25 ml/h (0.4 ml/min). Immediately after the ethylene feed was started to the reactor, comonomer pumping was started. The reaction was allowed to proceed for one h. At the end of the run, the dried polymer yield was 25.1 g, and the silane content by 1H-NMR was 0.126 mol % (0.66 wt %).

Example 191

Polymerization with Supported Nickel Catalyst with Hydrogen

In a dry box, 54.4 mg of the supported catalyst prepared in Example 187 was mixed with 5 ml of anhydrous toluene. Also in the drybox, 2.5 ml of a 1M solution of ethyl aluminum sesquichloride (Aldrich) was transferred to another reactor injector tube. The autoclave reactor described in Example 186 was charge with 150 ml anhydrous cyclohexane (Aldrich). The reactor was heated to 60° C., then the ethylene feed was started to pressurize the reactor to 4.14 MPa. The catalyst was injected into the pressurized reactor. VTMoS (25 ml) was charged to a pump attached to the reactor. The pumping rate was set to 25 ml/h (0.4 ml/min). Immediately after the ethylene feed was started to the reactor, the comonomer pumping was started. The reaction was allowed to proceed for one h. At the end of the run, the dried polymer yield was 17.2 g, and the silane content by $^1$H-NMR was 0.1776 mol % (0.93 wt %). The 2.26 Kg Melt Index was 0.08.

Example 192

Polymerization with Supported Nickel Catalyst with Hydrogen

In a dry box, 25.0 mg of the supported catalyst prepared in Example 187 was mixed with 5 ml of anhydrous toluene. Also in the drybox, 1.3 ml of a 1M solution of ethyl aluminum sesquichloride (Aldrich) was transferred to another reactor injector tube. The autoclave reactor described in Example 186 was charged with 250 ml anhydrous cyclohexane (Aldrich). The cocatalyst was injected in the reactor and then the solvent was saturated with 620 kPa of hydrogen. Then, the reactor was heated to 60° C., and then the ethylene feed was started to pressurize the reactor to 4.14 MPa. The catalyst was injected into the pressurized reactor. VTMoS (25 ml) was charged to a pump attached to the reactor. The pumping rate was set to 25 ml/h (0.4 ml/min). Immediately after the ethylene feed was started to the reactor, the comonomer pumping was started. The reaction was allowed to proceed for one h. At the end of the run, the dried polymer yield was 4.8 g, and the silane content by 1H-NMR was 0.0313% mol % (0.165 wt %). The 2.16 Kg melt index was 0.5.

Example 193

Polymerization with Supported Nickel Catalyst with Hydrogen

In a dry box, 25.3 mg of the supported catalyst prepared in Example 187 was mixed with 5 ml of anhydrous toluene. Also in the drybox, 1.3 cc of a 1M solution of ethyl aluminum sesquichloride (Aldrich) was transferred to another reactor injector tube. The autoclave reactor described in Example 186 was charged with 250 ml anhydrous cyclohexane (Aldrich). VTMoS (62.5 ml) was charged to a pump attached to the reactor. The pumping rate was set to 62.5 ml/h (1.04 ml/min). First, the cocatalyst was injected into the reactor, then the reactor contents were saturated with 620 kPa of hydrogen. The reactor was heated to 60° C., then the ethylene feed was started to pressurize the reactor to 4.14 MPa. The catalyst was injected into the pressurized reactor. Immediately after the ethylene feed was started to the reactor, comonomer pumping was started. The reaction was allowed to proceed for one h. At the end of the run, the dried polymer yield was 1.6 g, and the silane content by $^1$H-NMR was 0.1018 mol % (0.54 wt %).

Example 194

Preparation of a Crosslinked Polystyrene Supported Catalyst

Crosslinked polystyrene containing —$C_6H_4$—$CH_2NMe_2H^+[B(C_6F_5)_4]^-$ functionality was prepared from commercial Merrifield resin (Aldrich, 100-200 mesh, 1% crosslinked, 1.09 milliequiv. of Cl per gram of resin) using a published procedure (Frechet, J. M., et. al., Science, 1998, 280, p. 270-274 and U.S. Pat. No. 6,228,795 B1.). Based on the weight change of the resin during the preparation, the degree of functionalization was estimated as 0.63 milliequiv. of borate per gram of resin. A solution of B (12.4 mg, 19.1 μmole) in 1.0 mL of toluene was added to 0.307 g of the polystyrene supported borate cocatalyst (10 mole equiv. borate per Ni) and mixed for 90 minutes. Cyclohexane (2 mL) was added and mixed briefly, and then the supported catalyst slurry was allowed to settle and the solvent was decanted. The washing and decanting with cyclohexane were repeated two more times, and then the blue/black supported catalyst was dried in vacuo at room temperature for 1 h and used immediately for polymerization (Example 341).

Examples 195-200

Polymerization with Chain Transfer Agent

In a dry box, about 14 mg of the catalyst prepared in Example 194 was mixed with 5 ml of VTMoS and transferred to a reactor injector tube. Also in the drybox, about 200 mg of triphenylborane was mixed with 5 ml of anhydrous toluene and transferred to another reactor injector tube. The autoclave reactor described in Example 186 was charged with 250 ml of anhydrous cyclohexane (Aldrich) and mixed with the designated amount of triisobutylaluminum (Aldrich 1M in hexanes). The triphenylborane solution was then added to the reactor. The reactor was heated to 70° C. and pressurized to 2.41 MPa with ethylene. The catalyst with the VTMoS was injected to the cyclohexane solvent, and then the reactor pressure was adjusted to 2.76 MPa. The reaction was allowed to proceed for one h. At the end of the run, the polymer collected and dried in the vacuum oven. The molecular weights were measured by GPC (PE standard). The results are shown in Table 45.

TABLE 45

| Ex. | (i-Bu)$_3$Al (ml) | Catalyst (mg) | VTMoS (ml) | TBP (mg) | Polymer (g) | VTMoS (mole %) | Mn | Mw |
|---|---|---|---|---|---|---|---|---|
| 195 | 1.00 | 14.4 | 2.5 | 202.7 | 15.1 | 0.29 | 5579 | 14548 |
| 196 | 0.50 | 15.2 | 2.5 | 209.4 | 24.7 | 0.124 | 6806 | 15474 |
| 197 | 0.25 | 14.1 | 2.5 | 207.0 | 1.4 | 0.18 | 6623 | 16154 |
| 198 | 0.35 | 16.2 | 2.5 | 203.1 | 0.3 | 0.60 | 10544 | 28290 |
| 199 | 0.75 | 15.9 | 2.5 | 203.6 | 6.7 | NA | 5836 | 15818 |
| 200 | 0.65 | 13.5 | 2.5 | 202.5 | 6.3 | NA | 6293 | 15699 |

Examples 201-235

General Procedure for Ethylene/VTEoS Copolymerizations of Table 46

In a nitrogen-purged drybox, a glass insert with a gas inlet was loaded with the specified amounts of B, B(C$_6$F$_5$)$_3$, LiB(C$_6$F$_5$)$_4$.2.5Et$_2$O, VTEoS and p-xylene. The B(C$_6$F$_5$)$_3$ Was the first ingredient added to all experiments and was added as a standard solution in THF. The THF was allowed to evaporate prior to the addition of the other reactants. The LiB(C$_6$F$_5$)$_4$.2.5 Et$_2$O was added as a standard solution in Et$_2$O (0.0005 mmol per 0.2 mL Et$_2$O), and B was also added as a standard solution in Et$_2$O (0.0002 mmol per 0.2 mL Et$_2$O) except in the case of entries 11-15 of Table 10S, where B was added as a standard solution in a 5% solution of cyclopentene in Et$_2$O (0.0002 mmol per 0.2 mL of solution). The order of addition for entries 201, 206, 211-216, 221, 226 and 231 of Table 46 was (1) B(C$_6$F$_5$)$_3$, (2) LiB(C$_6$F$_5$)$_4$.2.5Et$_2$O, (3) B, (4) p-xylene and (5) VTEoS. For the remaining entries, the order of addition was (1) B(C$_6$F$_5$)$_3$, (2) p-xylene, (3) VTEoS, (4) LiB(C$_6$F$_5$)$_4$.2.5Et$_2$O, and (5) B. The insert was greased and capped. The glass insert was then loaded in a pressure tube inside the drybox. The pressure tube was then sealed, brought outside of the drybox, connected to the pressure reactor, placed under the desired ethylene pressure and shaken mechanically. After the stated reaction time, the ethylene pressure was released and the glass insert was removed from the pressure tube. The polymer Was precipitated by the addition of MeOH (~20 mL). A small amount of triethylamine was added to the solution. The polymer was then collected on a frit and rinsed with MeOH. The polymer was transferred to a pre-weighed vial and dried under vacuum for several days. The polymer yield and characterization were then obtained. $^{13}$C NMR spectra were run without Cr(acac)$_3$. Experimental details and results are given in Tables 46-48.

TABLE 46

Copolymerization of Ethylene and VTEoS at 4.1 MPa E with 0.0002 mmol of B: Variation of Temperature, B(C$_6$F$_5$)$_3$ Concentration, and VTEoS Concentration (10 mL Total Volume of VTEoS + p-Xylene, 0.0005 mmol LiB(C$_6$F$_5$)$_4$2.5 Et$_2$O, 18 h)

| Ex. | B(C$_6$F$_5$)$_3$ mg | VTEoS mL | Temp. °C. | Yield g | VTEoS Incorp. Mol % | M.W. | Sol.[a] | Total Me |
|---|---|---|---|---|---|---|---|---|
| 201 | 1.3 | 0.7 | 30 | 0.02 | nd | nd | nd | nd |
| 202 | 5.2 | 0.7 | 30 | 0.02 | nd | nd | nd | nd |
| 203 | 5.2 | 1.4 | 30 | 0.01 | nd | nd | nd | nd |
| 204 | 10.4 | 0.7 | 30 | 0.06 | nd | nd | nd | nd |
| 205 | 10.4 | 1.4 | 30 | 0 | nd | nd | nd | nd |
| 206 | 1.3 | 0.7 | 50 | 0.87 | 0.8 ($^1$H) 0.7 ($^{13}$C) | $M_p$ = 72,618; $M_w$ = 69,604; $M_n$ = 9,230; PDI = 7.54 | S | 12.4 ($^1$H) 4.1 ($^{13}$C) |
| 207 | 5.2 | 0.7 | 50 | 0.66 | 0.7 ($^1$H) | $M_p$ = 69,942; $M_w$ = 99,583; $M_n$ = 8,243; PDI = 12.08 | S | 14.0 ($^1$H) |
| 208 | 5.2 | 1.4 | 50 | 1.23 | 1.2 ($^1$H) 1.0 ($^{13}$C) | $M_p$ = 60,663; $M_w$ = 84,791; $M_n$ = 27,358; PDI = 3.10 | S | 7.3 ($^1$H) 4.3 ($^{13}$C) |
| 209 | 10.4 | 0.7 | 50 | 0.25 | 0.7 ($^1$H) | $M_p$ = 43,278; $M_w$ = 71,222; $M_n$ = 19,120; PDI = 3.73 | P | 17.9 ($^1$H) |
| 210 | 10.4 | 1.4 | 50 | 0.39 | 1.0 ($^1$H) | $M_p$ = 45,358; $M_w$ = 63,335; $M_n$ = 21,154; PDI = 2.99 | P | 6.9 ($^1$H) |
| 211 | 2.6 | 0.7 | 60 | 3.14 | 0.7 ($^1$H) | $M_p$ = 53,031; $M_w$ = 79,978; $M_n$ = 23,416; PDI = 3.42 | S | 11.9 ($^1$H) |
| 212 | 1.3 | 0.7 | 60 | 2.98 | 0.8 ($^1$H) | $M_p$ = 51,330; $M_w$ = 69,477; $M_n$ = 21,102; PDI = 3.29 | S | 10.8 ($^1$H) |

TABLE 46-continued

Copolymerization of Ethylene and VTEoS at 4.1 MPa E with 0.0002 mmol of B: Variation of Temperature, $B(C_6F_5)_3$ Concentration, and VTEoS Concentration (10 mL Total Volume of VTEoS + p-Xylene, 0.0005 mmol $LiB(C_6F_5)_4$·2.5 $Et_2O$, 18 h)

| Ex. | $B(C_6F_5)_3$ mg | VTEoS mL | Temp. °C. | Yield g | VTEoS Incorp. Mol % | M.W. | Sol.[a] | Total Me |
|---|---|---|---|---|---|---|---|---|
| 213 | 2.6 | 1.4 | 60 | 3.28 | 1.6 ($^1$H) | $M_p$ = 33,643; $M_w$ = 47,289; $M_n$ = 16,204; PDI = 2.92 | P | 11.8 ($^1$H) |
| 214 | 1.3 | 1.4 | 60 | 2.75 | 1.6 ($^1$H) | $M_p$ = 33,243; $M_w$ = 49,593; $M_n$ = 16,573; PDI = 2.99 | P | 10.8 ($^1$H) |
| 215 | 10.4 | 0.7 | 60 | 5.19 | 0.7 ($^1$H) | $M_p$ = 50,329; $M_w$ = 74,455; $M_n$ = 22,313; PDI = 3.34 | S | 13.0 ($^1$H) |
| 216 | 1.3 | 0.7 | 70 | 2.21 | 0.9 ($^1$H) 0.5 ($^{13}$C) | $M_p$ = 41,800; $M_w$ = 57,876; $M_n$ = 19,868; PDI = 2.91 | S | 15.8 ($^1$H) 14.1 ($^{13}$C) |
| 217 | 5.2 | 0.7 | 70 | 2.35 | 1.8 ($^1$H) | $M_p$ = 40,910; $M_w$ = 71,041; $M_n$ = 21,973; PDI = 3.23 | S | 30.3 ($^1$H) |
| 218 | 5.2 | 1.4 | 70 | 0.69 | 1.8 ($^1$H) | $M_p$ = 26,364; $M_w$ = 30,199; $M_n$ = 13,279; PDI = 2.27 | S | 14.7 ($^1$H) |
| 219 | 10.4 | 0.7 | 70 | 2.44 | 0.7 ($^1$H) | $M_p$ = 44,204; $M_w$ = 77,166; $M_n$ = 21,908 PDI = 3.52 | S | 14.2 ($^1$H) |
| 220 | 10.4 | 1.4 | 70 | 2.46 | 1.3 ($^1$H) | $M_p$ = 27,289; $M_w$ = 38,273; $M_n$ = 13,875; PDI = 2.76 | P | 12.4 ($^1$H) |
| 221 | 1.3 | 0.7 | 70 | 0.012 | nd | nd | nd | nd |
| 222 | 5.2 | 0.7 | 70 | 3.80 | 1.1 ($^1$H) 1.0 ($^{13}$C) | $M_p$ = 39,923; $M_w$ = 43,258; $M_n$ = 19,549; PDI = 2.21 | S | 20.9 ($^1$H) 15.2 ($^{13}$C) |
| 223 | 5.2 | 1.4 | 70 | 0.023 | nd | nd | nd | nd |
| 224 | 10.4 | 0.7 | 70 | 3.44 | 0.8 ($^1$H) | $M_p$ = 38,792; $M_w$ = 67,460; $M_n$ = 21,552; PDI = 3.13 | S | 18.1 ($^1$H) |
| 225 | 10.4 | 1.4 | 70 | 0.74 | 2.4 ($^1$H) | $M_p$ = 18,512; $M_w$ = 20,211; $M_n$ = 9,317; PDI = 2.17 | P | 24.4 ($^1$H) |
| 226 | 1.3 | 0.7 | 90 | 2.22 | 1.6 ($^1$H) 1.2 ($^{13}$C) | $M_p$ = 25,692; $M_w$ = 27,412; $M_n$ = 10,944; PDI = 2.50 | S | 29.6 ($^1$H) 26.1 ($^{13}$C) |
| 227 | 5.2 | 0.7 | 90 | 3.75 | 1.1 ($^1$H) 1.2 ($^{13}$C) | $M_p$ = 23,758; $M_w$ = 25,690; $M_n$ = 11,350; PDI = 2.26 | S | 32.1 ($^1$H) 32.1 ($^{13}$C) |
| 228 | 5.2 | 1.4 | 90 | 3.02 | 1.3 ($^1$H) 1.3 ($^{13}$C) | $M_p$ = 22,878; $M_w$ = 24,258; $M_n$ = 11,233; PDI = 2.16 | S | 34.5 ($^1$H) 28.0 ($^{13}$C) |
| 229 | 10.4 | 0.7 | 90 | 4.06 | 1.6 ($^1$H) 1.2 ($^{13}$C) | $M_p$ = 22,075; $M_w$ = 23,412; $M_n$ = 10,223; PDI = 2.29 | S | 44.5 ($^1$H) 35.0 ($^{13}$C) |
| 230 | 10.4 | 1.4 | 90 | 3.48 | 1.4 ($^1$H) 1.3 ($^{13}$C) | $M_p$ = 22,169; $M_w$ = 23,992; $M_n$ = 10,050; PDI = 2.39 | S | 37.1 ($^1$H) 34.5 ($^{13}$C) |
| 231 | 1.3 | 0.7 | 110 | 0.65 | 1.2 ($^1$H) 1.3 ($^{13}$C) | $M_p$ = 13,939; $M_w$ = 22,634; $M_n$ = 7,703; PDI = 2.94 | S | 46.9 ($^1$H) 49.2 ($^{13}$C) |

TABLE 46-continued

Copolymerization of Ethylene and VTEoS at 4.1 MPa E with 0.0002 mmol of B: Variation of Temperature, $B(C_6F_5)_3$ Concentration, and VTEoS Concentration (10 mL Total Volume of VTEoS + p-Xylene, 0.0005 mmol $LiB(C_6F_5)_4$2.5 $Et_2O$, 18 h)

| Ex. | $B(C_6F_5)_3$ mg | VTEoS mL | Temp. ° C. | Yield g | VTEoS Incorp. Mol % | M.W. | Sol.[a] | Total Me |
|---|---|---|---|---|---|---|---|---|
| 232 | 5.2 | 0.7 | 110 | 0.68 | 1.3 ($^1$H) | $M_p$ = 14,085; $M_w$ = 16,218; $M_n$ = 6,557; PDI = 2.47 | S | 52.9 ($^1$H) |
| 233 | 5.2 | 1.4 | 110 | 0.61 | 1.3 ($^1$H) | $M_p$ = 12,930; $M_w$ = 15,711; $M_n$ = 5,868; PDI = 2.68 | S | 54.3 ($^1$H) |
| 234 | 10.4 | 0.7 | 110 | 0.58 | 1.2 ($^1$H) | $M_p$ = 13,699; $M_w$ = 15,722; $M_n$ = 4,840; PDI = 3.25 | S | 53.1 ($^1$H) |
| 235 | 10.4 | 1.4 | 110 | 0.51 | 1.5 ($^1$H) 1.3 ($^{13}$C) | $M_p$ = 10,804; $M_w$ = 13,812; $M_n$ = 4,072; PDI = 3.39 | S | 61.3 ($^1$H) 54.1 ($^{13}$C) |

Nd: Not determined.
[a]Sol.: Solubility of copolymer in TCB at 135° C.
S = Totally soluble or only a slight amount of insoluble material.
P = Partially soluble, e.g., some insoluble material present.

TABLE 47

$^{13}$C NMR Branching Analysis for VTEoS Copolymers of Table 46

| Ex. | Total Me | Me | Et | Pr | Bu | Hex+ & eoc | Am+ & eoc | Bu+ & eoc |
|---|---|---|---|---|---|---|---|---|
| 206 | 4.1 | 4.1 | 0 | 0 | 0 | 0.6 | 0 | 0 |
| 208 | 4.3 | 4.2 | 0 | 0 | 0 | 0.2 | 0 | 0.1 |
| 216 | 14.1 | 9.2 | 1.9 | 0.6 | 1.4 | 1.0 | 1.9 | 2.5 |
| 222 | 15.2 | 9.8 | 2.5 | 0.9 | 0.0 | 1.4 | 1.1 | 2.1 |
| 226 | 26.1 | 17.4 | 2.6 | 1.1 | 1.3 | 2.4 | 2.6 | 5.1 |
| 227 | 32.1 | 21.3 | 3.5 | 2.1 | 2.2 | 3.0 | 3.9 | 5.2 |
| 228 | 28.0 | 19.4 | 2.3 | 1.6 | 2.2 | 2.7 | 4.0 | 4.7 |
| 229 | 35.0 | 21.7 | 4.3 | 2.4 | 2.0 | 2.9 | 4.6 | 6.6 |
| 230 | 34.5 | 22.0 | 4.8 | 1.8 | 1.9 | 3.7 | 4.0 | 5.9 |
| 231 | 49.2 | 28.3 | 7.5 | 2.2 | 3.0 | 4.6 | 5.7 | 11.2 |
| 235 | 54.1 | 32.1 | 8.1 | 2.4 | 2.8 | 4.6 | 7.2 | 11.4 |

TABLE 48

Analysis of the Spacing (n) between Si and the Copolymer Backbone for Copolymers of Table 46

| Ex. | n = 0 % | n = 1 % | n = 2 % | n = 3 % | n = 4+ % |
|---|---|---|---|---|---|
| 206 | 53.5 | 18.5 | 14 | 14 (n = 3+) | |
| 208 | 68.6 | 18.5 | 13.0 | 0 | 0 |
| 216 | 46.8 | 34.7 | 18.6 | 0 | 0 |
| 222 | 46.2 | 34.0 | 19.8 | Trace[a] | 0 |
| 226 | 32.1 | 23.0 | 22.9 | 11[a] | 11[a] |
| 227 | 27.5 | 26.9 | 22.9 | 11.4[a] | 11.4[a] |
| 228 | 13.7 | 28.9 | 28.8 | 14.3[a] | 14.3[a] |
| 229 | 26.5 | 22.1 | 19.3 | 22.0 | 10.1[a] |
| 230 | 27.5 | 24.2 | 27.1 | 14.0 | 7.2[a] |
| 231 | 40 | 20 | 40 | 0 | 0 |
| 235 | 28 | 22 | 22 | 15.5 | 13.5 |

[a]Estimate from DEPT.

Examples 236-242

Continuous Process Description

The catalyst and activator solutions were transferred from a dry box to the appropriate feed vessels at the polymerization unit. High pressure liquid chromatography pumps continuously pumped these solutions to the reactor (see Example 186). The VTEoS and the olefin comonomers were mixed with the solvent in the solvent tank. From the solvent tank, the mixture was pumped through a micromotion flow meter by a Pulsa Feeder® diaphragm pump. At the exit of the pump, ethylene gas was mixed with the process stream. All the process streams were pumped into the reactor. A backpressure regulator kept the system in a liquid full mode during the reaction. At the exit of the reactor pressure control device, the reactor effluent was discharged into a nitrogen purged collection box. The reactor temperature was controlled either by chilling the incoming solvent and monomer feed or by cooling water going through the reactor jacket. A computer constantly monitored the trends and events during the operation.

Examples 236

In a drybox, separate stock solutions of catalyst, and activators were prepared. For the catalyst, 101.7 mg of compound B were dissolved in 100 ml of anhydrous toluene (Aldrich) purified with molecular sieves. For the activator mixture, 306.1 mg of triphenylborane and 435.1 mg of lithium tetrakis (pentafluorophenyl)borate were dissolved in 100 ml of toluene and diluted with 500 ml of anhydrous cyclohexane (Aldrich). The VTEoS was dried under molecular sieves and mixed to a 5% vol/vol concentration in the solvent feed tank. The polymerization reaction was conducted at 70° C., and 3.10 MPa E pressure. The pumps were started and the reactor was operated for about 60 min prior to collecting the samples. In this example, the residence time was 35 min and produced 18.1 g of polymer recovered from the solution. Polymer workups: The polymer solution was continuously collected in a 1 liter flask for the entire residence time. At the end of the run, the solution was treated with acetone, filtered and dried at RT and low nitrogen pressure. At the completion of the run, the feed vessels for the catalyst and activators were drained and the remaining volumes measured for catalyst/activator usage for this sample. The polymer had a DSC melting point of 84.8° C. and $\Delta H_f$ of 66.6 J/g. The silane was 4.2% wt of the polymer measured by $^1$H-NMR, the melt index of the polymer was 1.0, the catalyst efficiency was 455 g/PE/g catalyst, and the VTEoS conversion was 7.25%.

Example 237

For the catalyst, a stock solution of B was prepared by dissolving 39.5 mg of catalyst in 100 mL of anhydrous toluene (Aldrich). For the activator, 159.5 mg of triphenylborane and 211.9 mg of lithium tetrakis(pentafluorophenyl)borate were dissolved in 100 ml of anhydrous toluene and 500 ml of anhydrous cyclohexane. These two solutions were transferred to the appropriate feed vessels at the unit. The comonomer was mixed with the solvent in the feed tank to a 5% vol/vol solution. The polymerization reaction was conducted at 90 C, and 3.10 MPa E pressure. The pumps were started and the reactor was operated for about 60 min prior to collecting the samples. The residence time was 35 minutes and produced 11.5 g of polymer recovered from the solution. Polymer workups: The polymer solution was continuously collected in a 1 liter flask for the entire residence time. At the end of the run, the solution was treated with acetone, filtered and dried at RT and low nitrogen pressure. At the completion of the run, the feed vessels for the catalyst and activators were drained and the remaining volumes measured for catalyst/activator usage for this sample. The silane was 1.79% wt of the polymer, measured by $^1$H-NMR, the catalysts efficiency was 777 g/PE/g catalyst, and the VTEoS conversion was 2.35%.

Example 238

For the catalyst, a stock solution of B was prepared by dissolving 108.1 mg of catalyst in 300 mL of anhydrous toluene (Aldrich). For the activator, 148.3 mg of triphenylborane and 198.1 mg of lithium tetrakis(pentafluorophenyl)borate were dissolved in 100 ml of anhydrous toluene and 500 ml of anhydrous cyclohexane. These two solutions were transferred to the appropriate feed vessels at the unit. The comonomer was mixed with the solvent in the feed tank to a 5% vol/vol solution. The reaction temperature was 70° C., and 3.10 MPa E pressure. The pumps were started and the reactor was operated for about 120 min prior to collecting the samples. The residence time was 48 min and produced 11.5 g of polymer recovered from the solution. Polymer workups: The polymer solution was continuously collected in a 1 liter flask for the entire residence time. At the end of the run, the solution was treated with acetone, filtered and dried at RT and low nitrogen pressure. At the completion of the run, the feed vessels for the catalyst and activators were drained and the remaining volumes measured for catalyst/activator usage for this sample. The VTEoS was 3.30% wt of the polymer measured by $^1$H-NMR, melt index of the polymer is 0.4, melting point of the polymer is 103.4° C., the VTEoS conversion 5.30%, and the catalyst efficiency was 1413 g PE/g catalyst.

Example 239

For the catalyst, a stock solution of B was prepared by dissolving 150.3 mg of catalyst in 600 mL of anhydrous toluene (Aldrich). For the activator, 458.9 mg of triphenylborane and 614.3 mg of lithium tetrakis(pentafluorophenyl)borate were dissolved in 100 ml of anhydrous toluene and 634 ml of anhydrous cyclohexane. These two solutions were transferred to the appropriate feed vessels at the unit. VTEoS was mixed with the solvent in the feed tank to a 5% vol/vol solution. The reaction temperature was 70° C., and 3.10 MPa E pressure. The pumps were started and the reactor was operated for about 120 min prior to collecting the samples. The residence time was 33 min and produced 11.5 g and 4 g of polymer recovered from two consecutive samples. Polymer workups: The polymer solution was continuously collected in a 1 liter flask for the entire residence time. At the end of the run, the solution was treated with acetone, filtered and dried at RT and low nitrogen pressure. At the completion of the run, the feed vessels for the catalyst and activators were drained and the remaining volumes measured for catalyst/activator usage for this sample. The VTEoS was 13.4% wt and 3.0% wt of the polymer for the two samples, respectively as measured by $^1$H-NMR, the polymer did not flow in the melt index test, its melting point was 97.0° C.

Examples 240

For the catalyst, a stock solution of B was prepared by dissolving 150.3 mg of catalyst in 600 mL of anhydrous toluene (Aldrich). For the activator, 458.9 mg of triphenylborane and 614.3 mg of lithium tetrakis(pentafluorophenyl)borate were dissolved in 100 ml of anhydrous toluene and 634 ml of anhydrous cyclohexane. These two solutions were transferred to the appropriate feed vessels at the unit. VTEoS was mixed with the solvent in the feed tank to a 5% vol/vol solution. The reaction temperature was 70° C., and 3.10 MPa E pressure. The pumps were started and the reactor was operated for about 67 min prior to collecting the samples. The residence time was 33 min and produced 8.7 g, 5.8 g, 9.9 g and 13.7 g of polymer recovered from four consecutive samples. Polymer workups: Each polymer solution was continuously collected in a 1 liter flask for the entire residence time associated with the sample. The solution was later treated with acetone, filtered and dried at RT and low nitrogen pressure. At the completion of the run, the feed vessels for the catalyst and activators were drained and the remaining volumes measured to obtain the catalyst/activator usage in each sample. VTEoS contents were 0.625% wt, 2.47% wt and 1.85% wt, of the polymer for samples 1, 3 and 4, respectively. The silane composition was measured by $^1$H-NMR. Sample 1 had a melting point of 93° C., a VTEoS conversion of 0.24%, and a catalyst efficiency of 534 g PE/g catalyst.

Example 241

For the catalyst, a stock solution of B was prepared by dissolving 151.5 mg of catalyst in 600 mL of anhydrous toluene (Aldrich). For the activator, 450.1 mg of triphenylborane and 607.1 mg of lithium tetrakis(pentafluorophenyl)borate were dissolved in 100 ml of anhydrous toluene and 600 ml of anhydrous cyclohexane. These two solutions were transferred to the appropriate feed vessels at the unit. The comonomer was mixed with the solvent in the feed tank to a 5% vol/vol solution. The reaction temperature was 70° C., and 3.10 MPa E pressure was used. The pumps were started and the reactor was operated for about 120 min prior to collecting the samples. The residence time was 33 min and produced 51.7 g of polymer recovered in a single sample. Polymer workups: the polymer solution was continuously collected in a 1 liter flask for the entire residence time associated with the sample. The solution was later treated with acetone, filtered and dried at RT and low nitrogen pressure. At the completion of the run, the feed vessels for the catalyst and activators were drained and the remaining volumes measured to obtain the catalyst/activator usage in each sample. VTEoS content was 9.33% wt of the polymer, which was measured by $^1$H-NMR, the melt index was 0.13, the melting point was 106.9° C., the VTEoS conversion was 10.7% and the catalyst efficiency was 2945 g PE/g catalyst.

Example 242

For the catalyst, a stock solution of B was prepared by dissolving 75.1 mg of catalyst in 600 mL of anhydrous toluene (Aldrich). For the activator, 238.1 mg of triphenylborane and 300.2 mg of lithium tetrakis(pentafluorophenyl)borate were dissolved in 100 ml of anhydrous toluene and 600 ml of anhydrous cyclohexane. These two solutions were transferred to the appropriate feed vessels at the unit. VTEoS was mixed with the solvent in the feed tank to a 5% vol/vol solution. The reaction temperature was 70° C., and 3.10 MPa E pressure was used. The pumps were started and the reactor was operated for about 120 min prior to collecting the samples. The residence time was 70 min and produced 20.8 g, 7.9 g, and 6.9 g of polymer recovered from three consecutive samples. Polymer workups: Each polymer solution was continuously collected in a 1 liter flask for the entire residence time associated with the sample. The polymer solutions were later treated with acetone, filtered and dried at RT and low nitrogen pressure. At the completion of the run, the feed vessels for the catalyst and activators were drained and the remaining volumes measured to obtain the catalyst/activator usage in each sample. The % silane contents were 1.31% wt, 2.23% wt and 3.11% wt, for each sample, respectively, which were measured by $^1$H-NMR. For the second sample, melting point was 109.2° C., melt index was 0.36, the VTEoS conversion was 1.44%, and the catalyst efficiency was 1013 g PE/g catalyst.

Example 243-248

Molecular Weight Control with Hydrogen

In a drybox, II was mixed with 2.5 ml of VTEoS and transferred a reactor inject tube. Triphenylborane (TPB) was mixed with ml of anhydrous toluene and transferred to another reactor injector tube. First, the 250 ml of cyclohexane was transferred to the reactor at RT. Then, the cocatalyst was injected into the cyclohexane followed by the saturation of the solvent with hydrogen to the desired pressure. The reactor was heated to 70° C. and pressurized with ethylene to 2.41 MPa. The catalyst and VTEoS mixture was injected into the reactor and the reactor pressure was raised to 2.76 MPa with ethylene. The reaction was allowed to proceed for 1 h. The polymer was isolated and the dry polymer yield is shown in Table 49, together with the melt index and the VTMoS polymer content measured by $^1$H-NMR.

TABLE 49

| Ex. | Catalyst (mg) | TPB (mg) | Hydrogen (kPa) | Polymer (g) | Melt Index (g/10 min) | VTMoS (% wt) |
|---|---|---|---|---|---|---|
| 243 | 12.4 | 206.7 | 97 | 6.4 | No Flow | 2.216 |
| 244 | 12.7 | 200.4 | 145 | 6.7 | 0.16 | 2.409 |
| 245 | 12.8 | 203.2 | 207 | 11.2 | 2.4 | 0.923 |
| 246 | 11.7 | 203.3 | 276 | 9.1 | 11 | NA |

TABLE 49-continued

| Ex. | Catalyst (mg) | TPB (mg) | Hydrogen (kPa) | Polymer (g) | Melt Index (g/10 min) | VTMoS (% wt) |
|---|---|---|---|---|---|---|
| 247 | 12.9 | 200.9 | 345 | 13.1 | 35 | NA |
| 248 | 12.5 | 198.7 | 152 | 15.1 | 4.7 | 1.435 |

Examples 249-250

In a dry box, the reactor injector tubes were charged with amounts of the catalyst of Example 194 and triphenylborane (cocatalyst), as shown in Table 50. In the catalyst tube, 15 ml of VTMoS was added, and to the cocatalyst tube 10 ml of anhydrous toluene (Aldrich) was added. A 3.8 l reactor was charged with 1200 g of cyclohexane, then the solvent was saturated with hydrogen to the pressure shown in Table 50. The reactor was heated to 70° C., then the cocatalyst was injected with ethylene, followed by the catalyst (also with ethylene). The ethylene feed was switched to the reactor side port and the reactor pressure was raised completed to 2.76 MPa with ethylene. The reaction was allowed to proceed for about 3 h. At the end of the run, the polymer was recovered, was washed with acetone, and dried overnight in a vacuum oven under nitrogen purge. The dried polymer yield, the melt index and the silane content are shown in Table 50.

TABLE 50

| Ex. | Catalyst (mg) | Cocatalyst (g) | Hydrogen kPa | Polymer (g) | MI | VTMoS (wt %) |
|---|---|---|---|---|---|---|
| 249 | 205.8 | 3.20 | 138 | 494 | 0.53 | 3.74 |
| 250 | 206.8 | 3.21 | 186 | 421 | 0.40 | 1.56 |

Example 251

Preparation of Low Haze Polymer

In a drybox, the designated amount of catalyst B or "comparative catalyst" 1 [a metallocene catalyst, isopropylidene (cyclopentadienyl)(9-fluorenyl)zirconium dichloride] was dissolved in 80 ml of toluene and mixed with 0.5 ml of triisobutylaluminum (Aldrich, 1 M in Hexanes) when the catalyst was 1, while no triisobutylaluminum was added to the catalyst solutions for B. The mixture was transferred to a catalyst pump feed vessel. In the drybox, 20 mg of the activator tetrakisperflourinated anilinium borane was dissolved in 5 ml of toluene and the designated amount of purified 1-octene, as shown in Table 51. A 500 ml Autoclave Engineers stirred reactor was preheated to 60° C. Anhydrous cyclohexane (250 ml) was added first to the reactor, followed by 0.5 ml of triisobutylaluminum scavenger and then by the activator/1-octene mixture. The reactor was pressurized with ethylene to 2.76 MPa. The catalyst was pumped at the rate and duration shown in Table 51. At the end of the run, the amount of catalyst recovered was used to calculate the catalyst injected into the reactor. These quantities are recorded in Table 51, as the catalyst weight. At the end of the run, the polymer was isolated and dried in a vacuum oven.

TABLE 51

| Run No. | Catalyst (mg) | Pumping Rate (ml/min) | Pumping Time (min) | 1-octene (ml) | VTEoS (ml) | Duration min | Polymer g |
|---|---|---|---|---|---|---|---|
| 251-1 | B (12.8) | 1.14 | 70 | 75 | 10 | 70 | 11.8 |
| 251-2 | B (18.7) | 1.25 | 60 | 75 | 0 | 60 | 12.1 |
| 251-A | 1 (2.0) | 0.80 | 10 | 50 | 0 | 40 | 49.1 |
| 251-B | 1 (17.5) | 1.30 | 55 | 100 | 0 | 55 | 15.8 |

The polymer characterization by DSC, and $^1$H-NMR is shown in Table 52. Haze measurements were made on pressed films of 25 μm thickness. The haze measurements were done on a HunterLab Color Quest® XE (dual beam xenon spectrophotometer) using CIELAB color scales and D65 illuminant at a 10° observer angle. All samples were measured in three different areas of the film and the average of three readings was recorded.

TABLE 52

| Run No. | Tm °C. | $\Delta H_f$ J/g | mol % octene | wt % octene | mol % VTEoS | wt. % VTEoS | Haze |
|---|---|---|---|---|---|---|---|
| 251-1 | 97.4 | 80.34 | 1.53 | 5.85 | 0.693 | 3.56 | 12.7 |
| 225-2 | 99.7 | 80.24 | 1.88 | 7.12 | | | 16.82 |
| 251-A | 102.6 | 31.1 | 3.15 | 11.51 | | | 24.2 |
| 251-B | 75.5 | 40.39 | 5.04 | 17.5 | | | 9.2 |

The results show that the ethylene/octene/vinyl silane terpolymer has lower haze than comparative polymers that have higher comonomer content.

Example 252

Preparation of a Crystalline Copolymer of Ethylene and VTEoS

A sample of copolymer was prepared by dry blending the products of 11 separate polymerizations done in a jacketed 450 mL autoclave using the following procedure. In a drybox 0.0015 g (0.0023 mmol) of B was dissolved in 2.0 mL of dry toluene and loaded into a small metal catalyst addition tube fitted with valves. The catalyst addition tube was attached to the autoclave using a positive nitrogen purge while making the connection. Li[B(C$_6$F$_5$)$_4$].(Et$_2$O)$_n$ cocatalyst (5.0 mole equiv. per Ni, n≈2.5, Boulder Scientific) and B(C$_6$F$_5$)$_3$ cocatalyst (5.0 mole equiv. per Ni, Sud-Chemie) were predissolved in 2.0 mL of a 1:1 mixture of toluene and VTEoS, and this solution was added to the remainder of the toluene and VTEoS in a RB flask. The total volume of toluene in the final solution was 292.5 mL, and the total volume of VTEoS in the final solution was 7.5 mL. This solution was transferred from a rubber septum capped RB flask by cannula into the dry autoclave under a nitrogen purge. The autoclave and contents were purged with ethylene by pressurizing to 690 kPa while stirring followed by venting. After 3 cycles of pressurizing and venting, the autoclave was heated to 60° C. and pressurized with ethylene to 4.1 MPa. The polymerization was started by opening the lower valve of the catalyst addition tube allowing the Ni catalyst solution to flow into the reactor. The mixture was stirred mechanically at 1200 rpm. After about 1.5 h the reaction was terminated by rapidly cooling the autoclave to room temperature and venting the ethylene. The polymer solution was added to 750 mL of dry MeOH containing several drops of triethylamine in a Waring® blender that had been fitted with a nitrogen-purged motor housing. The solvent/solid polymer mixture was filtered on a fritted glass filter and the polymer was washed on the filter with three 50 mL portions of anhydrous MeOH. The solid polymer was then dried in vacuo in an aluminum pan at room temperature to constant weight. Run-to-run reproducibility in the 11 polymerizations was good as evidenced by the low standard deviation in polymer branching: 11.4±1.2 CH$_3$ per 1000 CH$_2$, and weight % VTEoS: 1.51±0.08. Both values were determined by $^1$H NMR. The final dry blended polymer sample weighed 208 g (89 kg copolymer per g Ni). Analyses of the blended sample: DSC (second heat, 10° C./min: T$_m$=120.6° C., 130 J/g. GPC (135° C., TCB, RI detector, vs. polystyrene): Mn=35,000; Mw=70,500; PDI=2.0. MI: 2.7 g/10 minutes (2160 kg, 190° C.). $^1$H NMR branching: 10.4 CH$_3$ per 1000 CH$_2$. Weight % VTEoS: 1.46.

Example 253

Articles Coated with Ethylene/Vinylsilane Copolymers

The following example demonstrates articles such as metal, glass, wood, paper, ceramic, or thermoset that are partly or completely coated with ethylene vinylsilane copolymers. The articles could be protected by the copolymer or would find the copolymer useful as an adhesive because of superior adhesion such as for building panels. These polymers show surprisingly good adhesion to the substrates.

The following substrates were prepared for adhesion to the copolymers:
 a) 10 mil thick aluminum foil samples were washed in soap and water followed by acetone washing and drying at ambient conditions.
 b) 5 mil thick sheets of carbon steel A109 were washed with Bon Ami and water followed by acetone washing and drying at ambient conditions.
 c) 15 mil samples of copper foil were washed in acetone and dried at ambient conditions.
 d) 50 mil thick glass microscope slides were washed in soap and water followed by acetone washing and drying at ambient conditions.

The following copolymers were tested for adhesion:
 a) The polymer of Example 252.
 b) "SI-LINK" DFDA-5451 from Dow Chemical Corporation, which had a melting point at 110° C.

The samples were prepared by placing 7 g of pellets of were into a 4.08 cm by 10.2 cm by 0.13 cm hollow steel box, the base of which was opened to the substrate. The assembly was heated in a press for 1 min at 230° C. at atmospheric pressure. The press pressure was raised rapidly to 172 MPa and held for 1 min. The assembly was cooled to 23° C. within 3 min. 1-2.5 cm wide strips were tested for adhesion at 5.08 cm/min using a 180° pull angle. The copolymer of Example 252 had a 4375 N/m pull force with glass, 2540 N/m with aluminum, 70 N/m with carbon steel, and 210 N/m with copper. DFDA-5451 had a pull force of 700 N/m with glass, 88 N/m with carbon steel, 175 N/m with aluminum, and 88 N/m with copper.

Example 254

Peel Strength of Articles Coated with Ethylene/Vinylsilane Copolymers

The following example shows crosslinked articles, meaning the copolymer has been crosslinked through the alkyoxysilane groups. The copolymers of the application show a surprisingly larger improvement of their thermomechanical properties given their somewhat higher melting point and slightly higher silane content.

The following copolymers were tested for maximum temperature:
 a) The copolymer of Example 252.
 b) "SI-LINK" DFDA-5451 from Dow Chemical Corporation. This copolymer had a melting point at 110° C. and a silane content of 1.3% by $^{13}$C NMR.

The samples were prepared by melt blending 53 g of each copolymer with 2.5 g of an 3% concentrate of dibutyltin dilaurate in a 112° C. melting point ethylene copolymer and with 0.5 g of IRGANOX® 1010 antioxidant. Blending was conducted in a Haake® batch blender at 75 rpm, 200° C., and 10 minutes. The resulting product was stored under nitrogen until further processed. A sample (12 g) of the above compounded copolymer was pressed through a polyester fabric having a box pattern wave and a density of 217 g/m$^2$ The press conditions were 200° C., with a 1-min preheat and 1-min hold at 172 MPa pressure. The resulting disc was cut in half and the halves pressed against themselves except for a 2.5 cm wide zone on the edge. The assembly was exposed to 70° C. water for 24 h to effect crosslinking within the compounded polymer. The resulting product was cut into 2.54 cm wide strips. A 1500 g or 400 g weight was hung from one unsealed edge and the top was fixed to a support. This setup created a 180° peel assembly which was placed in an oven. The temperature was ramped up from 25° C. at 1° C. per minute. The temperature at which the peel failed was noted. The peel for the sample based upon the copolymer of Example 252 survived up to 135° C. and 105° C. for the 400 g and 1500 g weight respectively. The peel for the DFDA-5451 sample survived up to 100° C. and 83° C. for the 400 g and 1500 g weight respectively.

Example 255

Films and Sheets of Ethylene/Vinylsilane Copolymers

A 53 g sample of the copolymer of Example 252 was melt blended with 2.5 g of a 3% concentrate of dibutyltin dilaurate in an ethylene copolymer having a 112° C. melting point. Blending was conducted in a Haake® batch blender at 75 rpm and 200° C. for 10 minutes. The resulting product was stored under nitrogen until further processed. A sample of 4 g of the above compounded copolymer was pressed into a film approximately 0.13 mm thick. The press conditions were 190° C., with a 1-min preheat and 1-min hold at 172 MPa pressure. The film was exposed to 70° C. water for 24 h. Another film was made without dibutyltin dilaurate. The tensile yield strength at 25° C. was 9.38 MPa and 9.65 MPa for the sample without tin and with tin respectively. The tensile modulus at 25° C. between 0% and 2% strain was 228 MPa and 296 MPa for the sample without tin and with tin respectively. The tensile properties at 100° C. could not be tested for the samples without tin because the samples were too close to their melting points and started to flow. The samples containing tin had an elongation at 100° C. of 500±300% and tensile secant modulus of 2.1±690 kPa.

Example 256

Synthesis of 1H,1H,2H,2H-Perfluoro-n-decyl-diethoxyvinylsilane, $CF_3(CF_2)_7CH_2CH_2Si(OEt)_2$ $(CH=CH_2)$ The Grignard reagent prepared from 50.0 g (0.087 mol) of 1,1,1,2,2,3,3,4,4,5,5,6,6,7,7,8,8-heptadecafluoro-1-iodedecane and 4.2 (0.18 mol) of magnesium in 300 ml of ether was added dropwise to the solution of 49.73 g (0.26 mol) of VTEoS in 50 ml of ether at −70° C. The reaction mixture was allowed to warm up to RT and was stirred overnight. The solvent was removed under vacuum and the residue was extracted with 400 ml of hexanes. The extract was concentrated in vacuum and distilled. Yield of 1H,1H,2H,2H-perfluoro-n-decyldiethoxyvinylsilane was 18.84 g (36.53%) as a colorless liquid with b.p. 87-90° C./1 Pa. $^1$H NMR (CDCl$_3$) 0.65-0.72 (m, 2H), 1.05 (t, 6H, J=7.0 Hz), 1.90-2.05 (m, 2H,); 3.60 (q, 4H, J=7.0 Hz), 5.70-6.10 (m, 3H). $^{13}$C NMR (CDCl$_3$) 0.00 (s); 15.39 (s), 22.39 (m); 55.98 (s), 113.53-116.08 (m), 128.89 (s), 133.77 (s). $^{19}$F NMR (CDCl$_3$) 81.85 (m), 116.98 (m), 122.47 (m), 122.65 (m), 124.48 (m), 124.03 (m), 124.30 (m), 126.95 (m). $^{29}$Si NMR (CDCl$_3$)-22.38. Anal. Calcd. for $C_{16}H_{17}F_{17}O_2Si$: C, 32.44; H, 2.89; F, 54.52. Found: C, 32.25; H, 2.74; F, 54.60.

Examples 256-261

Copolymerization of 1H, 1H,2H,2H-Perfluorodecyldiethoxy-vinylsilane, $CF_3(CF_2)_7CH_2CH_2Si(OEt)_2$ $(CH=CH_2)$, with Ethylene Copolymerizations were carried out utilizing B, and EE. The polymerization results are presented in Table 53. Vials were loaded in a nitrogen atmosphere glove box with the indicated amount of the catalyst, cocatalyst, comonomer and p-xylene. The vials were placed in a tube, which was heated to the indicated temperature and pressured with ethylene to the indicated pressure. After 18 h, the resulting copolymers were stirred with methanol, washed twice with methanol and washed one time with ether. The polymer samples were dried under vacuum 0.1 Pa overnight.

TABLE 53

Ethylene copolymerizations with fluoroalkyl-functionalized vinylsilane.

| Example Number | Catalyst (mmol) | Cocat. | Comonomer (ml) | Temp. (° C.) | Press. (MPa) | Yield (g) | Comon. Incorp. weight % | m.p. (° C.) (H$_f$) | M.W. |
|---|---|---|---|---|---|---|---|---|---|
| 256 | B (0.0005 mmol) | 20 eq B(C$_6$F$_5$)$_3$ LiB(C$_6$F$_5$)$_4$ | 0.5 | 80 | 4.14 | 1.41 | 1.18 | 103.28 (120.4) | 49,980 |

TABLE 53-continued

Ethylene copolymerizations with fluoroalkyl-functionalized vinylsilane.

| Example Number | Catalyst (mmol) | Cocat. | Comonomer (ml) | Temp. (° C.) | Press. (MPa) | Yield (g) | Comon. Incorp. weight % | m.p. (° C.) (H$_f$) | M.W. |
|---|---|---|---|---|---|---|---|---|---|
| 267 | EE (0.02 mmole) | 1 ml 6.42% MMAO in heptane | 0.5 | 60 | 4.14 | 6.83 | 0.17 | 94.28 (56.61) | 164,611 |
| 258 | EE (0.02 mmole) | 1 ml 6.42% MMAO in heptane | 1 | 60 | 4.14 | 7.05 | 2.63 | 101.98 (34.23) | 136,364 |
| 259 | EE (0.02 mmole) | 1 ml 6.42% MMAO in heptane | 2 | 60 | 4.14 | 6.18 | 1.29 | 101.97 (18.61) | 162,929 |
| 260 | B (0.0015 moll) | 1 eq (HNMe$_2$Ph) B(C$_6$F$_5$)$_4$ | 0.5 | 60 | 4.14 | 1.64 | 0.78 | 117.03 (120.1) | 58,895 |
| 261 | H (0.0005) | 10 eq B(C$_6$F$_5$)$_3$ | 1 | 100 | 4.14 | 4.79 | 1.24 | 123.48 (147.3) | 24,935 |

The polymer of example 261 had a hexadecane contact angle of 37.1 ± 0.22° (average of three readings) indicating migration of the fluoro groups to the surface.

Examples 262-266

Preparation of Amorphous and Low Crystallinity Copolymers

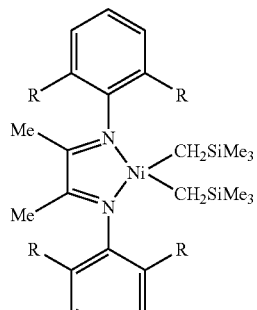

R = Et, JJ; R = i-Pr, KK

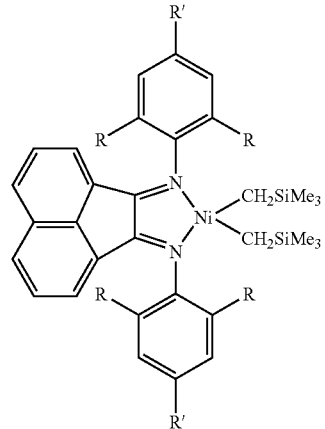

R = i-Pr, R' = H, LL; R = Et, R' = H, MM

Polymerizations were done in a jacketed 450 mL autoclave. In a drybox Li[B(C$_6$F$_5$)$_4$]·(Et$_2$O)$_n$ cocatalyst (4.1 mole equiv. per Ni, n≈2.5, Boulder Scientific) was dissolved in 2.0 mL of anhydrous chlorobenzene and added to the VTMoS comonomer (stored over activated 5A molecular sieves and passed through activity 1 basic alumina immediately before use). B(C$_6$F$_5$)$_3$ cocatalyst (5.2 mole equivalents per Ni, Sud-Chemie) was added to the mixture and the solution was diluted with anhydrous toluene to give a total volume of 150 mL. This solution was transferred from a rubber septum capped RB flask by cannula into the dry autoclave under a nitrogen purge. In a drybox, the Ni catalyst was dissolved in 2.0 mL of dry toluene and loaded into a small metal catalyst addition tube fitted with valves. The catalyst addition tube was attached to the autoclave using a positive nitrogen purge while making the connection. The autoclave was purged with ethylene, and then heated to the reaction temperature and pressurized with ethylene. The polymerization was started by opening the lower valve of the catalyst addition tube allowing the Ni catalyst solution to flow into the reactor. The mixture was stirred mechanically at 1200 rpm. Ethylene uptake was monitored and when ethylene uptake had ceased or slowed considerably, the reaction was terminated by rapidly cooling the autoclave to room temperature and venting the ethylene. Reaction times were typically about 2 h. The polymer solution was added to 750 mL of dry MeOH containing several drops of triethylamine in a Waring® blender that had been fitted with a nitrogen-purged motor housing. Amorphous or very low crystallinity polymers typically precipitated on the side of the glass blender. The toluene/MeOH mixture was decanted from the polymer and the polymer was redissolved in 150 mL of toluene containing several drops of triethylamine. Inverse precipitation of the polymer was then done by slow addition of 750 mL of anhydrous MeOH to the stirring solution in the blender. The toluene/MeOH mixture was decanted from the reprecipitated polymer, and the polymer was dissolved in 150 mL of anhydrous diethyl ether. The ether solution was transferred to a tared round bottom flask and the ether was removed in vacuo on a rotary evaporator. The precipitated polymer was further dried in vacuo at RT in the flask until constant weight indicated the removal of all solvent. If initial precipitation of the polymer in the blender gave a solid the workup procedure was modified. After the redissolution and inverse precipitation in the blender, the solvent/solid polymer mixture was filtered on a fritted glass filter and the polymer was washed on the filter with three 50 mL portions of anhydrous MeOH. The solid polymer was then dried in vacuo in an aluminum pan at room temperature to constant weight. Catalysts JJ, KK, LL, and MM used in these experiments were prepared by reaction of Ni(CH$_2$SiMe$_3$)$_2$(py)$_2$ with the appropriate ligand analogous to the preparation of catalyst B (Example 102). Polymer analyses: DSC was done with two heats from −20° C. to 175° C. at 10° C./min with a controlled cooling of 10° C./min between the two heats. Except as noted, the data from the second heat was recorded (Table 54). For samples which showed a melting transition on the first heat but not on the second heat, the first heat data was recorded. Molecular weight was determined by GPC in 1,2,4-trichlorobenzene at 135° C. vs. polystyrene standards using an RI detector. As noted in Table 54, in some cases absolute molecular weights were determined by dual detection GPC (RI/viscosity) in 1,2,4-trichlorobenzene using the universal calibration method. Vinylsilane incorporation was determined by integration of the —Si(OR)$_3$ peaks in the $^1$H NMR. Ml (g/10 minutes) was determined at 190° C. with a 2.16 kg weight

TABLE 54

Amorphous and low crystallinity copolymers of ethylene and VTMoS.

| Ex. No. | Cat. No. [Amount (μmol)] | Temp (° C.) | Ethylene (MPa) | Silane [vol %] | Yield (g) [kg copolymer per g Ni] | MI | Mw [PDI] | $^1$H NMR branching (CH$_3$ per 1000 CH$_2$) | silane incorp (mole %) | Comment |
|---|---|---|---|---|---|---|---|---|---|---|
| 262 | JJ [14.3] | 80 | 2.07 | VTMoS [25] | 10.5 g [12.5] | 6.8 | 64,500 [2.1] | 61 | 3.8 | opaque, Tm = 43° C. 14.4 J/g |
| 263 | JJ [28.5] | 90 | 2.07 | VTMoS [50] | 10.4 g [6.2] | | 39,700 [2.1]$^a$ | 65 | 8.4 | clear viscous liquid |
| 264 | JJ [28.5] | 90 | 3.45 | VTMoS [50] | 8.3 g [5.0] | | | 57 | 5.2 | clear viscous liquid |
| 265 | KK [28.5] | 80 | 2.07 | VTMoS [25] | 13.3 g [7.9] | NF | 231,500 [2.5] | 91 | 1.2 | opaque, T$_m$ = 41° C.$^b$ 2.7 J/g |

$^a$Absolute molecular weights determined by GPC in 1,2,4-trichlorobenzene at 135° C. using dual detection (RI/viscosity) and the universal calibration method.
$^b$DSC data is from the first heat Examples 266-272

Preparation of Amorphous and Low Crystallinity Copolymers of Ethylene and VTMoS or VTEoS Polymerizations were carried out identically to Examples 1-4 except for the following changes: the Li[B(C$_6$F$_5$)$_4$].(Et$_2$O)$_n$ cocatalyst was dissolved directly in the comonomer without the use of chlorobenzene, the amount of B(C$_6$F$_5$)$_3$ cocatalyst was 5.0 mole equiv. per Ni, in examples 269-272 the amount of Li[B(C$_6$F$_5$)$_4$].(Et$_2$O)$_n$ cocatalyst was 5.0 mole equiv. per Ni, and in example 272 the solvent was cyclohexane instead of toluene. The results are shown in Table 55.

TABLE 56

$^{13}$C NMR branching analysis for examples from Tables 54 and 55.

| Ex. | Total Me | Me | Et | Pr | Bu | Am+ & EOC |
|---|---|---|---|---|---|---|
| 262 | 61.7 | 40.8 | 4.5 | 3.6 | 0.0 | 11.9 |
| 263 | 54.6 | 51.9 | 0.7 | 0.7 | 0.0 | 2.1 |
| 265 | 47.0 | 44.7 | 0.6 | 0.5 | 0.0 | 1.5 |
| 268 | 53.3 | 32.6 | 2.8 | 3.6 | 8.2 | 7.8 |
| 269 | 50.4 | 35.8 | 2.0 | 2.8 | 2.3 | 6.5 |
| 270 | 43.2 | 31.3 | 2.4 | 2.3 | 2.6 | 4.7 |

TABLE 55

Amorphous and low crystallinity copolymers of ethylene and VTMoS or VTEoS.

| Ex. No. | Cat. No. [Amnt. (μmol)] | Temp (° C.) | Ethylene (MPa) | Silane [vol %] | Yield (g) [kg copolymer per g Ni] | MI | Mw [PDI] | $^1$H NMR branching (CH$_3$ per 1000 CH$_2$) | silane incorp (mole %) | Comment |
|---|---|---|---|---|---|---|---|---|---|---|
| 266 | KK [14.5] | 90 | 2.07 | VTMoS [25] | 8.9 g [10.5] | NF | 134,700 [2.0] | 99 | 1.4 | opaque, T$_m$ = 42° C.$^b$ 0.6 J/g |
| 267 | MM [29.5] | 70 | 2.07 | VTEoS [50] | 27.3 g [15.8] | NF | 47,200 [2.2]$^a$ | 33 | 8.0 | white solid T$_m$ = 40° C.$^b$ 12.0 J/g |
| 268 | MM [22.4] | 90 | 2.07 | VTEoS [50] | 24.2 g [18.4] | | 30,400 [2.1]$^a$ | 61 | 9.4 | clear viscous liquid |
| 269 | LL [22.3] | 90 | 2.07 | VTEoS [50] | 25.7 g [19.6] | | 38,900 [2.1]$^a$ | 49 | 7.6 | hazy high viscosity gel |
| 270 | LL [11.2] | 80 | 2.07 | VTEoS [25] | 28.9 g [44.0] | 29 | 57,800 [2.2]$^a$ | 44 | 3.3 | solid T$_m$ = 66° C. 53 J/g |
| 271 | LL [11.2] | 80 | 1.38 | VTEoS [25] | 10.3 g [15.6] | | 39,600 [2.1] | 56 | 4.9 | white solid broad melting |
| 272 | KK [18] | 120 | 3.45 | VTEoS [10] | 2.0 g [1.9] | | 123,600 [1.9] | 132 | 0.36 | clear rubber |

$^a$Absolute molecular weights determined by GPC in 1,2,4-trichlorobenzene at 135° C. using dual detection (RI/viscosity) and the universal calibration method.
$^b$DSC data is from the first heat

TABLE 57

$^{13}C$ NMR analysis of the number of $(CH_2)_n$ groups between the Si and the copolymer backbone for examples from Tables 54 and 55.

| Example | n = 0 (%) | n = 1 (%) | n = 2 (%) | n = 3 (%) | n = 4+ (%) |
|---|---|---|---|---|---|
| 262 | 12.2 | 27.1 | 13.0 | 12.6 | 35.1 |
| 263 | 17.7 | 15.2 | 14.1 | 14.0 | 39.0 |
| 265 | 21.8 | 14.2 | 13.5 | 14.9 | 35.6 |
| 268 | 20.5 | 19.6 | 15.3 | 9.3 | 35.3 |
| 269 | 19.5 | 21.7 | 14.2 | 10.3 | 34.3 |
| 270 | 21.5 | 23.3 | 12.3 | 8.1 | 34.8 |

Example 273

Preparation of NN, and Polymerization with High VTMoS Incorporation

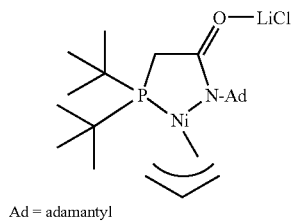

NN

Ad = adamantyl

A sample of 0.5 g (0.003 mol) of [bis(1,1-dimethylethyl)phosphino]methyl lithium was added to the solution of 0.53 g (0.003 mol) of adamantyl isocyanate in 20 ml of THF. After stirring the reaction mixture for 12 h, 0.41 g (0.003 mol) of nickel allyl chloride dimer was added in one portion. After 3 h, the solvent was removed under vacuum, and the residue redissolved in ethyl ether and filtered through Celite®. Ethyl ether was then removed in vacuum. The yield of NN was 1.07 g (73%) as brown powder. $^1$H-NMR ($CD_2Cl_2$) 0.5-1.3 (broad signals, 18H, tert-Bu), 1.5-2.8 (broad signals, 17H, Adamantyl-H and P—$CH_2$—), 3.40-5.00 (broad signals, allyl-protons). $^{31}$P-NMR ($CD_2Cl_2$) 48.58 ppm Copolymerization of ethylene with 1H,1H,2H,2H-perfluoro-n-decylvinyldimethoxysilane under the conditions of Table 53 with 0.01 mmol of NN and 20 equivalents of $B(C_6F_5)_3$, gave a polymer with a melting point of 136° C., molecular weight of 758,000, and incorporation of the comonomer of 18.65% by weight.

Examples 273-311

PMAO-S1 was obtained from Akzo Nobel Inc. Sylopol from Grace (Davison 948) was calcined at 500° C. in a quartz tube under nitrogen for 12 h and transferred to a drybox after cooling. MAO supported on silica (SMAO, 2409) was used as received from Grace. The ligands and transition metal complexes shown below are used in the following examples. The syntheses of OO-RR is described below. The synthesis of 4-allyl-2,6-$Me_2$-aniline is reported in Elliott, M.; Janes, N. F. *J. Chem. Soc.* (C), 1967, 1780-1782. SS and TT are α-diimines and/or Ni complexes the same as or similar to those described in U.S. Pat. No. 6,034,259 and references therein, and U.S. Pat. No. 6,103,658, and these α-diimines and/or Ni complexes are made by methods similar to those described therein.

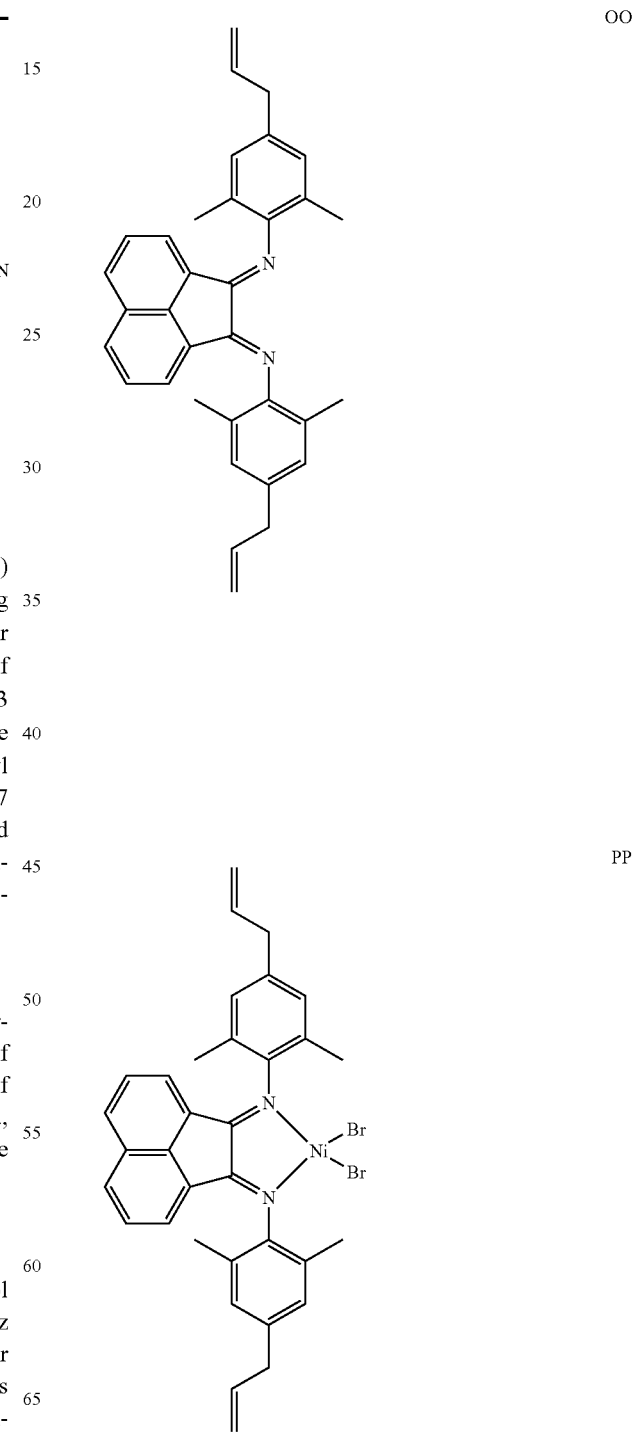

QQ

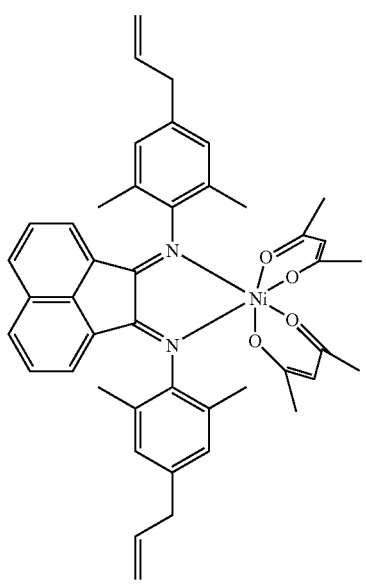

RR

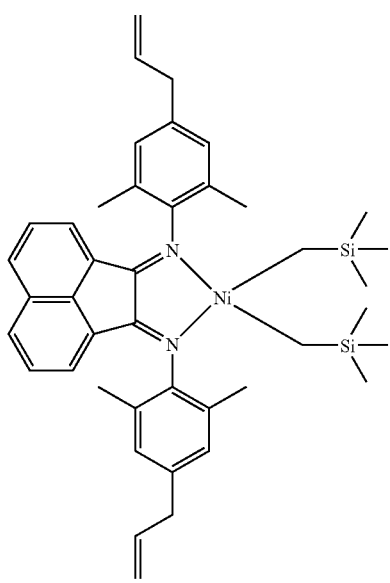

SS

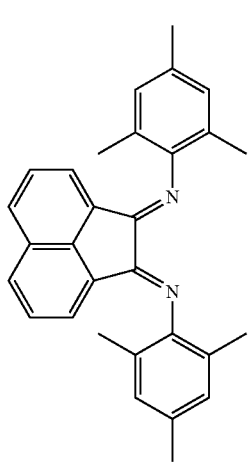

TT

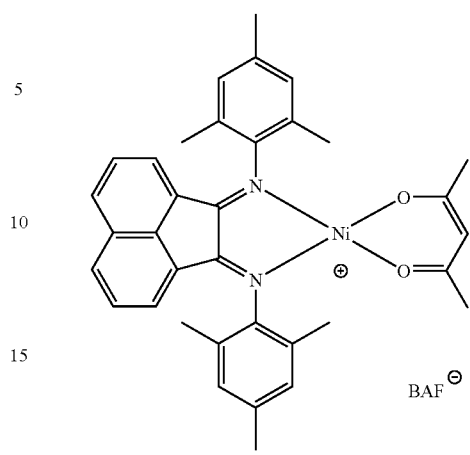

Example 273

Synthesis of OO

To a 300 mL RB flask was added 3.0 g of acenapthoquinone (182.17 g/mol, 0.01647 mmol) and 200 mL of toluene and 6.22 g of 4-allyl-2,6-Me$_2$-aniline (161.24 g/mol, 0.03858 mmol, 2.3 equiv) and a couple of small crystals of p-toluenesulfonic acid monohydrate. The reaction was heated to reflux using a Dean-Stark trap to remove the water generated in the reaction. The solution was heated for several days. Another portion of 4-allyl-2,6-Me$_2$-aniline was added to drive the reaction to completion. The solvent was removed under vacuum and the product was precipitated from methanol. $^1$H NMR (C$_6$D$_6$): 7.9 (d, 2H, ACN); 7.4 (t, 2H ACN); 7.0 (s, 4H, m-NAr); 6.8 (d, 2H, ACN); 6.1 (m, 2H, CH$_2$CH=CH$_2$); 5.1 (m, 4H, CH$_2$CH=CH$_2$); 3.4 (d, 4H, CH$_2$CH=CH$_2$); 2.1 (s, 12H, o-Me).

Example 274

Synthesis of PP

NiBr$_2$(DME) (0.627 g, 308.65 g/mol) and bis[4-allyl-2,6-dimethylphenylimino]acenapthequinone (1.0 g, 468.63 g/mol) were combined in a 100 mL RB flask with 40 mL of dichloromethane. The solution was stirred overnight. The solvent was removed under vacuum and the residue was slurried in pentane and filtered. The solid was recrystallized from dichloromethane and pentane. The brick-red solid was isolated by filtration and dried under vacuum. Yield: 0.968 g.

Example 275

Synthesis of QQ

Ni(acac)$_2$ (0.521 g, 256.91 g/mol) and bis[4-allyl-2,6-dimethylphenylimino]acenapthequinone (1.0 g, 468.63 g/mol) were combined in a 100 mL RB flask with 40 mL of dichloromethane. The solution was stirred overnight. The solvent was removed under vacuum and the residue was dissolved in pentane and recrystallized at −30° C. The dark yellow solid was isolated by filtration. Yield: 1.028 g.

Example 276

Synthesis of RR

A 100 mL RB flask with 30 mL of pentane was cooled to −30° C. The flask was charged with {pyridine}$_2$Ni(CH$_2$SiMe$_3$)$_2$ (0.438 g, 1.12 mmol, 391.32 g/mol) and bis[4-allyl-2,6-dimethylphenbylimino]acenapthequinone (1.07 mmol, 0.5 g, 468.63 g/mol). Added 20 mL of pentane and chilled to −30° C. The solution was stirred for 4 h and the solvent is removed under vacuum. Yield: 0.652 g of dark blue solid.

$^1$H NMR (C$_6$D$_6$): 7.65 (d, 2H, ACN); 7.14 (s, 4H, m-NAr); 6.85 (d, 2H, ACN); 6.58 (t, 2H, ACN); 6.15 (m, 2H, CH$_2$CH=CH$_2$); 5.2 (m, 4H, CH$_2$CH=CH$_2$); 3.45 (d, 4H, CH$_2$CH=CH$_2$); 2.38 (s, 12H, o-NAr); 1.9 (br s, 4H, NiCH$_2$); 0.21 (s, 18H, SiMe$_3$).

Example 277

Synthesis of Catalyst

A 0.5 g sample of SMAO (Grace 2409, 14 wt. % Al) was added to a vial with 7 g of toluene and 17 mg of PP. The sample vial was capped and mechanically shaken for 30 min. The slurry was filtered and rinsed 3 times with toluene (10 mL) followed by 3 times with pentane (10 mL) and dried under vacuum for 30 min. Yield: 0.490 g of dark blue solid.

Example 278

Synthesis of Catalyst

A 0.5 g sample of SMAO (Grace 2409, 14 wt. % Al) was added to a vial with 7 g of toluene and 18, mg of QQ. The sample vial was capped and mechanically shaken for 1 h. The slurry was filtered and rinsed 3 times with toluene (10 mL) followed by 3 times with pentane (10 mL) and dried under vacuum for 30 min. Yield: 0.505 g of dark purple solid.

Example 279

Synthesis of Catalyst

A 0.5 g sample of dried Sylopol 948 (calcined at 500° C. under nitrogen) was added to a vial with 7 g of toluene, 26 mg of B(C$_6$F$_5$)$_3$ and 2 drops of NMe$_2$Ph. The sample vial was capped and mechanically shaken for 1 h. The slurry was filtered and rinsed 3 times with toluene (10 mL) and rinsed 3 times with pentane (10 mL) and dried under vacuum for 15 min. The isolated solid was added to a vial with 7 g of toluene and a sample of RR (0.025 mmol, 17 mg). The sample vial was capped and mechanically shaken for 30 min. The slurry was filtered and rinsed 3 times with toluene (10 mL) and rinsed 3 times with pentane (10 mL) and dried under vacuum for 15 min. Yield: 0.50 g of dark purple solid.

Example 280

Synthesis of Catalyst

A 0.3 g sample of PMAO-S1 (Akzo Nobel, prefiltered to remove any solids) was added to a vial with 7 g of toluene and 8 mg of A (635.06 g/mol). The vial was occasionally shaken over 30 min. The sample was filtered and the filtrate was added to 0.5 g of Sylopol 948 (calcined at 500° C. under nitrogen) in a vial. The sample vial was capped and mechanically shaken for 1 h. The slurry was filtered and rinsed 3 times with toluene (10 mL) followed by 3 times with pentane (10 mL) and dried under vacuum for 30 min. Yield: 0.556 g of solid.

Example 281

Synthesis of Catalyst

A 0.25 g sample of SMAO (Grace 2409, 14 wt. % Al) was added to a vial with 5 g of p-xylene and 8 mg of A (635 g/mol). The sample vial was capped and mechanically shaken for 1 h. The slurry was filtered and rinsed 3 times with p-xylene (10 mL) followed by 3 times with pentane (10 mL) and dried under vacuum for 10 min. Yield: 0.239 g of dark purple solid.

Example 282

Synthesis of Catalyst

A 0.25 g sample of SMAO-(Grace 2409, 14 wt. % Al) was added to a vial with 5 g of p-xylene and 18 mg of TT. The sample vial was capped and mechanically shaken for 1 h. The slurry was filtered and rinsed 3 times with p-xylene (10 mL) followed by 3 times with pentane (10 mL) and dried under vacuum for 10 min. Yield: 0.230 g of dark purple solid.

Example 283

Synthesis of Catalyst

A 0.3 g sample of PMAO-S1 (Akzo Nobel, prefiltered to remove any solids) was added to a vial with 7 g of toluene and 18 mg of TT. The vial was occasionally shaken over 30 min. The sample was filtered and the filtrate was added to 0.5 g of Sylopol 948 (calcined at 500° C. under nitrogen) in a vial. The sample vial was capped and mechanically shaken for 1 h. The slurry was filtered and rinsed 3 times with toluene (10 mL) followed by 3 times with pentane (10 mL) and dried under vacuum for 30 min. Yield: 0.549 g of solid.

Example 284

Synthesis of Catalyst

A 0.5 g sample of SMAO (Grace 2409, 14 wt. % Al) was added to a vial with 6 g of toluene and a 1.0 g aliquot from a 10.0 g toluene solution of 104 mg of SS and 64 mg of Ni(acac)2 (256.91 g/mol). The sample vial was capped and mechanically shaken for 30 min. The slurry was filtered and rinsed 3 times with toluene (10 mL) followed by 3 times with pentane (10 mL) and dried under vacuum for 30 min. Yield: 0.480 g of dark purple solid.

Example 285

Synthesis of Catalyst

A 0.6 g sample of PMAO-S1 (Akzo Nobel, prefiltered to remove any solids) was added to a vial with 6 g of toluene and a 1.0 g aliquot from a 10.0 g toluene solution of 104 mg of SS and 64 mg of Ni(acac)$_2$. The sample vial was capped and mechanically shaken for 40 min. The sample was filtered and the filtrate was added to 1.0 g of Sylopol 948 (calcined at 500° C. under nitrogen) in a vial. The sample vial was capped and mechanically shaken for 30 min. The slurry was filtered and rinsed 3 times with toluene (10 mL) followed by 3 times with pentane (10 mL) and dried under vacuum for 30 min. Yield: 1.330 g of blue-green solid.

Example 286

Synthesis of Catalyst

A 0.25 g sample of dried Sylopol 948 (calcined at 500° C. under nitrogen) was added to a vial with 6.9 g of toluene, 13 mg of $B(C_6F_5)_3$ and 2 drops of $NMe_2Ph$. The sample vial was capped and mechanically shaken for 1 h. The slurry was filtered and rinsed 3 times with toluene (10 mL) and rinsed 3 times with pentane (10 mL) and dried under vacuum for 30 min. The isolated solid was added to a vial with 7 g of toluene and a sample of B (0.0123 mmol, 8 mg). The sample vial was capped and mechanically shaken for 30 minutes. The slurry was filtered and rinsed 3 times with toluene (10 mL) and rinsed 3 times with pentane (10 mL) and dried under vacuum for 15 min. Yield: 0.212 g of dark solid.

Example 287

Synthesis of Catalyst

A 0.25 g sample of dried MS13-1.1 (calcined at 500° C. under nitrogen) was added to a vial with 6.9 g of toluene, 13 mg of $B(C_6F_5)_3$ and 2 drops of $NMe_2Ph$. The sample vial was capped and mechanically shaken for 1 h. The slurry was filtered and rinsed 3 times with toluene (10 mL) and rinsed 3 times with pentane (10 mL) and dried under vacuum for 30 min. The isolated solid was added to a vial with 7 g of toluene and a sample of B (0.0123 mmol, 8 mg). The sample vial was capped and mechanically shaken for 30 min. The slurry was filtered and rinsed 3 times with toluene (10 mL) and rinsed 3 times with pentane (10 mL) and dried under vacuum for 15 min. Yield: 0.235 g of dark solid.

Examples 288-311

General Polymerization Procedure

In a drybox, a glass vial was loaded with a supported Ni catalyst. A solution of cyclohexane and VTEoS was added and the glass insert was then capped and sealed in a tube. Outside of the drybox, the tube was placed under ethylene and was shaken mechanically at the temperature indicated for about 16 h. The resulting reaction mixture was mixed with methanol (with a small amount of triethylamine, approximately 0.1 vol %), filtered, repeatedly washed with methanol and the solid polymer dried under vacuum at room temperature for 24 to 48 h. Results are given in Tables 54-57.

TABLE 54

VTEoS/Ethylene Copolymerization

| Ex. | Ex. # for Catalyst (wt. mg) | mmol Ni[a] | Temp (° C.) | Yield (g) | Mole % VTEoS (by $^1$H NMR) | M.W. |
|---|---|---|---|---|---|---|
| 288 | 277 (20) | 0.001 | 60 | 4.913 | 0.39 | $M_w$ = 178,895 $M_n$ = 24,755 |
| 289 | 278 (20) | 0.001 | 60 | 5.299 | 0.58 | $M_w$ = 162,603 $M_n$ = 30,808 |
| 290 | 279 (20) | 0.001 | 60 | 1.843 | 0.25 | $M_w$ = 143,820 $M_n$ = 36,211 |
| 291 | 277 (20) | 0.001 | 75 | 3.68 | 0.98 | $M_w$ = 115,560 $M_n$ = 21,345 |
| 292 | 278 (20) | 0.001 | 75 | 3.437 | 0.97 | $M_w$ = 121,170 $M_n$ = 19,055 |
| 293 | 279 (20) | 0.001 | 75 | 1.761 | 0.93 | $M_w$ = 84,885 $M_n$ = 17,094 |

Conditions: 9 mL cyclohexane, 1 mL VTEoS, 4.1 MPa, 16 h.
[a]Theoretical maximum of nickel on supported catalyst.

TABLE 55

VTEoS/Ethylene Copolymerization

| Ex. | Ex. # for Catalyst (wt. mg) | mmol Ni[a] | VTEoS (mL) | Yield (g) | Mole % VTEoS (by $^1$H NMR) | M.W. |
|---|---|---|---|---|---|---|
| 294 | 280 (40) | 0.001 | 1.0 | 2.098 | 0.39 | $M_w$ = 157,903 $M_n$ = 33,499 |
| 295 | 280 (40) | 0.001 | 1.5 | 1.741 | 0.57 | $M_w$ = 160,207 $M_n$ = 31,936 |
| 296 | 280 (40) | 0.001 | 2.0 | 1.605 | 0.74 | $M_w$ = 129,373 $M_n$ = 26,653 |
| 297 | 281 (20) | 0.001 | 1.0 | 2.365 | 0.38 | $M_w$ = 168,824 $M_n$ = 33,507 |
| 298 | 281 (20) | 0.001 | 1.5 | 1.869 | 0.61 | $M_w$ = 156,700 $M_n$ = 24,815 |
| 299 | 281 (20) | 0.001 | 2.0 | 1.942 | 0.75 | $M_w$ = 150,311 $M_n$ = 30,841 |

Conditions: Solvent is cyclohexane, solution volume is 10 mL, 75° C., 4.1 MPa, 16 h.
[a]Theoretical maximum of nickel on supported catalyst.

TABLE 56

VTEoS/Ethylene Copolymerization

| Ex. | Ex. # for Catalyst (wt. mg) | mmol Ni[a] | Temp (° C.) | Yield (g) | Mole % VTEoS (by $^1$H NMR) | M.W. |
|---|---|---|---|---|---|---|
| 300 | 282 (20) | 0.001 | 60 | 6.223 | 0.52 | $M_w$ = 192,442<br>$M_n$ = 38,688 |
| 301 | 281 (20) | 0.001 | 60 | 4.868 | 0.14 | $M_w$ = 266,443<br>$M_n$ = 38,319 |
| 302 | 283 (40) | 0.001 | 60 | 3.414 | 0.66 | $M_w$ = 226,549<br>$M_n$ = 38,062 |
| 303 | 280 (40) | 0.001 | 60 | 4.096 | 0.13 | $M_w$ = 222,978<br>$M_n$ = 34,190 |
| 304 | 282 (20) | 0.001 | 75 | 1.912 | 0.25 | $M_w$ = 175,506<br>$M_n$ = 28,304 |
| 305 | 281 (20) | 0.001 | 75 | 3.563 | 0.18 | $M_w$ = 201,037<br>$M_n$ = 35,019 |
| 306 | 283 (40) | 0.001 | 75 | 1.972 | 0.89 | $M_w$ = 192,916<br>$M_n$ = 29,688 |
| 307 | 280 (40) | 0.001 | 75 | 2.889 | 0.24 | $M_w$ = 190,515<br>$M_n$ = 26,383 |
| 308 | 284 (20) | 0.001 | 75 | 2.81 | 0.36 | $M_w$ = 141,792<br>$M_n$ = 32,587 |
| 309 | 285 (40) | 0.001 | 75 | 1.199 | 1.74 | $M_w$ = 124,094<br>$M_n$ = 32,098 |

Conditions: Solvent is cyclohexane, solution volume is 10 mL, 75° C., 4.1 MPa, 16 h.
[a]Theoretical maximum of nickel on supported catalyst.

TABLE 57

VTEoS/Ethylene Copolymerization

| Ex. | Ex. # for Catalyst (wt. mg) | mmol Ni[a] | Temp (° C.) | Yield (g) | Mole % VTEoS (by $^1$H NMR) | M.W. |
|---|---|---|---|---|---|---|
| 310 | 286 (20) | 0.001 | 75 | 1.876 | 0.37 | $M_w$ = 125,440<br>$M_n$ = 26,682 |
| 311 | 287 (20) | 0.001 | 75 | 1.395 | 0.89 | $M_w$ = 96,857<br>$M_n$ = 16,000 |

Conditions: 9 mL cyclohexane, 1 mL VTEoS, 4.1 MPa, 16 h.
[a]Theoretical maximum of nickel on supported catalyst.

Example 312

Synthesis of Catalyst

A 0.5 g sample of SMAO (12 wt. % Al) was added to a vial with 6.9 g of toluene and C (0.025 mmol, 13 mg). The sample vial was capped and mechanically shaken for 30 min. The slurry was filtered and rinsed 3 times with toluene (10 mL) and dried under vacuum for 1 h. Isolated 0.505 g.

Example 313

Synthesis of Catalyst

A 0.5 g sample of SMAO (12 wt. % Al) was added to a vial with 6.9 g of toluene and D (0.025 mmol, 35 mg). The sample vial was capped and mechanically shaken for 30 min. The slurry was filtered and rinsed 3 times with toluene (10 mL) and dried under vacuum for 1 h. Isolated 0.529 g.

Examples 314-324

Polymerizations

The catalysts in Examples 313 and 314 were used in copolymerizations. The results are presented in Tables 58 and 59.

TABLE 58

VTMoS/Ethylene Copolymerization

| Ex. | Ex. # for Catalyst | Temp (° C.) | Pressure (MPa) | VTMoS (mL) | Yield (g) | Mole % VTMoS (by $^1$H NMR) | M.W. |
|---|---|---|---|---|---|---|---|
| 314 | 312 | 75 | 4.1 | 1 | 2.589 | 0.40 | Mw = 149,226<br>Mn = 17,759 |
| 315 | 312 | 75 | 4.1 | 2 | 1.773 | 0.43 | Mw = 120,855<br>Mn = 22,764 |
| 316 | 312 | 60 | 4.1 | 1 | 2.134 | 0.61 | Mw = 233,796<br>Mn = 35,108 |
| 317 | 312 | 60 | 4.1 | 2 | 2.757 | N.D. | Mw = 258,337<br>Mn = 35,377 |
| 318 | 312 | 60 | 2.7 | 1 | 2.131 | 0.05 | Mw = 281,915<br>Mn = 27,300 |
| 319 | 312 | 60 | 2.7 | 2 | 3.321 | 0.31 | Mw = 279,599<br>Mn = 30,742 |
| 320 | 312 | 90 | 4.1 | 1 | 2.321 | 0.81 | Mw = 104,642<br>Mn = 10,174 |
| 321 | 312 | 90 | 4.1 | 2 | 4.552 | 1.32 | Mw = 102,929<br>Mn = 13,930 |

Conditions: solvent = cyclohexane, solution volume is 10 mL total, catalyst weight is 20 mg, 0.001 mmol of Fe is the theoretical maximum of iron on the supported catalyst, 16 h.

TABLE 59

VTEoS/Ethylene Copolymerization in Glass Vials

| Ex. | Ex. # for Catalyst | Solvent | Monomer | Yield (g) | Mole % VTEoS (by $^1$H NMR) | M.W. |
|---|---|---|---|---|---|---|
| 322 | 313 | cyclohexane (9.5 mL) | VTEoS (0.5 mL) | 2.752 | 0.12 | Mw = 65,681 Mn = 10,130 |
| 323 | 313 | cyclohexane (9.5 mL) | VTEoS (0.5 mL) | 3.64 | 0.22 | Mw = 96,211 Mn = 10,177 |
| 324 | 313 | methylcyclohexane (5 mL) | VTEoS (5 mL) | 2.128 | 0.39 | Mw = 160,373 Mn = 23,368 |

Conditions: 90° C., 2.73 MPa, 16 h, catalyst weight is 20 mg, 0.001 mmol of Fe is the theoretical maximum of iron on the supported catalyst.

Example 325

Synthesis of Supported Catalyst

A 1.5 g sample of SMAO (Grace 2409, 14 wt. % Al) was added to a vial with 7 g of toluene and 133 mg of SS (1437 g/mol). The sample vial was capped and mechanically shaken for 1 h. The slurry was filtered and rinsed 3 times with toluene (10 mL) followed by 3 times with pentane (10 mL) and dried under vacuum for 30 min. Yield: 1.503 g of dark solid.

Example 326

Synthesis of Supported Catalyst

A 1.50 g sample of SMAO (Grace 2409, 14 wt. % Al) was added to a vial with 7 g of toluene and 50 mg of A. The sample vial was capped and mechanically shaken for 30 min. The slurry was filtered and rinsed 3 times with toluene (10 mL) followed by 3 times with pentane (10 mL) and dried under vacuum for 30 min. Yield: 1.441 g of dark solid.

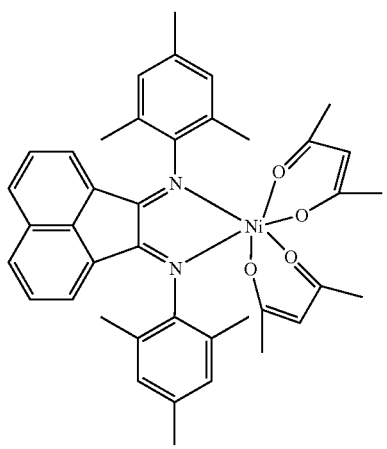

UU

Example 327

Synthesis of UU

Ni(acac)$_2$ (0.77 g, 256.91 g/mol), bis(mesitylimino) acenapthequinone (1.25 g, 416.56 g/mol) and NaBF$_4$ (0.33 g, 109.79) were combined in a 50 mL RB flask with 20 mL of dichloromethane. The solution was transferred to a 300 mL round bottom flask with 150 mL of methanol. The solvent was removed under vacuum and toluene was added to the residue. The solution was filtered and white crystalline solid was recovered on the filter. The toluene was removed from the filtrate to recover 1.564 g of golden-brown solid. A sample was submitted for $^{19}$F NMR and there was no indication of a $^{19}$F resonance. Crystals were grown by slow evaporation of dichloromethane. An X-ray crystal structure analysis indicated the structure shown as UU.

Example 328

Synthesis of Supported Catalyst

A 1.50 g sample of SMAO (Grace 2409, 14 wt. % Al) was added to a vial with 7 g of toluene and 52 mg of UU. The sample vial was capped and mechanically shaken for 30 min. The slurry was filtered and rinsed 3 times with toluene (10 mL) followed by 3 times with pentane (10 mL) and dried under vacuum for 30 ml. Yield: 1.434 g of dark solid.

Examples 329-331

Copolymerization of Ethylene with VTEoS

All polymerizations were done in a 450 mL jacketed autoclave at 75° C., 4.14 MPa ethylene in cyclohexane. A solution of VTEoS (22.5 mL) in anhydrous cyclohexane (102.5 mL) was transferred by cannula to the dry nitrogen purged autoclave from a septum capped round bottom flask. In a drybox, the solid supported catalyst was added as a slurry in 2 mL of cyclohexane to an addition tube consisting of a short piece of 0.6 cm ID tubing with pressure fittings at both ends and a valve at the bottom. A 50 mL metal bomb with Gvalves and pressure fittings at both ends was attached to the top of the tube containing the catalyst, and it was charged with 50 mL of additional cyclohexane. All of the valves were closed, and this addition apparatus was connected to the autoclave at the bottom and an ethylene line at the top while purging with nitrogen. The autoclave was purged by three successive pressure/vent cycles to 0.35 MPa ethylene. The autoclave was then heated to 75° C. and the ethylene pressure was adjusted to 3.86 MPa. The reaction was initiated by pressure injecting the catalyst from the addition tube with 4.14 MPa ethylene. The pressure was maintained at 4.14 MPa during the polymerization and the reaction was stopped by cooling the autoclave rapidly to RT and venting the excess ethylene. The polymer slurry was poured into 750 mL of anhydrous MeOH in a blender. After mixing for several minutes the mixture was filtered on a sintered glass fritted filter. The polymer was washed on the filter with three 50 mL portions of anhydrous methanol, and the polymer was dried overnight in vacuo at RT. Reaction details and characterization are summarized in Table 60.

TABLE 60

Copolymers Made with SMAO Supported Catalysts

| Ex. No. | Catalyst from example No. | Catalyst Amount (mg) [µmole Ni] | Reaction Time (min) | Yield (g) [kg PE per g Ni)] | MI | GPC Mw [PDI] | $^1$H NMR branching (CH$_3$ per 1000 CH$_2$) | VTEoS incorp. (wt %) | DSC T$_m$ & heat of fusion |
|---|---|---|---|---|---|---|---|---|---|
| 329 | 325 | 203 [11.6] | 88 | 20.2 [29.7] | 1.2 | 102,097 [4.92] | 10.7 | 1.29 | 128.7° C. 159 J/g |
| 330 | 326 | 229 [11.6] | 132 | 8.66 [12.7] | no flow | 105,831 [4.90] | 11.1 | 2.07 | 128.0° C. 147 J/g |
| 331 | 328 | 234 [11.6] | 96 | 2.70 [4.0] | no flow | 126,083 [5.23] | 10.6 | 1.53 | 129.1° C. 140.2 J/g |

Examples 332-337

Preparation of Crystalline Copolymers of Ethylene and Vinylsilanes Using Various Cocatalysts Materials and General Procedure B(C$_6$F$_5$)$_3$, [HNMe$_2$Ph][B(C$_6$F$_5$)$_4$] and Li[B(C$_6$F$_5$)$_4$].(Et$_2$O)$_x$ were purchased from Boulder Scientific. AlMe(BHT)$_2$ was prepared by a literature method: Shreve, A. P.; Mulhaupt, R.; Fultz, W.; Calabrese, J.; Robbins, W.; Ittel, S. D. *Organometallics* 1988, 7, 409. [AlMe$_2$(Et$_2$O)$_2$]$^+$[MeB(C$_6$F$_5$)$_3$]$^-$ was prepared by literature methods; (a) Klosin, J.; Roof, G. R.; Chen, E. Y.-X.; Abboud, K. A. *Organometallics* 2000, 19, 4684. (b) Klosin, J. PCT Int. Appl. WO 0011006 (Dow Chemical Co.). Vinyl silane comonomers (Aldrich Sure/Seal™) were stored over activated 5A molecular sieves and passed through activity 1 basic alumina immediately before use. Cyclopentene (Aldrich, 99%) was purified by passing it through a column containing activated 5A molecular sieves, followed by a column of activated neutral alumina, followed by refluxing over sodium for 16 hours, followed by a careful distillation under nitrogen.

All polymerizations were done in a 450 mL jacketed autoclave at 60° C. and 4.14 MPa constant pressure of ethylene using B. The mixing speed was 1200 RPM. The reaction was stopped by cooling the autoclave rapidly to RT followed by venting the unreacted ethylene. DSC of polymers was done with two heats from −20° C. to 175° C. at 10° C./min with a controlled cooling of 10° C./min between the two heats. The T$_m$ and heat of fusion were recorded for the second heat. Molecular weight was determined by GPC in 1,2,4-trichlorobenzene at 135° C. vs. polystyrene standards using an RI detector. Vinylsilane incorporation and hydrocarbon branching were determined by integration of the $^1$H NMR. MI (g/10 min) was determined at 190° C. with a 2.16 kg weight. Polymerization results including analyses are summarized in Table 61.

Example 332

In a dry box, stock solutions of Li[B(C$_6$F$_5$)$_4$].(Et$_2$O) (n≈2.5, 0.090 g in 3.0 mL of chlorobenzene), B(C$_6$F$_5$)$_3$ (0.090 g in 3.0 mL of toluene) and B (0.0085 g in 1.0 mL of toluene) were prepared. Aliquots of the Li[B(C$_6$F$_5$)$_4$].(Et$_2$O) (0.343 mL, 4 mole equiv./Ni) and B(C$_6$F$_5$)$_3$ (0.260 mL, 5 mole equiv./Ni) were added to a mixture of toluene (283 mL) and VTEoS (15 mL). This solution was transferred from a rubber septum capped RB flask by cannula into the dry autoclave under a nitrogen purge. In a drybox, an aliquot of the Ni catalyst (0.236 mL, 3.08 µmole) was dissolved in 2.0 mL of dry toluene and loaded into a small metal catalyst addition tube fitted with valves. The catalyst addition tube was attached to the autoclave using a positive nitrogen purge while making the connection. The autoclave was purged with ethylene, and then heated to the reaction temperature and pressurized with ethylene. The polymerization was started by opening the lower valve of the catalyst addition tube allowing the Ni catalyst solution to flow into the reactor. The reaction time was 94 min. Polymer workup: the polymer slurry was poured into 750 mL of anhydrous MeOH in a blender. After mixing for several minutes the mixture was filtered on a sintered glass fritted filter. The polymer was washed on the filter with three 50 mL portions of anhydrous diethyl ether, and the polymer was dried overnight in vacuo at room temperature. Yield: 27.9 g of white solid. $^{13}$C NMR branching analysis (per 1000 CH$_2$): Total branches (11.0), Me (7.7), Et (0.9), Pr (0.6), Bu (0.6), ≧Am (1.3). Fraction of (CH$_2$)$_n$ groups between the Si and the copolymer backbone: n=0 (53.9%), n=1 (25.8%), n=2 (9.6%), n=3 (10.4%), n≧4 (0.3%).

Example 333

Preinitiation of the Catalyst in the Presence of Cyclopentene

In a dry box, stock solutions of Li[B(C$_6$F$_5$)$_4$].(Et$_2$O) (n≈2.5, 0.050 g in 5.0 mL of diethyl ether), MeAl(BHT)$_2$ (0.096 g in 12.0 mL of diethyl ether) and catalyst/cyclopentene (0.0111 g of B and 0.050 mL of cyclopentene in 5.36 mL of diethyl ether) were prepared. Aliquots of the Li[B(C$_6$F$_5$)$_4$].(Et$_2$O) (1.8 mL, 5.4 mole equiv./Ni) and MeAl(BHT)$_2$ (1.2 mL, 5.2 mole equiv./Ni) were added to a 300 mL RB flask and the ether was allowed to evaporate. A solution of 3.8 mL VTEoS in 146 mL toluene was prepared in a graduated cylinder. Twelve mL of this solution was added to the RB flask followed by 1.2 mL of the catalyst/cyclopentene stock solution (4.0 µmole Ni). After mixing, the solution was allowed to stand for 5 min, and then the remainder of the toluene/VTEoS solution was added. This solution of preactivated catalyst and comonomer was transferred from a rubber septum capped round bottom flask by cannula into the dry autoclave under a nitrogen purge. The autoclave was purged by three successive pressure/vent cycles to 0.35 MPa ethylene. The autoclave was then heated to 60° C. and the ethylene pressure was adjusted to 4.14 MPa. The reaction time was 1.6 h, and the polymer was worked up according to Example 332 except that anhydrous MeOH was used for washing the polymer on the filter rather than diethyl ether. Yield: 13.1 g white solid.

Example 334

Polymerization was initiated by addition of a solution of catalyst (3.1 µmole Ni) in 2.0 mL toluene to an autoclave containing [(CH$_3$)$_2$PhNH]$^+$[B(C$_6$F$_5$)$_4$]$^-$ (1.0 mole equiv./Ni), VTEoS (3.8 mL), and toluene (146 mL) at the temperature and pressure used in Example 332. Reaction time was 1.5 h and the polymer workup was identical to example 333. Yield: 16.5 g white powder.

Example 335

Preinitiated Catalyst in the Absence of Olefin

In a dry box a 300 mL round bottom flask was charged with toluene (12 mL), VTEoS (3.8 mL), B (4.6 µmole), and [AlMe$_2$(Et$_2$O)$_2$]$^+$[MeB(C$_6$F$_5$)$_3$]$^-$ (1.0 mole equiv./Ni). After standing for 5 min, the activated catalyst solution was diluted with 138 mL of additional toluene. Transfer of the solution to the autoclave, polymerization, and workup were carried out according to Example 333. Reaction time was 0.5 h. Yield: 16.4 g white powder.

Example 336

The polymerization procedure was essentially identical to Example 12 using B (3.1 µmole), cocatalysts Li[B(C$_6$F$_5$)$_4$].(Et$_2$O)$_n$ (5 mole equiv./Ni) and B(C$_6$F$_5$)$_3$ (5 mole equiv./Ni), toluene (143 mL), and vinyldimethylethoxysilane (United Chem Tech., 7.5 mL) in place of VTEoS. Reaction time was 1 h. Yield: 10.8 g white powder.

Example 337

Polymerization in Cyclohexane

In a drybox B (4.6 µmole) was dissolved in 2.0 mL of anhydrous cyclohexane and placed in a catalyst addition tube. The cocatalyst [(CH$_3$)$_2$PhNH]$^+$[B(C$_6$F$_5$)$_4$]$^-$ (1.0 mole equiv./Ni) was dissolved in 0.5 mL of chlorobenzene and added to a 300 mL RB flask containing 1.25 mL of VTMoS. After mixing the solution was diluted with 146 mL of anhydrous cyclohexane. The polymerization was carried out according to Example 332. Reaction time was 0.5 h and the polymer workup was identical to Example 333. Yield: 19.6 g white powder.

Example 338

Copolymerization of Ethylene with CF$_3$(CF$_2$)$_7$CH$_2$CH$_2$Si(OMe)$_2$(CH=CH$_2$)

A solution of B (3.85 µmole) in 2.0 mL of toluene was added to a 450 mL autoclave held at 80° C., 4.14 MPa ethylene containing a toluene (130 mL) solution of cocatalysts Li[B(C$_6$F$_5$)$_4$].(Et$_2$O) (5 mole equiv./Ni) and B(C$_6$F$_5$)$_3$ (5 mole equiv./Ni), and comonomer CF$_3$(CF$_2$)$_7$CH$_2$CH$_2$Si(OMe)$_2$(CH=CH$_2$) (15.0 g) using the procedure described in Example 332. There was an exotherm to 87° C. for about 30 sec after the addition of catalyst before the temperature was brought under control. The pressure was maintained at 4.14 MPa during the polymerization, and the reaction was stopped after 2 h by cooling the autoclave rapidly to RT and venting the excess ethylene. The polymer slurry was poured into 300 mL of anhydrous MeOH in a blender. After mixing for several minutes the mixture was filtered on a sintered glass fritted filter. The polymer was washed on the filter with three 50 mL portions of anhydrous methanol. The filtered polymer was flushed with dry nitrogen in a covered container to remove the excess MeOH and then dried overnight in vacuo at RT. In order to ensure that all of the unreacted vinylsilane was removed, the polymer was Soxhlet extracted with anhydrous MeOH for 6 h and then redried as above. Reaction details and polymer characterization are summarized in Table 62.

Example 339

Copolymerization of Ethylene with CF$_3$(CH$_2$)$_7$CH$_2$CH$_2$Si(OMe)$_2$(CH=CH$_2$)

In a dry box, 15 g of CF$_3$(CF$_2$)$_7$CH$_2$CH$_2$Si(OMe)$_2$(CH=CH$_2$) was dissolved in 140 mL of anhydrous toluene. A solution of Li[B(C$_6$F$_5$)$_4$].(Et$_2$O) (5 mole equiv./Ni) and B(C$_6$F$_5$)$_3$ (5 mole equiv./Ni) in 2 mL of chlorobenzene was added, followed by 270 µl of an aliquot of a chlorobenzene stock solution of catalyst H (1.0 mg, 0.82 µmole). This mixture was transferred to a dry nitrogen-filled 450 mL autoclave by cannula, and the polymerization and workup were carried out at 80° C. and 4.14 MPa ethylene according to the procedure of Example 333. The reaction time was 1 h. Reaction details and characterization are summarized in Table 62.

TABLE 61

High Crystallinity Copolymers

| Ex. No. | Cocatalysts (mole equiv./Ni) | Vinyl silane [vol %] | Yield (kg PE per g Ni) | MI | Mw [PDI] | $^1$H NMR branching (CH$_3$ per 1000 CH$_2$) | vinyl silane incorp. (mole %) | DSC T$_m$ & heat of fusion |
|---|---|---|---|---|---|---|---|---|
| 332 | B(C$_6$F$_5$)$_3$ (5) Li[B(C$_6$F$_5$)$_4$] (4) | VTEoS [5] | 155 | 2.6 | 67,100 [2.29] | 10.7 | 0.44 | 118° C. 146 J/g |
| 333 | MeAl(BHT)$_2$ (5.2) Li[B(C$_6$F$_5$)$_4$] (5.4) | VTEoS [2.5] | 56 | | 71,300 [1.98] | 10.5 | 0.21 | 120.3° C. 142 J/g |
| 334 | [(CH$_3$)$_2$PhNH] [B(C$_6$F$_5$)$_4$] (1) | VTEoS [2.5] | 91 | 3.2 | 70,800 [2.11] | 11.4 | 0.22 | 120.5° C. 145 J/g |
| 335 | [(CH$_3$)$_2$Al(OEt$_2$)$_2$] [MeB(C$_6$F$_5$)$_3$] (1) | VTEoS [2.5] | 61 | 0.93 | 91,900 [2.37] | 10.0 | 0.19 | 123.9° C. 162 J/g |
| 336 | B(C$_6$F$_5$)$_3$ (5) Li[B(C$_6$F$_5$)$_4$] (5) | * [5] | 59 | 3.2 | 58,100 [1.77] | 13.4 | 0.26 | 120.7° C. 145 J/g |
| 337 | [(CH$_3$)$_2$PhNH] [B(C$_6$F$_5$)$_4$] (1) | VTMoS [0.83] | 73 | 2.0 | | 11.5 | 0.19 | |

*CH$_2$=CHSiMe$_2$(OEt)

TABLE 62

Copolymers of $CF_3(CF_2)_7CH_2CH_2Si(OMe)_2(CH=CH_2)$

| Ex. No. | Yield (g) [kg PE per g Ni] | MI | GPC Mw [PDI] | $^1$H NMR branching ($CH_3$ per 1000 $CH_2$) | vinyl silane incorp. (wt %) | DSC $T_m$ & heat of fusion |
|---|---|---|---|---|---|---|
| 252 | 208 [89] | 2.7 | 70,500 [2.01] | 10.4 | 1.46# | 120.6° C. 137 J/g |
| 338 | 27.9 [123] | 38.2 | 33,800 [2.28] | 26.4 | 1.86 | 109.1° C. 107 J/g |
| 339 | 2.73 [57] | 68 | 105,831 [4.90] | 9.1 | 0.50 | 125.5° C. 159 J/g |

Example 252: VTEoS comonomer (no fluorine), reaction conditions 60° C., 4.14 MPa ethylene

Example 340

Surface Characterization of Polymers

Polymer samples used to press films were treated with antioxidant by washing on a filter two times with a 2% solution of Irganox® 1010 in acetone, and then drying in vacuo overnight at RT. A film of the polymer was prepared by pressing between PTFE sheets in a Pasadena® press at 140° C. for 1 min at 69 MPa. The film was removed easily from the PTFE, and a piece of film was cut and placed on a glass slide where it was heated to 140° C. for 1 min so that the outer surface was annealed to air. The advancing contact angles of water, $CH_2I_2$, and hexadecane were measured on the annealed polymer films. The water and $CH_2I_2$ contact angles were used to calculate the surface tension of the films by the harmonic mean method ("Polymer and Interface Adhesion", Sougeng Wu, Marcel Dekker, Inc., 1982). The results are summarized in Table 63.

TABLE 63

Surface Measurements: Contact Angles and calculated surface tensions.

| Ex. No. | vinyl silane incorp. (wt. %) | silicon content (wt. %) | fluorine content (wt. %) | $H_2O$ contact angle (°) | $CH_2I_2$ contact angle (°) | surface tension (dynes/cm) | hexadecane contact angle (°) |
|---|---|---|---|---|---|---|---|
| 252 | 1.46 | 0.216 | 0^ | 101.0 ± 0.8 | 55.5 ± 0.2 | 33.6 | 12.4 ± 0.7 |
| 338 | 1.86 | 0.093 | 1.06 | 104.2 ± 0.6 | 63.0 ± 1.3 | 30.1 | 19.3 ± 1.2 |
| 339 | 0.50 | 0.025 | 0.29 | 108.1 ± 1.2 | 43.9 ± 1.4 | # | 13.6 ± 0.4 |

^control sample made with vinyl triethoxysilane comonomer
no solution was found to the harmonic mean calculation The surface energy of homopolyethylene ranges from 33.7 to 36.8 depending upon the amount of branching and the molecular weight ("Polymer Handbook, 3$^{rd}$ Edition", Edited by J. Brandup and E. H. Immergut, Wiley Interscience, 1989, page VI/414). Thus the vinyl triethoxysilane copolymer (Example 252) has a surface tension at the low end of the range for homopolyethylene. However, its nonzero hexadecane contact angle distinguishes it from homopolyethylene which is wetted by hexadecane (i.e. contact angle is 0). Hexadecane contact angles are particularly sensitive to any non-hydrocarbon content of a surface. The reduced surface tension of Example 338 and the nonzero hexadecane contact angles of Examples 338 and 339 are consistent with partially fluorinated surfaces that have lower surface tension than homopolyethylene.

Example 341

Copolymerization of Ethylene and VTEoS

The supported catalyst from Example 194 (250 mg, 15.0 µmole Ni) was used for the copolymerization of ethylene and VTEoS (2.5 volume %) in cyclohexane at 60° C. and 4.14 MPa ethylene pressure following the procedure of Example 21 with a reaction time of 194 min. Yield: 31.2 g uniform spherical white polymer particles (35.4 kg copolymer per g Ni). There was no detectable fouling of the metal autoclave surfaces. DSC (second heat, 10° C./min): $T_m$=121.7° C., 137 J/g. GPC (135° C., TCB, RI detector, vs. polystyrene): Mw=115,800; PDI=2.66. Ml (g/10 minutes, 2160 kg, 190° C.): no flow. $^1$H NMR branching: 18.9 $CH_3$ per 1000 $CH_2$. Weight % VTEoS by $^1$H NMR integration: 0.45.

Examples 342-351

General Procedure for Ethylene Vinylsilane Copolymerizations

In a nitrogen-purged drybox, a glass vial with a gas inlet was loaded with the specified amounts of cyclohexane, vinylsilane and DD. The vial was greased and capped. The vial was then loaded in a reactor inside the drybox. The reactor was sealed, brought outside of the drybox, and placed under the desired ethylene pressure and shaken mechanically. After the stated reaction time, the ethylene pressure was released and the vial was removed from the reactor. The polymer was precipitated by the addition of MeOH (~20 mL). A small amount of triethylamine was added to the solution. The methanol solution was then decanted off of the polymer and the polymer was then washed with more methanol. The polymer was transferred to a pre-weighed vial and dried under vacuum for several days. The polymer yield and characterization were then obtained. $^{13}$C NMR spectra were run without Cr(acac)$_3$. Conditions and results are given in Table 64. Table 65 gives the $^{13}$C NMR branching analysis for some of the polymer of these Examples, while Table 66 gives the spacing analysis "n" for the polymer also listed in Table 65.

TABLE 64

Copolymerization of Ethylene and Vinylsilane with DD for 16 h in Cyclohexane
(Total Volume Vinylsilane + Cyclohexane = 10 mL)

| Ex. | DD mmol | Vinyl Silane mL | Temp °C. (Press, kPa) | Yield g | Comon Incorp. mol %[a] | M.W. | Sol.[b] | Total Me[a] |
|---|---|---|---|---|---|---|---|---|
| 342 | 0.0025 | VTEoS 1.11 | 30 (690) | 0.37 | 1.6 | $M_w$ = 19,861; $M_n$ = 7,985 | S | 119.6 |
| 343 | 0.0025 | VTMoS 0.8 | 30 (690) | 0.63 | 1.7 1.7 ($^{13}$C) | $M_w$ = 7,540; $M_n$ = 1,933 | S | 119.5 86.8[c] ($^{13}$C) |
| 344 | 0.01 | VTEoS 1.11 | 60 (1380) | 2.20 | 0.8 | $M_w$ = 24,120; $M_n$ = 9,287 | S | 118.3 |
| 345 | 0.005 | VTEoS 1.11 | 60 (1380) | 0.51 | 0.9 | $M_w$ = 25,390; $M_n$ = 11,799 | S | 122.4 |
| 346 | 0.0025 | VTEoS 1.11 | 60 (1380) | 0.16 | 0.8 | $M_w$ = 30,059; $M_n$ = 13,316 | S | 122.3 |
| 347 | 0.0025 | VTMoS 0.8 | 60 (1380) | 0.07 | 0.9 | — | — | 121.6 |
| 348 | 0.02 | VTMoS 2 | 60 (1380) | 4.11 | 2.1 1.9 ($^{13}$C) | $M_w$ = 5,765; $M_n$ = 1,857 | S | 113.6 80.0[d] ($^{13}$C) |
| 349 | 0.02 | VTMoS 5 | 60 (1380) | 1.55 | 4.1 3.7 ($^{13}$C) | $M_w$ = 3,320; $M_n$ = 1,051 | S | 103.3 71.0[e] ($^{13}$C) |
| 350 | 0.02 | VTMoS 10 | 60 (1380) | 0.64 | 5.9 5.8 ($^{13}$C) | $M_w$ = 2,602; $M_n$ = 989 | S | 94.8 61.7[f] ($^{13}$C) |
| 351 | 0.02 | VTMoS[g] 1 | 60 (1380) | 0.79 | 1.24[g] | $M_w$ = 10,393; $M_n$ = 3,704 | S | — |

[a]Data obtained from 1H NMR spectroscopy, unless indicated otherwise.
[b]Sol.: Solubility of copolymer in TCB at 135° C. S = Totally soluble or only a slight amount of insoluble material. P = Partially soluble, e.g., some insoluble material present.
[c]1B1 = 21.1% and 1B2 = 34.5%.
[d]1B1 = 20.98% and 1B2 = 1.07%.
[e]%1B1 = 23.8% and %1B2 = 34.85%.
[f]1B1 = 18.34% and 1B2 = 1.77%. These are percentages of branch on branch structures, see WO 9623010 for an explanation of these symbols.
[g]EGPEA (1 mL) was present as a termonomer (8 mL cyclohexane was used): 4.16% IC EGPEA incorporation and 1.06% EOC EGPEA incorporation.

TABLE 65

| Ex. | Total Me | Me | Et | Pr | Bu | Hex+ & eoc | Am+ & eoc | Bu+ & eoc |
|---|---|---|---|---|---|---|---|---|
| 343 | 86.8 | 28.6 | 1.8 | 2.8 | 14.1 | 32.4 | 3.8 | 53.6 |
| 348 | 80.0 | 26.9 | 0 | 2.8 | 13.9 | 33.4 | 38.9 | 5.0 |
| 349 | 71.0 | 22.5 | 0 | 3.5 | 11.7 | 26.9 | 39.0 | 45.1 |
| 350 | 61.7 | 22.0 | 0 | 2.3 | 16.1 | 23.7 | 38.6 | 37.4 |

TABLE 66

| Ex. | n = 0 % | n = 1 % | n = 2 % | n = 3 % | n = 4+ % |
|---|---|---|---|---|---|
| 343 | Nd[a] | Trace | 29.4 | 12.7 | 57.9 |
| 348 | Nd[a] | 5.4 | 25.3 | 16.1 | 53.2 |
| 349 | Nd[a] | Trace | 29.8 | 15.9 | 54.3 |
| 350 | Nd[a] | 3.5% | 17.8% | 17.1% | 61.6% |

[a]Nd: Not determined; overlaps with other resonances.

Examples 352-354

General Procedure for 1-Hexene/VTMoS Copolymerizations

In a nitrogen-purged drybox, a glass vial was loaded with the specified amounts of 1-hexene, VTMoS and DD. The glass vial was capped and placed on a mechanical shaker inside of the drybox where it was shaken for ~1 month. The vial was then removed from the drybox and the polymer was precipitated by the addition of MeOH (~15 mL). A small amount of triethylamine was added to the solution. The methanol solution was then decanted off of the polymer and the polymer was then dissolved in hexane. The polymer was the reprecipitated in methanol and the methanol/hexane solution was decanted off of the polymer. The polymer was dissolved in hexane, reprecipitated in methanol, etc. once again. The polymer was dried under vacuum for several days. The polymer yield and characterization were then obtained. $^{13}$C NMR spectra were run without Cr(acac)$_3$. Conditions and results are given in Table 67. $^{13}$C NMR branching analyses are given in Table 68, and the value of "n", the spacing between the polymer chain branch point and the silicon atom is given in Table 69

TABLE 67

Copolymerization of 1-Hexene and VTMoS with Pd catalyst DD
(Total Volume Vinylsilane + 1-Hexene = 10 mL)

| Ex. | VTMoS mL | Yield g | Comon Incorp. mol %[a] | M.W. | Sol.[b] | Total Me[a] |
|---|---|---|---|---|---|---|
| 352 | 0.2 | 2.16 | 1.4 1.5 ($^{13}$C) | $M_w$ = 30,989; $M_n$ = 6,858 | S | 109.4 107.1 ($^{13}$C) |
| 352 | 0.5 | 2.00 | 2.8 2.9 ($^{13}$C) | $M_w$ = 18,395; $M_n$ = 5,565 | S | 112.0 109.0 ($^{13}$C) |
| 354 | 1 | 1.69 | 5.0 5.1 ($^{13}$C) | $M_w$ = 8,670; $M_n$ = 3,328 | S | 104.3 99.6 ($^{13}$C) |

[a]Data obtained from 1H NMR spectroscopy, unless indicated otherwise.
[b]Sol.: Solubility of copolymer in TCB at 135° C. S = Totally soluble or only a slight amount of insoluble material. P = Partially soluble, e.g., some insoluble material present.

TABLE 68

| Ex. | Total Me | Me | Et | Pr | Bu | Hex+ & eoc | Am+ & eoc | Bu+ & eoc |
|---|---|---|---|---|---|---|---|---|
| 352 | 107.1 | 72.9 | 1.0 | 1.2 | 11.7 | 18.5 | 18.9 | 32.1 |
| 353 | 109.0 | 73.4 | 1.9 | 1.3 | 12.1 | 17.1 | 22.7 | 32.3 |
| 354 | 996 | 67.8 | 1.1 | 1.4 | 21.3 | 15.2 | 122.7 | 29.2 |

TABLE 69

| Ex. | n = 0 % | n = 1% | n = 2% | n = 3% | n = 4+ % |
|---|---|---|---|---|---|
| 352 | Nd | Nd | Nd | 43.1 | 56.9 |
| 353 | Nd | Nd | Nd | 16.4 | 83.6 |
| 354 | Nd | Nd | 23.8 | 14.1 | 62.1 |

[a]Nd: Not detected/trace

Example 355

Synthesis of Silica Supported Catalyst

A 1.50 g sample of dried Sylopol® 948 (calcined at 500° C. under nitrogen) was added to a vial with 10 g of toluene, 78 mg of $B(C_6F_5)_3$ and 19 mg of $NMe_2Ph$. The sample vial was capped and mechanically shaken for 1 h. The slurry was filtered and rinsed 3 times with toluene (10 mL) and rinsed 3 times with pentane (10 mL) and dried under vacuum for 30 min. The isolated solid was added to a vial with 10 g of toluene and a sample of B (0.075 mmol, 49 mg). The sample vial was capped and mechanically shaken for 30 min. The slurry was filtered and rinsed 3 times with toluene (10 mL) and rinsed 3 times with pentane (10 mL) and dried under vacuum for 30 min. Yield: 1.566 g of dark solid.

Example 356

Synthesis of Silica Supported Catalyst

A 1.50 g sample of dried Sylopol® 948 (calcined at 500° C. under nitrogen) was added to a vial with 10 g of toluene, 78 mg of $B(C_6F_5)_3$ and 19 mg of $NMe_2Ph$. The sample vial was capped and mechanically shaken for 1 h. The slurry was filtered and rinsed 3 times with toluene (10 mL) and rinsed 3 times with pentane (10 mL) and dried under vacuum for 30 min. The isolated solid was added to a vial with 10 g of toluene and a sample of RR (0.075 mmol, 53 mg). The sample vial was capped and mechanically shaken for 30 min. The slurry was filtered and rinsed 3 times with toluene (10 mL) and rinsed 3 times with pentane (10 mL) and dried under vacuum for 30 minutes. Yield: 1.566 g of dark solid.

Example 357

Copolymerization of Ethylene and VTMoS

The supported catalyst from Example 355 (200 mg, 9.57 µmole Ni) was used for the copolymerization of ethylene and VTMoS (5.0 volume %) in cyclohexane (150 mL total volume) at 75° C. and 4.14 MPa ethylene pressure following the procedure of Example 172. Yield: 10.9 g white powder. Details and polymer characterization are summarized in Table 70.

Example 358

Copolymerization of Ethylene and VTEoS

The supported catalyst from Example 356 (132 mg, 6.3 µmole Ni) was used for the copolymerization of ethylene and VTEoS (5.0 volume %) in cyclohexane (150 mL total volume) at 75° C. and 4.14 MPa ethylene pressure following the procedure of Example 172. Yield: 3.44 g white powder. Details and polymer characterization are summarized in Table 70.

The particle size distribution of the powder isolated in Examples 357 and 358 were measured on a Beckman Coulter LS230 (a laser diffraction instrument) with size range of 0.04 to 2000 microns. The large particle size (peak of distribution about 300 µm and narrow distribution of Example 358 is consistent with polymer formation occurring exclusively on the supported catalyst. The bimodal distribution of Example 357 (peaks at about 11 and 250 µm suggests that part of the polymer was made on the supported catalyst, and part of the polymer was made in solution from catalyst that leached off of the support. This interpretation is supported by the bimodal melting behavior observed in the DSC of Example 357. Optical microscopy and SEM of Example 357 show a mixture of large relatively uniform shaped particles along with smaller irregular shaped particles that appear to be aggregates of even smaller particles. Optical microscopy and SEM of Example 358 show only large relatively uniform shaped particles consistent with the replication of morphology of the starting Sylopol® 948 support.

Example 359

Copolymerization of Ethylene and VTEoS

A large sample of catalyst was prepared by the method described in Example 356. In a dry box, this catalyst (2.50 g, 0.125 mmol) was loaded into a 0.95 cm by 30.5 cm stainless steel blow case and connected to a 150 mL blow case containing anhydrous toluene with a ball valve between the two blow cases and with valves on both ends. A separate 500 mL blow case was charged with 200 mL of VTEoS (8.0 volume % of total reaction) that had been sparged with nitrogen, dried over activated 5A molecular sieves, and passed through a column of activity 1 neutral alumina (10.2 cm by 5.1 cm bed). A 3.8 l autoclave was heated to 140° C. and purged with dry nitrogen for 4 h. The autoclave was cooled to 60° C. under nitrogen. The autoclave was charged with 2.5 l of anhydrous pentane under nitrogen purge. The two blow cases were attached to the autoclave while purging the valves with nitrogen. The autoclave was purged with ethylene and heated to 75° C. The VTEoS was pushed into the autoclave with 3.62 MPa ethylene pressure. The VTEoS/pentane mixture was stirred at 600 rpm under 3.62 MPa ethylene pressure to saturate the solution with ethylene. The blow case containing toluene was pressured to 4.14 MPa ethylene, then the valve was opened between the toluene and catalyst blow case, and then the entire contents of both blow cases were pressured into the reactor. After the pressure in the autoclave equalized to 4.14 MPa, the catalyst blow case was isolated from the autoclave, and ethylene was fed to the autoclave via a dip tube to maintain the ethylene pressure at 4.14 MPa. After 5.5 h reaction time the autoclave was vented and cooled. The polymer was filtered on a large fritted glass filter by vacuum-suction, and then washed twice on the filter with 1 liter of anhydrous ether. The polymer was dried in vacuo with a nitrogen sweep at room temperature for 18 hours. Yield: 268 g of uniform free-flowing white power. There was no evidence of fouling of the metal surfaces of the autoclave. Reaction parameters and polymer characterization are summarized in Table 70. DSC measurements were done by the ASTM method (2160 g, 190° C.) with a six min preheat before the first cut was taken. In order to judge the melt stability of the polymer, the sample was left in the apparatus for an additional 15 min at 190° C. after the first cut and then another cut was taken. There was no change in the MI after this hold time thus establishing that the polymer has good melt stability toward crosslinking at these conditions.

TABLE 70

| Ex. No. | Catalyst Amount (mg) [μmole Ni] | Yield (g) [kg PE per g Ni] | MI | GPC Mw [PDI] | ¹H NMR branching ($CH_3$ per 1000 $CH_2$) | vinyl silane incorp. (wt %) | DSC $T_m$ & heat of fusion |
|---|---|---|---|---|---|---|---|
| 357 | 200 [9.08] | 10.9 [19.4] | 5.9 | 73,200 [3.69] | 14.5 | 2.27 | 128.7° C. 113.4° C. (shoulder) 139 J/g |
| 358 | 132 [6.3] | 3.44 [9.3] | 1.1 | 100,000 [3.79] | 8.7 | 0.59 | 129.4° C. 157 J/g |
| 359 | 2500 [125] | 267 [36.4] | 0.6 | | 8.9 | 1.34 | |

Examples 360-361

Figure 3:
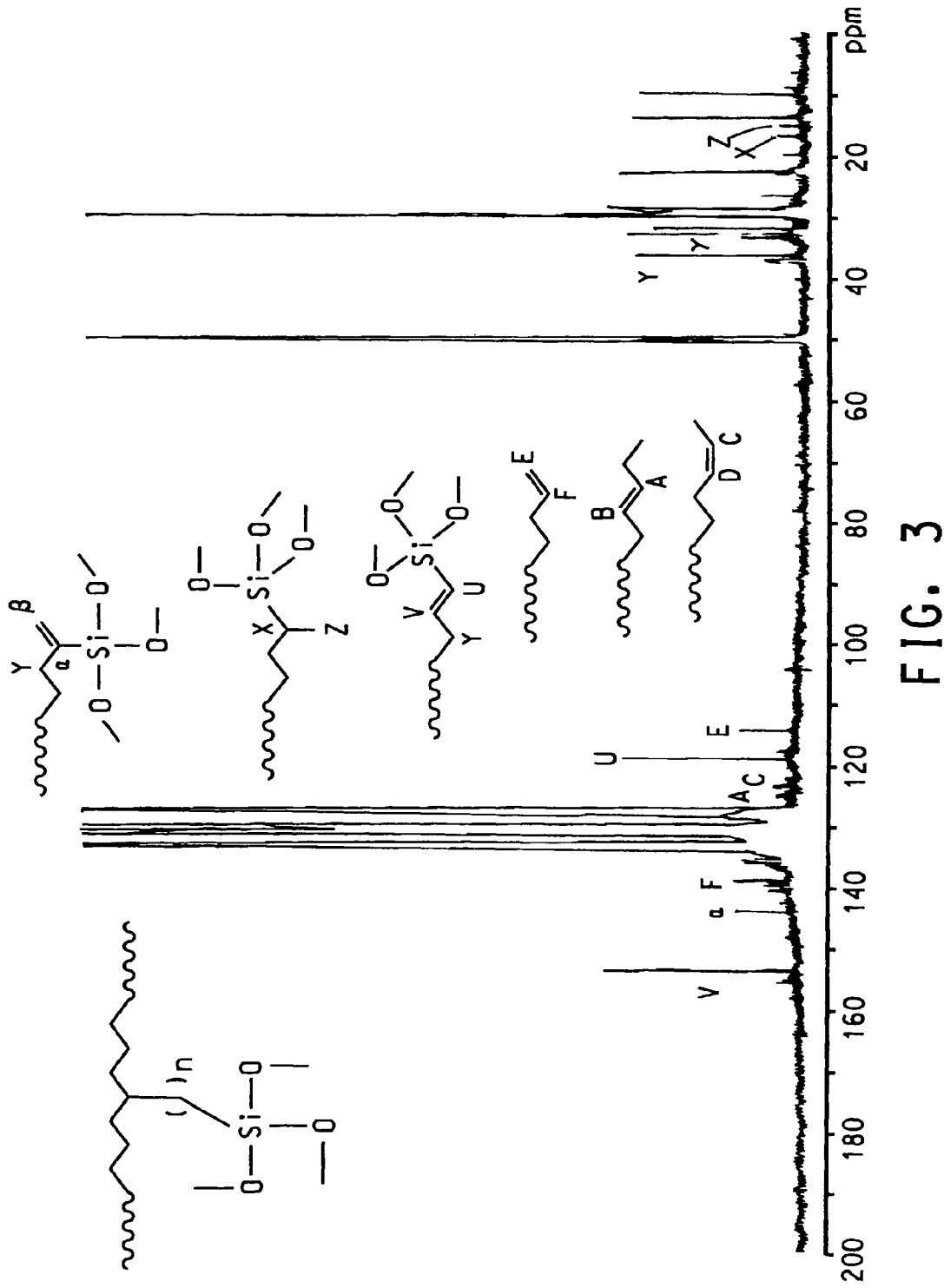
FIG. 3 shows the $^{13}$C NMR spectrum of the polymer of Example 361, and some of the assignments of the peaks.

E/Vinylsilane Copolymerizations Producing Copolymers with Silyl-Substituted Vinylidene End Groups In a nitrogen-purged drybox, a glass vial with a gas inlet was loaded with the specified amounts of $B(C_6F_5)_3$, Ni cmpd (as a solution in 0.2 to 0.5 mL $Et_2O$), cyclohexane and VTMoS, with the total volume of cyclohexane and VTMoS being 10 ml. The vial was greased and capped. The vial was then loaded into a reactor inside the drybox. The reactor was then sealed, brought outside of the drybox, placed under the desired ethylene pressure, heated to 60° C., and shaken mechanically. After 16-18 h, the ethylene pressure was released and the vial was removed from the reactor. The polymer was precipitated by the addition of MeOH (~20 mL). A small amount of triethylamine was added to the solution. The polymer was then collected on a frit and rinsed with MeOH. The polymer was transferred to a pre-weighed vial and dried under vacuum for several days. The polymer yield and characterization were then obtained. ¹³C NMR spectra were run without $Cr(acac)_3$. Conditions and results are reported in Tables 71-74. In Table 75 the ¹³C NMR of the product of Example 361 is given. In Table 75 the "Designation" means the particular carbon atom shown in FIG. 3, which the ¹³C NMR of the product of Example 361. Other designations shown in Table 75 are explained above in the section on NMR measurements.

TABLE 72

¹³C NMR Branching Analysis for Example 361

| Total Me | Me | Et | Pr | Bu | Hex+ & eoc | Am+ & eoc | Bu+ & eoc |
|---|---|---|---|---|---|---|---|
| 21.9 | 3.1 | 2.6 | 0 | 0 | 8.1 | 15.2 | 16.2 |

TABLE 73

Spacing (n) between Si and the Copolymer Backbone for Example 361

| n = 0, % | n = 1, % | n = 2, % | n = 3, % | n = 4+, % |
|---|---|---|---|---|
| 25.3 | 7.8 | Nd | Trace | 66.9 |

[a]Nd: Not detected.

TABLE 71

| Ex. | Cmpd mmol | $B(C_6F_5)_3$ mg | VTMoS mL | Press MPa | Yield g | VTMoS Incorp.[a] Mol % | M.W. | Sol.[b] | Total Me[a] |
|---|---|---|---|---|---|---|---|---|---|
| 360 | M 0.005 | 0 | 1 | 2.1 | 1.43 | 4.5 4.1 IC&EB 0.4EG | $M_w$ = 37,541; $M_n$ = 1,051 | P | 33.0 |
| 361 | J 0.002 | 2.6 | 10 | 4.1 | 7.43 | 10.7 7.87 IC&EB 2.87 EG ¹³C NMR: 14.0 11.2 IC&EB 2.8 EG | $M_w$ = 657; $M_n$ = 285 | S | 17.7 ¹³C NMR: 21.9 |

[a]Data obtained from ¹H NMR unless specified otherwise.

[b]Sol.: Solubility of copolymer in TCB at 135° C.. S = Totally soluble or only a slight amount of insoluble material. P = Partially soluble, e.g., some insoluble material present.

TABLE 74

$^1$H NMR Analysis of the Distribution of Olefins End Groups$^a$

| Ex. | R—CH=CH$_2$, % | R—CH=CH—R', % | R—CH=CH—Si(OMe)$_3$, % | R[(MeO)$_3$Si]—C=CH$_2$, % |
|---|---|---|---|---|
| 360 | 38.1 | 18.7 | 14.3 | 28.9 |
| 361 | 11.8 | 15.8 | 52.4 | 20.0 |

$^a$R,R' = Polymer chain.

TABLE 75

$^{13}$C NMR Spectrum of the Product of Example 361

| number | PPM | intensity | Designation |
|---|---|---|---|
| 1 | 155.338 | 4.1 | |
| 3 | 153.787 | 39.3 | V |
| 5 | 144.089 | 12.4 | |
| 8 | 140.415 | 5.1 | |
| 10 | 139.754 | 7.1 | |
| 11 | 139.070 | 12.3 | F |
| 12 | 137.265 | 5.4 | |
| 13 | 136.678 | 6.4 | |
| | 136-127 | solvent | |
| 51 | 125.115 | 4.5 | |
| 54 | 123.549 | 5.4 | C |
| 57 | 118.937 | 35.3 | U |
| 59 | 117.667 | 4.1 | |
| 60 | 114.157 | 12.2 | E |
| 63 | 50.617 | 6.6 | OMe |
| 64 | 50.228 | 70.9 | OMe |
| 65 | 50.146 | 72.9 | OMe |
| 66 | 49.989 | 239.2 | OMe |
| 67 | 49.780 | 16.4 | OMe |
| 68 | 37.267 | 7.2 | |
| 69 | 36.509 | 34.1 | Y |
| 70 | 36.101 | 15.5 | |
| 73 | 33.620 | 11.1 | |
| 74 | 32.932 | 35.5 | |
| 75 | 32.622 | 6.3 | |
| 76 | 31.897 | 30.6 | 3B$_{6+}$ |
| 77 | 31.785 | 6.8 | |
| 78 | 30.058 | 35.2 | (CH2)$_x$ |
| 79 | 29.707 | 1534.7 | (CH2)$_x$ |
| 80 | 29.486 | 105.1 | (CH2)$_x$ |
| 81 | 29.292 | 74.1 | (CH2)$_x$ |
| 82 | 29.180 | 55.5 | (CH2)$_x$ |
| 83 | 28.974 | 30.9 | (CH2)$_x$ |
| 84 | 28.907 | 22.3 | (CH2)$_x$ |
| 85 | 28.530 | 38.8 | (CH2)$_x$ |
| 86 | 27.143 | 8.5 | |
| 87 | 27.027 | 5.9 | |
| 88 | 23.141 | 11.3 | MSB$_0$ |
| 89 | 22.685 | 37 | 2SB$_{5+}$ |
| 90 | 22.561 | 35.4 | 2B$_{5+}$ |
| 91 | 19.654 | 4 | 1B$_1$ |
| 92 | 16.668 | 4.6 | X |
| 93 | 15.277 | 4.7 | 1SB$_1$ |
| 94 | 13.947 | 6.3 | Z |
| 95 | 13.719 | 34.6 | 1B$_{4+}$ |
| 96 | 9.526 | 33.1 | 1SB$_{4+}$ |

Examples 362-365

Ethylene Copolymerization with Various Vinylsilanes

In a nitrogen-purged drybox, a glass vial with a gas inlet was loaded with the specified amounts of B(C$_6$F$_5$)$_3$, LiB(C$_6$F$_5$)$_4$·2.5Et$_2$O, Ni cmpd (as a solution in 0.2 to 0.4 mL Et$_2$O), solvent and vinylsilane (total volume of vinylsilane and solvent was 10 ml). The vial was greased and capped. The vial was then loaded in a reactor inside the drybox. The reactor was then sealed, brought outside of the drybox, placed under the desired ethylene pressure and shaken mechanically. After 16-18 h, the ethylene pressure was released and the vial was removed from the reactor. The polymer was precipitated by the addition of MeOH (~20 mL). A small amount of triethylamine was added to the solution. The polymer was then collected on a frit and rinsed with MeOH. The polymer was transferred to a pre-weighed vial and dried under vacuum for several days. The polymer yield and characterization were then obtained. $^{13}$C NMR spectra were run without Cr(acac)$_3$. Conditions and results are shown in Table 76. Further details of the properties of the polymer of Example 363 are shown in Table 77 and 78.

TABLE 76

Ethylene Copolymerization with H$_2$C=CH—Si(OR)$_3$ (R = i-Pr, Ph, SiMe$_3$) and 1,3-Divinyltetramethyldisiloxane (DV; H$_2$C=CHSi(Me)$_2$OSi(Me)$_2$CH=CH$_2$)

| Ex. | Cmpd mmol | B(C$_6$F$_5$)$_3$ mg (LiB(C$_6$F$_5$)$_4$ mg) | VS mL (Solvent) | Temp °C. (Press MPa) | Yield g | VS Incorp.$^a$ mol % | M.W.$^b$ | Total Me$^a$ |
|---|---|---|---|---|---|---|---|---|
| 362 | X 0.002 | 102.4 (0) | R = i-Pr 1.41 (p-Xylene) | 60 (4.1) | 0.034 | 0.7 | M$_w$ = 38,950; M$_n$ = 13,497 | 12.3 |
| 363 | X 0.002 | 102.4 (0) | R = Ph 1.56 (p-Xylene) | 60 (4.1) | 11.0 | 1.1 $^{13}$C NMR: 1.72 | M$_w$ = 19,301; M$_n$ = 5,409 | 17.7 $^{13}$C NMR: 22.3 |
| 364 | B 0.001 | 5.2 (0.87) | R = SiMe$_3$ 1.95 (Toluene) | 105 (2.8) | 3.46 | 0.2 | M$_w$ = 26,059; M$_n$ = 7,499 | 58.6 |

TABLE 76-continued

Ethylene Copolymerization with $H_2C=CH—Si(OR)_3$ (R = i-Pr, Ph, $SiMe_3$) and 1,3-Divinyltetramethyldisiloxane (DV; $H_2C=CHSi(Me)_2OSi(Me)_2CH=CH_2$)

| Ex. | Cmpd mmol | $B(C_6F_5)_3$ mg $(LiB(C_6F_5)_4$ mg) | VS mL (Solvent) | Temp °C. (Press MPa) | Yield g | VS Incorp.[a] mol % | M.W.[b] | Total Me[a] |
|---|---|---|---|---|---|---|---|---|
| 365 | W 0.005 | 5.1 (4.4) | DV 0.5 (Cyclohexane) | 60 (2.8) | 0.93 | 0.29[c] | $M_n = 5,155$[d] | 5.7 |

[a]Data obtained from $^1$H NMR unless specified otherwise.
[b]Data obtained from GPC unless specified otherwise.
[c]According to the $^1$H NMR spectrum, one of the vinyl groups of DV is incorporated in the polymer and the other remains unreacted.
[d]Obtained by end group analysis in the $^1$H NMR spectrum.

TABLE 77

$^{13}$C NMR Branching Analysis for Example 363

| Total Me | Me | Et | Pr | Bu | Hex+ & eoc | Am+ & eoc | Bu+ & eoc |
|---|---|---|---|---|---|---|---|
| 22.3 | 13.6 | 2.3 | 1.6 | 1.9 | 2.8 | 4.7 | 4.9 |

TABLE 78

Spacing (n) between Si and the Copolymer Backbone for Example 363

| n = 0 % | n = 1 % | n = 2 % | n = 3 % | n = 4+ % |
|---|---|---|---|---|
| 33.33 | Nd | 26.67 | 20.0 | 20.0 |

[a]Nd: Not determined.

Examples 366-373

E/1-Octene/VTMoS Copolymerizations

In a nitrogen-purged drybox, a glass vial with a gas inlet was loaded with the specified amounts of $B(C_6F_5)_3$ (10.2 mg), and $LiB(C_6F_5)_4 \cdot 2.5Et_2O$ (3.4 mg), followed by the addition of cyclohexane, VTMoS (total volume of cyclohexane and VTMoS was 10 ml,) 1-octene, and the Ni cmpd (0.04 mmol) dissolved in 0.2 mL of $Et_2O$. The vial was greased and capped. The vial was then loaded in a reactor inside the drybox. The reactor was then sealed, brought outside of the drybox, placed under the desired ethylene pressure, heated to 120° C., and shaken mechanically. After 3 h, the ethylene pressure, was released and the vial was removed from the reactor. The polymer was precipitated by the addition of MeOH (~20 mL). A small amount of triethylamine was added to the solution. The polymer was then collected on a frit and rinsed with MeOH. The polymer was transferred to a pre-weighed vial and dried under vacuum for several days. The polymer yield and characterization were then obtained. $^{13}$C NMR spectra were run without $Cr(acac)_3$. Conditions and results are shown in Table 79.

TABLE 79

E/1-Octene/VTMoS Copolymerizations

| Ex. | Cmpd | VTMoS mL (1-Octene) mL | Press psi | Yield g | VTMoS Incorp.[a] mol % | M.W. | Sol.[b] | Total Me[a] |
|---|---|---|---|---|---|---|---|---|
| 366 | LL | 0.5 (0.5) | 500 | 1.72 | 0.9 | $M_w = 92,415$; $M_n = 18,113$ | S | 107.8 |
| 367 | MM | 0.5 (0.5) | 500 | 1.72 | 2.1 | $M_w = 47,279$; $M_n = 11,064$ | S | 97.9 |
| 368 | KK | 0.5 (0.5) | 500 | 1.32 | 0.6 | $M_w = 239,786$; $M_n = 55,675$ | P | 111.0 |
| 369 | KK | 1 (1) | 500 | 1.01 | 1.1 | $M_w = 176,166$; $M_n = 12,969$ | P | 103.1 |
| 370 | LL | 0.5 (0.5) | 700 | 2.28 | 0.8 | $M_w = 131,187$; $M_n = 16,932$ | P | 100.3 |
| 371 | MM | 0.5 (0.5) | 700 | 2.44 | 1.2 | $M_w = 150,862$; $M_n = 9,771$ | S | 87.4 |
| 372 | KK | 0.5 (0.5) | 700 | 1.56 | 0.6 | $M_w = 291,890$; $M_n = 65,006$ | P | 94.5 |
| 373 | KK | 1 (1) | 700 | 1.57 | 1.7 | $M_w = 320,028$; $M_n = 61,588$ | P | 113.3 |

[a]Data obtained from $^1$H NMR unless specified otherwise.
[b]Sol.: Solubility of copolymer in TCB at 135° C.. S = Totally soluble or only a slight amount of insoluble material. P = Partially soluble, e.g., some insoluble material present.

What is claimed is:

1. A process for the copolymerization of one or more hydrocarbon olefins and one or both of an allylsilane and a vinylsilane, comprising the step of contacting, under coordination polymerizing conditions:
   (A) a monomer mixture comprising:
      (a) ethylene or α-olefin of the formula $H_2C=CH(CH_2)_tCH_3$, wherein t is 0 or an integer of 1 to 20;
      (b) one or both of an allylsilane and a vinylsilane, wherein said allylsilane comprises at least one hydrolysable group and said vinylsilane comprises at least one hydrolysable group; and
      (c) optionally one or more other copolymerizable olefinic monomers;
   and
   (B) an active polymerization catalyst comprising a transition-metal complex of a bidentate or tridentate ligand, said complex comprising a Group 8, 9, 10, or 11 transition metal.

2. The process as recited in claim 1, wherein said vinylsilane and said ethylene are both present.

3. The process as recited in claim 2, wherein said vinylsilane has the formula $H_2C=CHSiR^{63}R^{64}R^{65}$ wherein $R^{63}$ is a hydrolyzable group, and $R^{64}$ and $R^{65}$ are each independently a hydrolyzable group, siloxy, hydrocarbyl or substituted hydrocarbyl, provided that any two of $R^{63}$, $R^{64}$, and $R^{65}$ together may form a ring, or all of $R^{63}$, $R^{64}$, and $R^{65}$ together may form a ring structure.

4. The process as recited in claim 3, wherein said hydrolyzable group is an alkoxy group.

5. The process as recited in claim 3, wherein $R^{63}$, $R^{64}$, and $R^{65}$ are all in-dependently said hydrolyzable groups.

6. The process as recited in claim 1, wherein said ligand is a bidentate ligand.

7. The process as recited in claim 6, wherein said transition metal is Ni, Cu, Fe, or Pd.

8. The process as recited in claim 7, wherein said transition metal is Ni.

9. The process as recited in claim 7, wherein said ligand is α-diimine.

10. The process as recited in claim 1, wherein said transition metal is Fe and said tridentate ligand is a bisimine of a 2,6-diacylpyridine or a bisimine of a 2,6-pyridinedicarboxaldehyde.

11. The process as recited in claim 1, which is carried out at a temperature of about 50° C. to about 180° C.

12. The process as recited in claim 1, which is a continuous process.

13. The process as recited in claim 12, which is a gas phase process.

14. The process as recited in claim 12, wherein a liquid phase is present.

15. The process as recited in claim 14, which is a slurry process.

16. The process as recited in claim 14, which is a solution process.

17. The process as recited in claim 1, wherein said transition-metal complex is supported on a heterogeneous support.

18. The process as recited in claim 1, wherein one or more co-catalysts and/or activators are present.

19. The process as recited in claim 18, wherein said co-catalysts and activators are selected from the group consisting of Lewis acids, and protic acids whose anions are relatively non-coordinating anions.

20. The process as recited in claim 18, wherein said co-catalysts and/or activators comprise a Lewis acid and an alkali metal salt of a relatively non-coordinating anion.

21. The process as recited in claim 1, wherein said transition-metal complex has the formula:

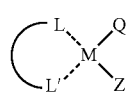

(XVII)

wherein:

(XVIII)

is a neutral bidentate ligand, M is Ni or Pd, and Q and Z are each independently (trimethylsilyl)methyl or methyl.

22. The process as recited in claim 1, wherein hydrogen is also present.

* * * * *